US006266691B1

(12) United States Patent
Watanabe et al.

(10) Patent No.: US 6,266,691 B1
(45) Date of Patent: *Jul. 24, 2001

(54) CONFERENCE SUPPORT SYSTEM WITH USER OPERATION RIGHTS AND CONTROL WITHIN THE CONFERENCE

(75) Inventors: Satoru Watanabe; Souichi Okada; Toshihiro Azami; Jun Kakuta; Tsuneo Katsuyama, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/759,897

(22) Filed: Dec. 3, 1996

(30) Foreign Application Priority Data

Jun. 28, 1996 (JP) .................................................. 8-188518

(51) Int. Cl.[7] ...................................................... G06F 13/00
(52) U.S. Cl. ............................................ 709/204; 709/205
(58) Field of Search .......................... 395/200.34, 200.35; 345/330, 331, 332, 329, 145, 433, 435, 133, 333, 339, 345, 342; 709/204, 205, 229; 711/152; 370/260

(56) References Cited

U.S. PATENT DOCUMENTS

| | | | | |
|---|---|---|---|---|
| 5,195,086 | * | 3/1993 | Baumgartner et al. | 370/62 |
| 5,220,657 | * | 6/1993 | Bly et al. | 711/152 |
| 5,280,583 | * | 1/1994 | Nakayama et al. | 395/200.25 |
| 5,392,400 | * | 2/1995 | Berkowitz et al. | 709/203 |
| 5,491,743 | * | 2/1996 | Shiio et al. | 709/204 |
| 5,515,491 | * | 5/1996 | Bates et al. | 345/331 |
| 5,530,880 | * | 6/1996 | Katsurabayashi | 364/222.5 |
| 5,553,281 | * | 9/1996 | Brown et al. | 345/331 |
| 5,581,702 | * | 12/1996 | McArdle et al. | 395/200.34 |
| 5,596,721 | * | 1/1997 | Masse et al. | 395/200.35 |
| 5,652,866 | * | 7/1997 | Aldred et al. | 375/222 |
| 5,694,544 | * | 12/1997 | Tanigawa et al. | 395/200.34 |
| 5,726,669 | * | 3/1998 | Obata et al. | 395/332 |
| 5,748,618 | * | 5/1998 | Rothrock | 395/200.35 |
| 5,799,191 | * | 8/1998 | Moriyasu et al. | 709/106 |
| 5,838,300 | * | 11/1998 | Takagi et al. | 345/145 |
| 5,838,973 | * | 11/1998 | Carpenter-Smith et al. | 345/329 |

FOREIGN PATENT DOCUMENTS 5-300147    11/1993   (JP) .

* cited by examiner

Primary Examiner—Robert B. Harrell
Assistant Examiner—William C. Vaughn, Jr.
(74) Attorney, Agent, or Firm—Staas & Halsey LLP

(57) ABSTRACT

An electronic conference support system having a structure in which one main common information processing apparatus having a common display unit having a size sufficiently large for attendants to commonly look and some personal information processing apparatuses for permitting each attendant to exclusively create, display and edit information adjacent to each attendant are connected to one another to form a network communication structure through a data communication passage. When a certain attendant acquires an operation right, an information input space is displayed on the personal display unit of the attendant while permitting the attendant to input information. Information inputted to the information input space is, after completed and as an information object, displayed on the common display unit of the common information processing apparatus and the personal display units of all of the personal information processing apparatuses. The attendant of the conference is enabled to easily input information and other attendants who look the attendant's operation are enabled to be free from adverse stimulus.

20 Claims, 72 Drawing Sheets

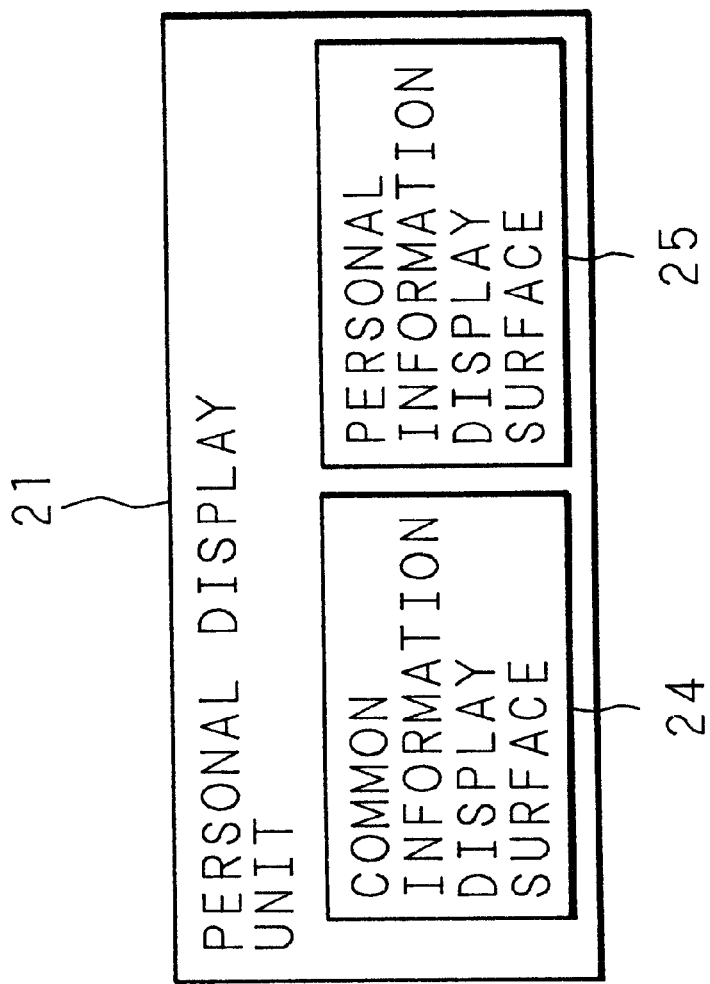
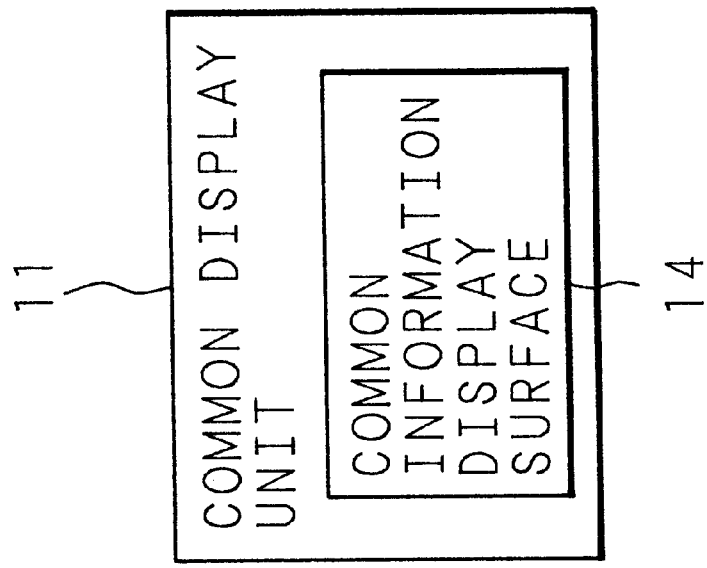

53

RELEVANT
PERSONAL
DISPLAY
UNIT 21
24
(COMMON
INFORMATION
DISPLAY
SURFACE)
61
(INFORMATION
INPUT SPACE)

NEXT MOBILE WEARS PLAN

COMMON
DISPLAY
UNIT

11

NEXT MOBILE WEARS PLAN

OTHER
PERSONAL
DISPLAY
UNIT 21
24

NEXT MOBILE WEARS PLAN

RELEVANT
PERSONAL
DISPLAY
UNIT

RELEVANT
PERSONAL
DISPLAY
UNIT

COMMON
DISPLAY
UNIT

OTHER
PERSONAL
DISPLAY
UNIT

RELEVANT
PERSONAL
DISPLAY
UNIT

COMMON
DISPLAY
UNIT

OTHER
PERSONAL
DISPLAY
UNIT

FIG. 8A PERSONAL DISPLAY UNIT
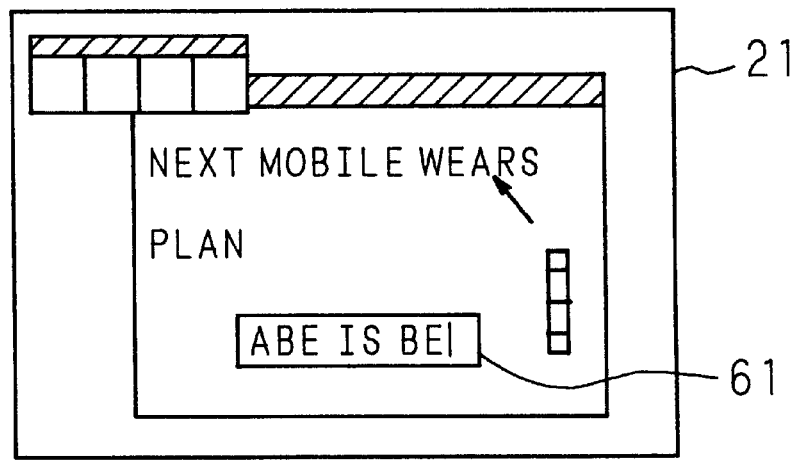
FIG. 8B
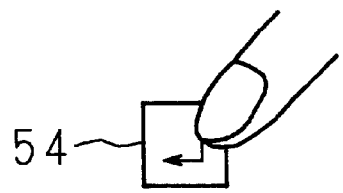
FIG. 8C RELEVANT PERSONAL DISPLAY UNIT
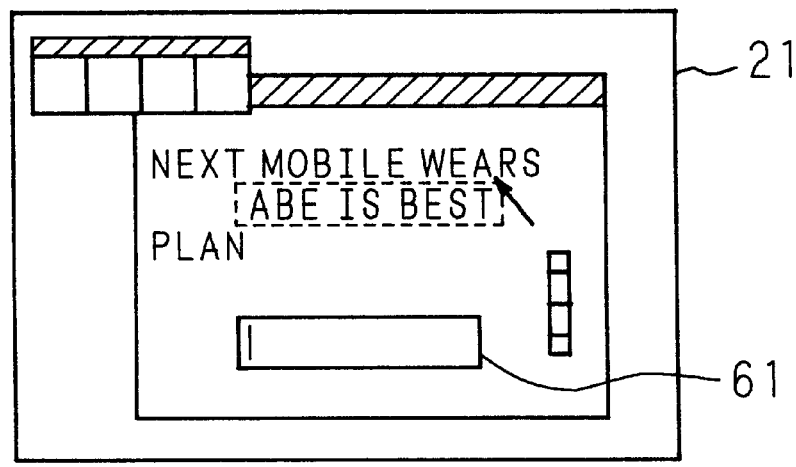

PERSONAL
DISPLAY
UNIT

RELEVANT PERSONAL DISPLAY UNIT

COMMON DISPLAY UNIT

OTHER PERSONAL DISPLAY UNIT

RELEVANT
PERSONAL
DISPLAY
UNIT

RELEVANT PERSONAL DISPLAY UNIT

COMMON DISPLAY UNIT

OTHER PERSONAL DISPLAY UNIT

RELEVANT PERSONAL DISPLAY UNIT

COMMON DISPLAY UNIT

OTHER PERSONAL DISPLAY UNIT

RELEVANT
PERSONAL
DISPLAY
UNIT

COMMON
DISPLAY
UNIT

OTHER
PERSONAL
DISPLAY
UNIT

RELEVANT PERSONAL DISPLAY UNIT

COMMON DISPLAY UNIT

OTHER PERSONAL DISPLAY UNIT

RELEVANT
PERSONAL
DISPLAY
UNIT

COMMON
DISPLAY
UNIT

OTHER
PERSONAL
DISPLAY
UNIT

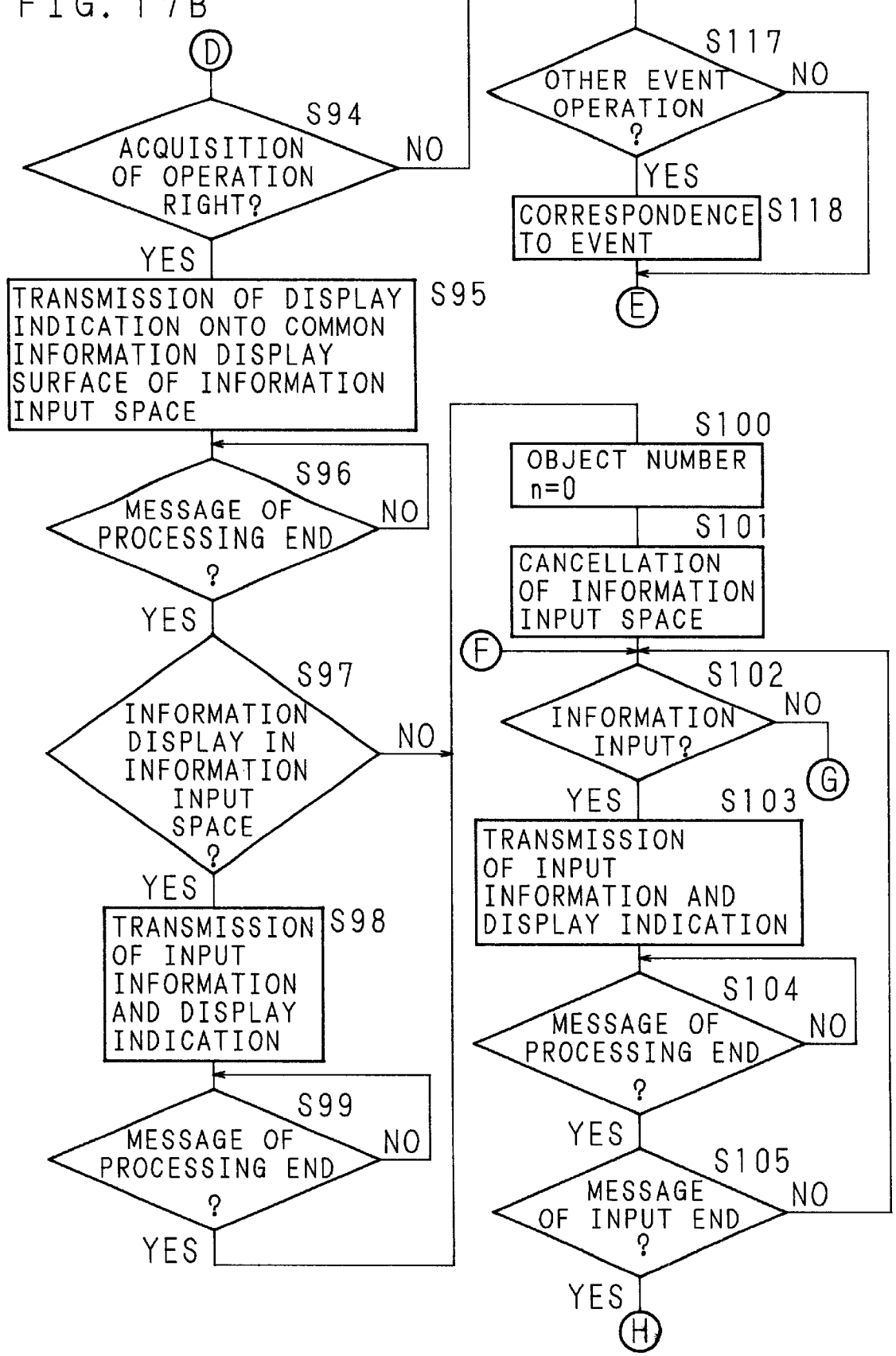

RELEVANT PERSONAL DISPLAY UNIT 21
24 (COMMON INFORMATION DISPLAY SURFACE)
61 (INFORMATION INPUT SPACE)

COMMON DISPLAY UNIT

11

OTHER PERSONAL DISPLAY UNIT

21

RELEVANT
PERSONAL
DISPLAY
UNIT

COMMON
DISPLAY
UNIT

OTHER
PERSONAL
DISPLAY
UNIT

RELEVANT
PERSONAL
DISPLAY
UNIT

COMMON
DISPLAY
UNIT

OTHER
PERSONAL
DISPLAY
UNIT

RELEVANT PERSONAL DISPLAY UNIT

COMMON DISPLAY UNIT

RELEVANT PERSONAL DISPLAY UNIT

COMMON DISPLAY UNIT

PERSONAL DISPLAY UNIT OF PARTICIPATOR EXCEPT A

PERSONAL DISPLAY UNIT OF PARTICIPATOR A

54

COMMON
DISPLAY
UNIT

PERSONAL
DISPLAY
UNIT OF
PARTICIPATOR A

RELEVANT
PERSONAL
DISPLAY
UNIT

COMMON
DISPLAY
UNIT

PERSONAL
DISPLAY
UNIT OF
PARTICIPATOR A

PERSONAL
DISPLAY
UNIT OF
PARTICIPATOR A

COMMON
DISPLAY
UNIT

PERSONAL
DISPLAY
UNIT OF
PARTICIPATOR
EXCEPT A

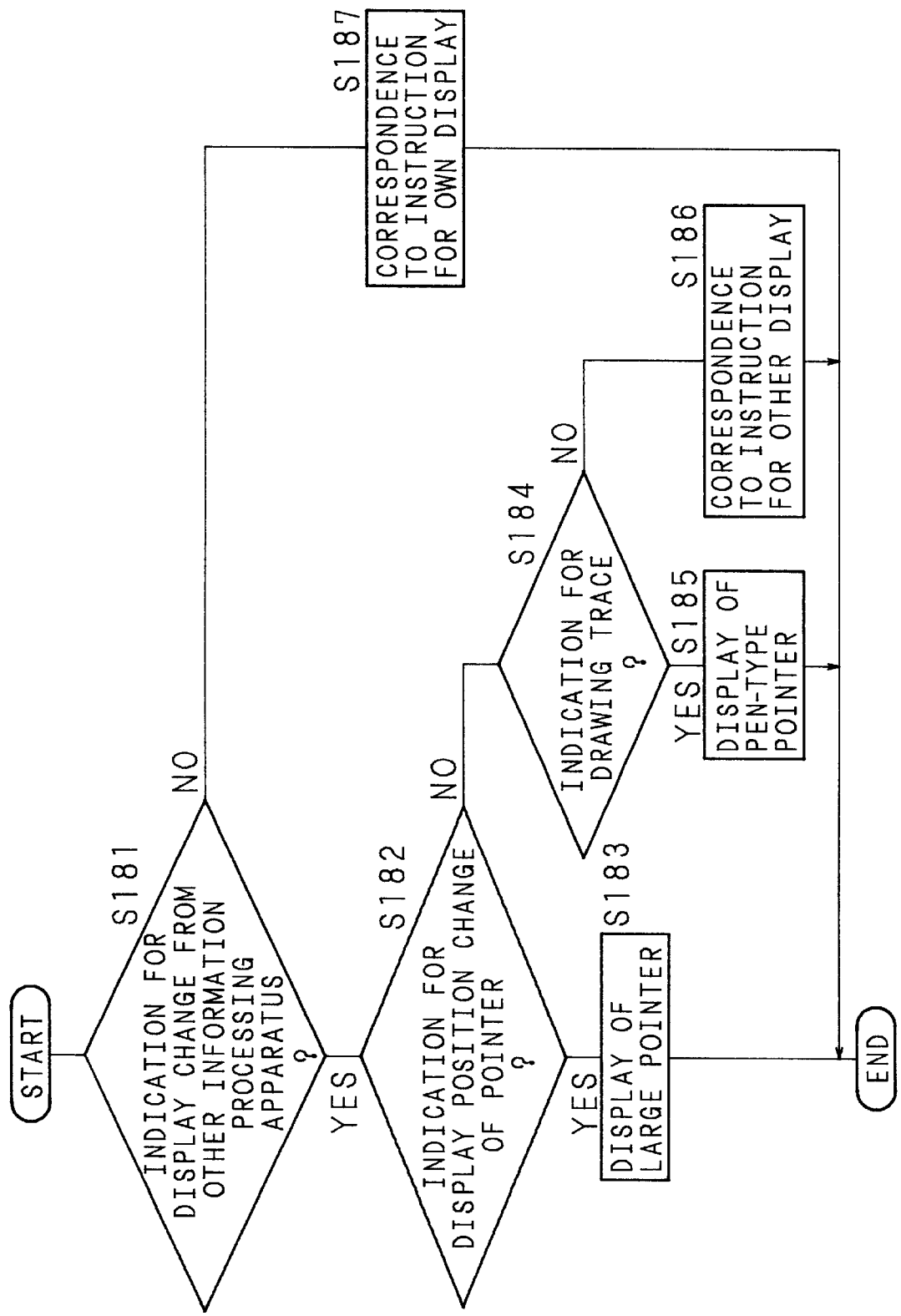

PERSONAL
DISPLAY
UNIT OF
PARTICIPATOR A

COMMON
DISPLAY
UNIT

PERSONAL
DISPLAY
UNIT OF
PARTICIPATOR
EXCEPT A

RELEVANT
PERSONAL
DISPLAY
UNIT

RELEVANT
PERSONAL
DISPLAY
UNIT

COMMON DISPLAY UNIT

COMMON DISPLAY UNIT

COMMON DISPLAY UNIT

RELEVANT
DISPLAY
UNIT

RELEVANT
PERSONAL
DISPLAY
UNIT

COMMON DISPLAY UNIT

COMMON DISPLAY UNIT

COMMON DISPLAY UNIT

PERSONAL
DISPLAY
UNIT

PERSONAL
DISPLAY
UNIT

FIG. 34

| | COLORATION | CHARACTER FONT | LINE THICKNESS |
|---|---|---|---|
| FIRST PERSONAL INFORMATION PROCESSING APPARATUS 2a | RED | SAN SERIF FONT | THICK |
| SECOND PERSONAL INFORMATION PROCESSING APPARATUS 2b | BLUE | MINCHO TYPEFACE | THIN |
| THIRD PERSONAL INFORMATION PROCESSING APPARATUS 2c | GREEN | ROUND CHARACTER | MEDIUM |

FIG. 35A
FIG. 35B
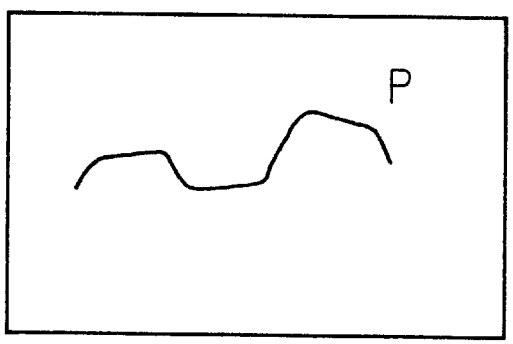
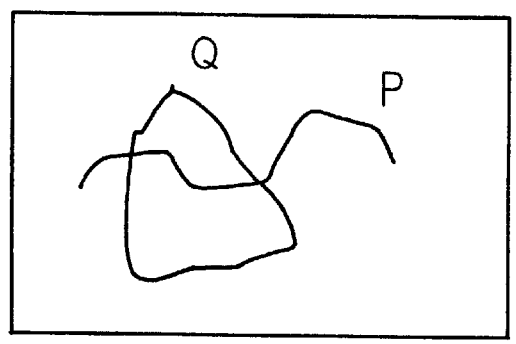

FIG. 36A

POINT FOR REACHING
AGREEMENT?
COMMUNITY OF
INFORMATION

FIG. 36B

POINT FOR REACHING
AGREEMENT?
COMMUNITY OF
INFORMATION
LISTENING CLOSELY
NOD
PERSUASION

FIG. 37

| | USER NAME | COLORATION | CHARACTER FONT | LINE THICKNESS |
|---|---|---|---|---|
| FIRST PERSONAL INFORMATION PROCESSING APPARATUS 2a | X | RED | SAN SERIF FONT | THICK |
| SECOND PERSONAL INFORMATION PROCESSING APPARATUS 2b | Y | BLUE | MINCHO TYPEFACE | THIN |
| THIRD PERSONAL INFORMATION PROCESSING APPARATUS 2c | Z | GREEN | ROUND CHARACTER | MEDIUM |

```
POINT FOR REACHING AGREEMENT?  (X)
  COMMUNITY OF INFORMATION      (X)
  LISTENING CLOSELY             (Y)
  NOD                           (Y)
  PERSUASION                    (Y)
```

11

FIG. 40A
FIG. 40B
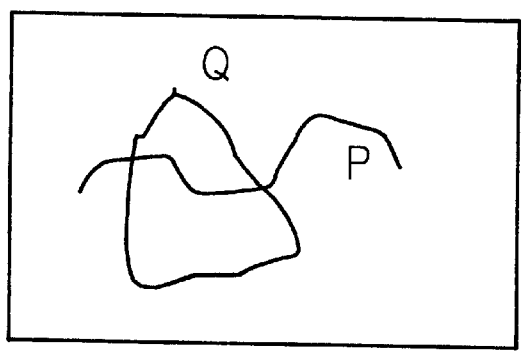
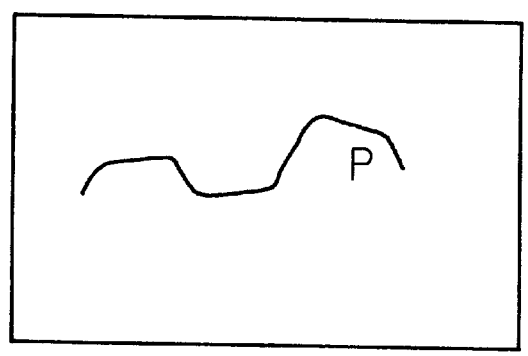

CONFERENCE SUPPORT SYSTEM WITH USER OPERATION RIGHTS AND CONTROL WITHIN THE CONFERENCE

BACKGROUND OF THE INVENTION

1. Field of the Invention

The present invention relates to an electronic conference support system capable of improving efficiency in performing the conference.

2. Description of Related Art

A conference, in which communication of attendants is mainly made by means of voice, has recently been developed into an electronic conference support system in which information items, which are opinions of the attendants of the conference, are electronically created, displayed, instructed and moved so as to smoothly make communication among the attendants and easily reserve the record of the conference, thereby improving the contents and results of the conference.

A conference support system of the foregoing type generally has a structure, in which one common information processing apparatus and some personal information processing apparatuses, each of which is assigned to each attendant, are connected by serial synchronizing communication lines such as LAN lines or the like. The common information processing apparatus has a large-size monitor employed in place of the blackboard and arranged to display information from each attendant in a large scale, a monitor control unit for controlling the monitor to display a variety of information items, and input means provided for commonly all of the attendants to input information. Each personal information processing apparatus has a personal computer, a small-size monitor for displaying various information and input means peculiar to the attendant for inputting information. In order to support the conference, which is a kind of cooperation work, common or peculiar input means is used to permit each attendant to arbitrarily create, instruct and move information.

In a case where a certain attendant A expresses his own information on the common information display surface of the large monitor of a conventional conference support system, he, for one thing, directly expresses it on the common information display surface, using the common input means, or, for another, he prepares it on his personal small-size monitor, using its peculiar input means and transmits it to the common information display surface. When the attendant A creates new information, instructs existing information, or moves information, other attendants can look at the same information on all display units of the other information processing apparatus as that of A's display unit.

Since input and display of information are controlled as described in the conventional conference support system, there arises the following problem when attendants try to communicate with each other through displayed information in the conference: in a case where information is directly created on the common information display surface of the common information processing apparatus, the attendant A intending to create information must perform the creating process while considering the arrangement of new information among existing information groups. Therefore, an idea created newly during the communication in the conference cannot immediately be presented as information. In another case where information is displayed on the common information display surface after it has been created by the personal processing apparatus, the attendant A solely forms the idea into information and then presents the information above. Therefore, the new idea cannot immediately be presented as information to the other attendants.

There is a case that the attendant A expresses his own information on a display of any information processing apparatus and the other attendant B looks at it on any different display. Strictly, one case is that the attendant A performs an operation with his own personal information processing apparatus and the attendant B looks at it on the display unit of the common information processing apparatus or of his own personal information processing apparatus, and the other case is that the attendant A performs an operation with the common information processing apparatus and the attendant B looks at it on the display unit of his own personal information processing apparatus. The process of the operation which is performed by the attendant A cannot sufficiently be communicated on the common information display surface which is being looked at by the attendant B such that information suddenly appears or the same rapidly moves. Therefore, the attendant B is adversely affected by a stimulus so that smooth communication using information is usually inhibited.

As a system for electronically supporting a conference, a system has been suggested in which an attendant who has inputted information which is being displayed on the common information display surface can be identified (Japanese Patent Application Laid-Open No. 5-300147 (1993)). However, since input information is not controlled for each person (each attendant) who has inputted the same, information inputted by a certain attendant can easily and unintentionally be moved or deleted, that is, edited by the other attendants.

SUMMARY OF THE INVENTION

An object of the present invention is to provide a conference support system which conference attendants can instantly display their ideas created as information during the conference.

Another object of the present invention is to provide a conference support system in which each of the conference attendants is kept free from any hindrance arising from a display operation by others.

A further object of the present invention is to provide a conference support system in which each of the conference attendants can hold their own input information under the freedom to edit it by moving, erasing or other operations, and to display it independently of other attendants' information, thereby enabling each of the attendants to hold filtered information.

A conference support system according to one aspect of the present invention and having a structure in which a main information processing apparatus having a main display unit for displaying information and some sub-information processing apparatuses each having a sub-display unit for displaying an information unit are connected to one another through a communication passage so as to communicate information among the apparatuses, the conference support system comprising: means for displaying an information display surface on which information is created, displayed and edited in accordance with an operation of the main information processing apparatus and/or each of the sub-information processing apparatuses, on the main display units and each of the sub-display unit; means for determining an operation right for the sub-information processing apparatus to operate the information display surface; means for displaying an information input receiving surface for receiving input of information on the sub-display unit of the sub-information processing apparatus which has acquired the operation right; and means for displaying information inputted to the information input receiving surface on the information display surface as an information object.

The information object is a unit which is treated as information, and in order to easily treat information as a lump, the contents and the attribute information {object ID, object classification (text, bit-map, file or the like), display coordinates on the display surface, display priority order, time stamp, and so on} of the information object is recorded and controlled. Each information object can be freely moved on the display surface and can be easily performed extension/reduction process, deletion process, edition process, and so forth.

The conference support system according to the first aspect of the present invention further comprises means for displaying the information input receiving surface, which is waiting for new input, on the sub-display unit of the sub-information processing apparatus which has been acquiring the operation right in a case where input of one information object to the information input receiving surface has been completed and the input information object is displayed on the information display surface.

The conference support system according to the first aspect of the present invention further comprises means for calculating displaying positions of information objects on the information display surface in a case where some information objects are continuously created and displayed.

The conference support system according to the first aspect of the present invention further comprises means for displaying the information input receiving surface and information to be inputted to the information input receiving surface on the main display unit and the sub-display unit of the sub-information processing apparatus which has not acquired the operation right.

The conference support system according to the first aspect of the present invention further comprises means for displaying a sub-information display surface on which information is created, displayed and edited by an operation of the sub-information processing apparatus, on the sub-display unit of the sub-information processing apparatus; means for displaying the information input receiving surface for receiving input of information on the sub-display unit of the sub-information processing apparatus which has not acquired the operation right; means for displaying information inputted to the information input receiving surface on the sub-information display surface; and means for displaying information inputted to the information input receiving surface as an information object on the information surface in a case where the operation right has been acquired during input of information to the information input receiving surface.

The conference support system according to the first aspect of the present invention further comprises means for performing control such that a method of display performed on the sub-display unit of the sub-information processing apparatus and that of display performed on the main display unit and the sub-display units of the sub-information processing apparatuses except the sub-information processing apparatus are made to be different from each other in a case where information is created, display or edited on the information display surface in accordance with an operation of the sub-information processing apparatus which has acquired the operation right.

A conference support system according to the second aspect of the present invention and having a structure in which a main information processing apparatus having a main display unit for displaying information and some sub-information processing apparatuses each having a sub-display unit for displaying information are connected to one another through a communication passage so as to communicate information among the apparatuses, the conference support system comprising: means for displaying an information display surface on which information is created, displayed and edited in accordance with an operation of the main information processing apparatus and/or each of the sub-information processing apparatuses, on the main display unit and each sub-display unit; means for receiving a process of editing information displayed on the information display surface from the sub-information processing apparatus; means for determining whether or not the sub-information processing apparatus which has created information above and the sub-information processing apparatus which has received the edition process coincide with each other; and means for performing the edition process in a case where the two sub-information processing apparatuses coincide with each other.

Another conference support system according to the second aspect of the present invention having a structure in which a main information processing apparatus having a main display unit for displaying information and some sub-information processing apparatuses each having a sub-display unit for displaying information are connected to one another through a communication passage so as to communicate information among the apparatuses, the conference support system comprising: means for displaying an information display surface on which information is created, displayed and edited in accordance with an operation of the main information processing apparatus and/or each of the sub-information processing apparatuses, on the main display unit and each sub-display unit; and means for displaying, on the information display surface, an information object inputted from one or some particular sub-information processing apparatuses among the plural sub-information processing apparatuses.

The conference support system according to the second aspect of the present invention further comprises means for receiving instruction input for specifying one or some sub-information processing apparatuses among the plural sub-information processing apparatuses from the sub-information processing apparatus; and means for displaying an information object inputted by a sub-information processing apparatus specified with the instruction input from the sub-information processing apparatus on the sub-display unit of the sub-information processing apparatus.

Moreover, a computer memory product according to the present invention stores a computer program for performing a process in a conference support system having the above-mentioned structure.

FIG. 1 is a diagram showing the principle of the first aspect of the present invention. A common information processing apparatus 1 serving as the main information processing apparatus and some personal information processing apparatuses 2 serving as the sub-information processing apparatuses are connected to one another by a data communication passage 4 into a network structure. The common information processing apparatus 1 comprises a common display unit 11 serving the main display unit, an input unit 12 and an information processing unit 13. Each of the personal information processing apparatuses 2 is composed of a personal display unit 21 serving as the sub-display unit, an input unit 22 and an information processing unit 23.

FIG. 2A is a schematic view showing the information display surface of the common display unit 11. FIG. 2B is a schematic view showing the information display surface of the personal display unit 21. The common display unit 11 has only a common information display surface 14 on which common information is displayed. The personal display unit 21 has a common information display surface 24, on which common information is displayed, and a personal information display surface 25 on which personal information is displayed.

FIG. 3A is a schematic view showing the structure of the information processing unit 13 of the common information processing apparatus 1. The information processing unit 13 is composed of a common information storage unit 16, a display processing unit 17, a display executing unit 18, an event processing unit 19 and an information control unit 20 for controlling the respective units. FIG. 3B is a schematic view showing the structure of the information processing unit 23 of the personal information processing apparatus 2. The information processing unit 23 is composed of a common information storage unit 26, a personal information storage unit 31, a display processing unit 27, a display executing unit 28, an event processing unit 29, an information creating unit 32 and an information controlling unit 30 for controlling the foregoing units. The event processing unit 19 (or 29) of the information processing unit 13 (or 23) receives event notification supplied from another information processing apparatus or own information processing apparatus to transmit a display process event to the display processing unit 17 (or 27). The common information storage unit 16 (or 26) stores common information displayed on the common information display surface 14 (or 24). The display processing unit 17 (or 27) receives the display process event supplied from the event processing unit 19 (or 29) to determine information, method of display and the information processing apparatus to which an output is made. The display executing unit 18 (or 28) receives a process command from the display processing unit 17 (or 27) to perform display on the common display unit 11 (or the personal display unit 21) of the own processing apparatus. The personal information storage unit 31 of the information processing unit 23 stores personal information displayed on the personal information display surface 25. The information creating unit 32 creates information.

Information displayed on each of the common information display surfaces 14 and 24 is stored while being shared by the common information storage units 16 and 26 of the information processing units 13 and 23. As a result of mutual notification between the display processing units 17 and 27, shared display of information is enabled. Change of the method of common display between the common display unit 11 and the personal display unit 21 can be realized by issuing a partially different instruction from each of the display processing units 17 and 27 to the display units 11 and 21. Information to be displayed on the personal information display surface 25 is stored by the personal information storage unit 31 of the personal information processing apparatus 2 which is displaying the same. The information creating unit 32 of the information processing unit 23 creates information on the common information display surface 24 or the personal information display surface 25 in accordance with an instruction from the user to create information.

The event processing unit 19 of the information processing unit 13 notifies information displayed on the common information display surface 14 to the event processing unit 29 of the information processing unit 23. Moreover, it receives notification from the event processing unit 29 of the information processing unit 23 to transfer a display command to the display processing unit 17. The event processing unit 29 of the information processing unit 23 sometimes notifies information of the personal information display surface 25 created by the information creating unit 32 to the event processing units 19 and 29 of the other information processing units 13 and 23 in addition to performing a process similar to that performed by the event processing unit 19.

The display processing units 17 and 27 and the display executing units 18 and 28 of the information processing units 13 and 23 receive the display command from the information creating unit 32 or the event processing units 19 and 29 to perform display on the own common display unit 11 and the own personal display unit 21. Note that the display executing units 18 and 28 are sometimes commanded to perform display on the common information display surfaces 14 and 24 in a method different from that performed by the display processing units 17 and 27 of the other information processing units 13 and 23.

In the first aspect of the present invention, the information creating unit 32 and the event processing units 19 and 29 of the information processing unit 13 of the common information processing apparatus 1 and each of some information processing unit 23 of the personal information processing apparatuses 2 determine whether or not display is performed on only the own display unit. Moreover, the common information processing apparatus 1 and the personal information processing apparatus 2 arbitrarily changes the method of display of information on the common information display surfaces 14 and 24. Therefore, some attendants are able to easily create and present information during the conference.

An essential structure of the second aspect of the present invention will now be described. The overall structure of the second aspect of the present invention is similar to that of the first aspect shown in FIG. 1, in which one common information processing apparatus 1 composed of the common display unit 11, the input unit 12 and the information processing unit 13 and some personal information processing apparatuses 2 each composed of the personal display unit 21, the input unit 22 and the information processing unit 23 are connected by the data communication passage 4 into a network structure.

FIG. 4 is a schematic view showing the internal structure of the information processing unit 13 of the common information processing apparatus 1 according to the second aspect. The information processing unit 13 has a transmission/receipt interface unit 71, an input information identifying unit 72, a CPU 73, an information control unit 74, a display control unit 75 and a memory 76 for storing information to be displayed. The transmission/receipt interface unit 71 receives information from the data communication passage 4 or transmits information to the data communication passage 4. The input information identifying unit 72 identifies the personal information processing apparatus 2 which has supplied information received by the transmission/receipt interface unit 71 to notify the result of the identification to the CPU 73. The CPU 73 totally controls the common information processing apparatus 1. The information control unit 74 has a control table to which a reference is made by the CPU 73 to control information for each of the personal information processing apparatuses 2. The display control unit 75 controls the memory 76 for display and the common display unit 11 in accordance with control information supplied from the CPU 73. The memory 76 for display stores data sent from the display control unit 75.

When information has been inputted from a certain personal information processing apparatus 2 to the common information processing apparatus 1, the transmission/receipt interface unit 71 receives information above. The input information identifying unit 72 identifies the personal information processing apparatus 2 which has transmitted information above to notify the result of the identification to the CPU 73. The CPU 73 makes a reference to the control table stored in the information control unit 74 in accordance with notification information supplied from the input information identifying unit 72 to notify the display attribute information (color, thickness and character font and the like) of the relevant personal information processing apparatus 2 to the display control unit 75. The common information processing apparatus 1 has a display plane (either of hardware or software can be implemented) for each of the personal information processing apparatuses 2. The CPU 73 controls to switch the display plane for each personal information processing apparatus 2. The display control unit 75 controls display in accordance with the display attribute information.

Therefore, the second aspect of the present invention enables the method of display to be changed for each personal information processing apparatus 2, that is, for each attendant. Thus, if the contents of the control table in the information control unit 74 are previously determined by the system, all of the attendants are able to recognize the attendant who has inputted information. When information is edited, the attribution of the information item can be secured. Therefore, the attendant is able to edit only information which he has inputted, the edition being movement, deletion and the like. Moreover, information filtering is enabled such that only information of a certain plane is displayed as a control of switching of the display plane. Moreover, only information of a particular attendant can be displayed on the personal display unit 21 of each attendant, as well as information of all of the attendants.

The above and further objects and features of the invention will more fully be apparent from the following detailed description with accompanying drawings.

BRIEF DESCRIPTION OF THE DRAWINGS

FIGS. 2A and 2B are schematic views showing an information display surface (first aspect) of the common display unit and the personal display unit;

FIGS. 8A to 8C are schematic views showing examples of the operations and display according to the second embodiment;

FIGS. 17A to 17C are flow charts showing the procedure of a process according to the fifth embodiment;

FIG. 25 is a flow chart showing the procedure of a process according to the eighth embodiment (the display processing unit);

FIG. 34 is a table showing an example of the control table;

FIGS. 35A and 35B are diagrams showing examples of distinctive of display on the screen by colors;

FIGS. 36A and 36B are diagrams showing examples of distinctive of display on the screen by character fonts;

FIG. 37 is a table showing another example of the control table;

FIGS. 40A and 40B are diagrams showing examples of display when a deletion process is performed;

DESCRIPTION OF THE PREFERRED EMBODIMENTS

Preferred embodiments of the present invention will now be described with reference to the drawings.

Figure 5:
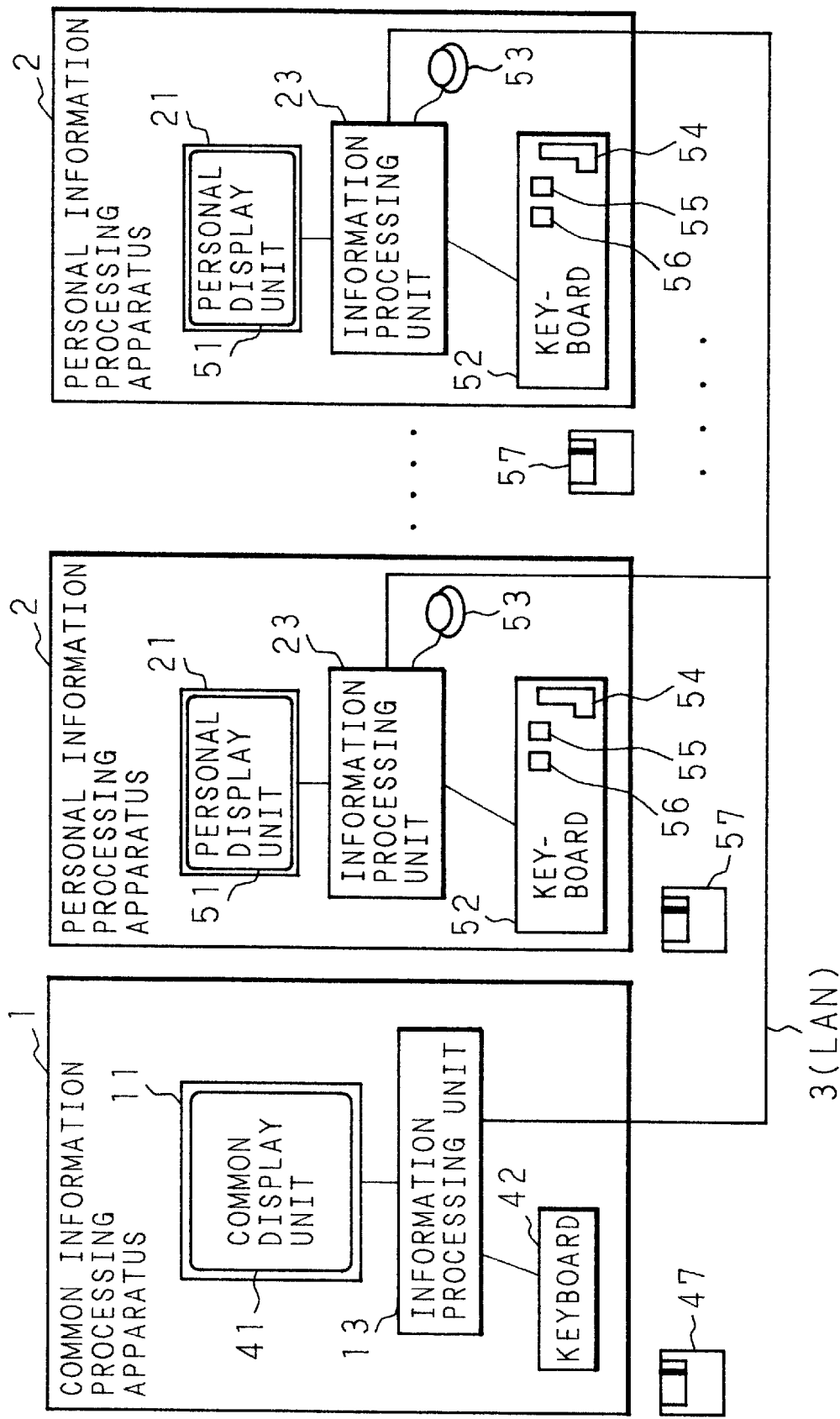
FIG. 5 is a schematic view showing an example of the basic structure of a conference support system (the first aspect)

FIG. 5 is a schematic view showing an example of the basic structure of a conference support system according to the first aspect of the present invention. Referring to FIG. 5, reference numeral 1 represents a common information processing apparatus, and 2 represents a personal information processing apparatus which is assigned to each of the attendants. The common information processing apparatus 1 is disposed in front of a conference table for permitting all of the attendants of the conference to commonly look at the display of the common information processing apparatus 1. On the other hand, each personal information processing apparatus 2 is disposed in front of a desk of each of the attendants of the conference so as to be exclusively used by the attendant. The common information processing apparatus 1 and personal information processing apparatuses 2 are connected to one another through a LAN 3 which is a data communication passage so that mutual information communication is enabled.

Figure 1:
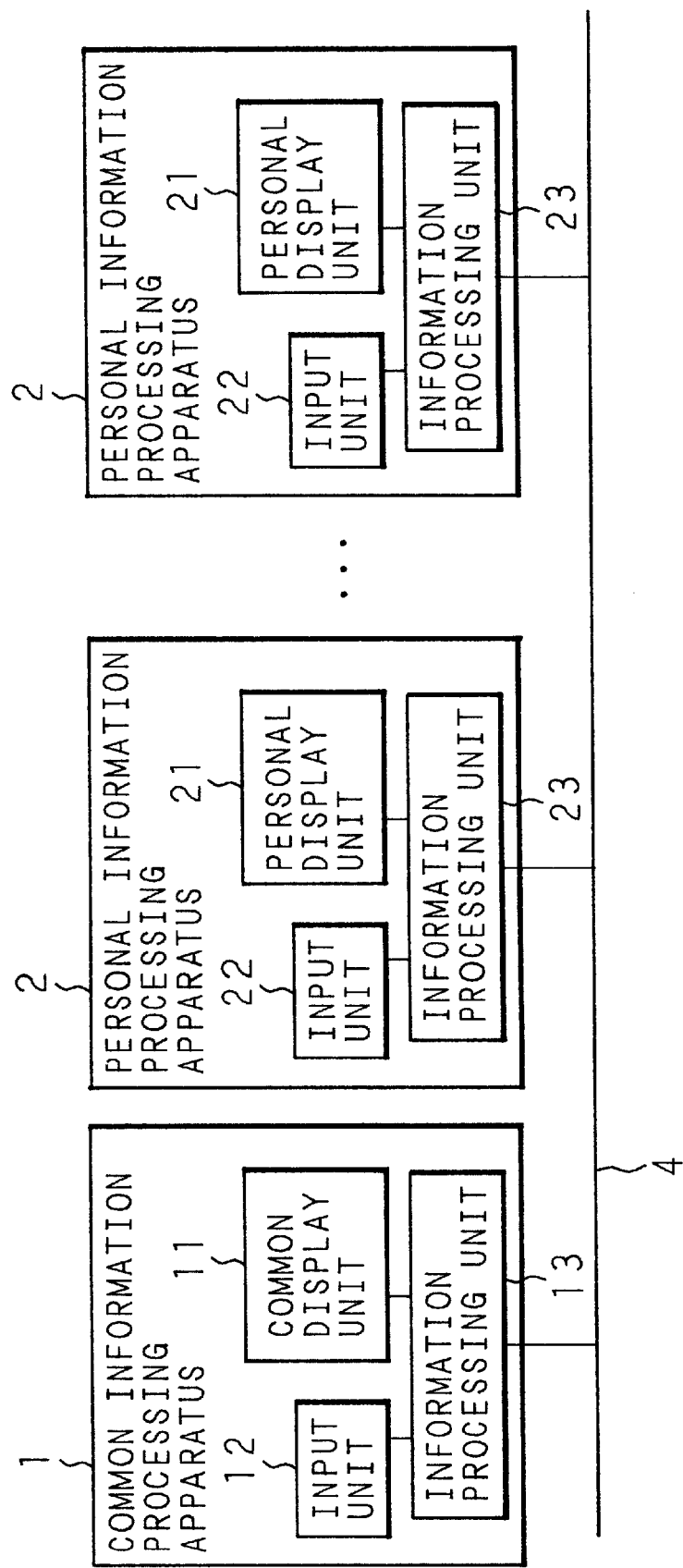
FIG. 1 is a structural view showing the principle of a conference support system (according to first and second aspects)
Figure 3A:
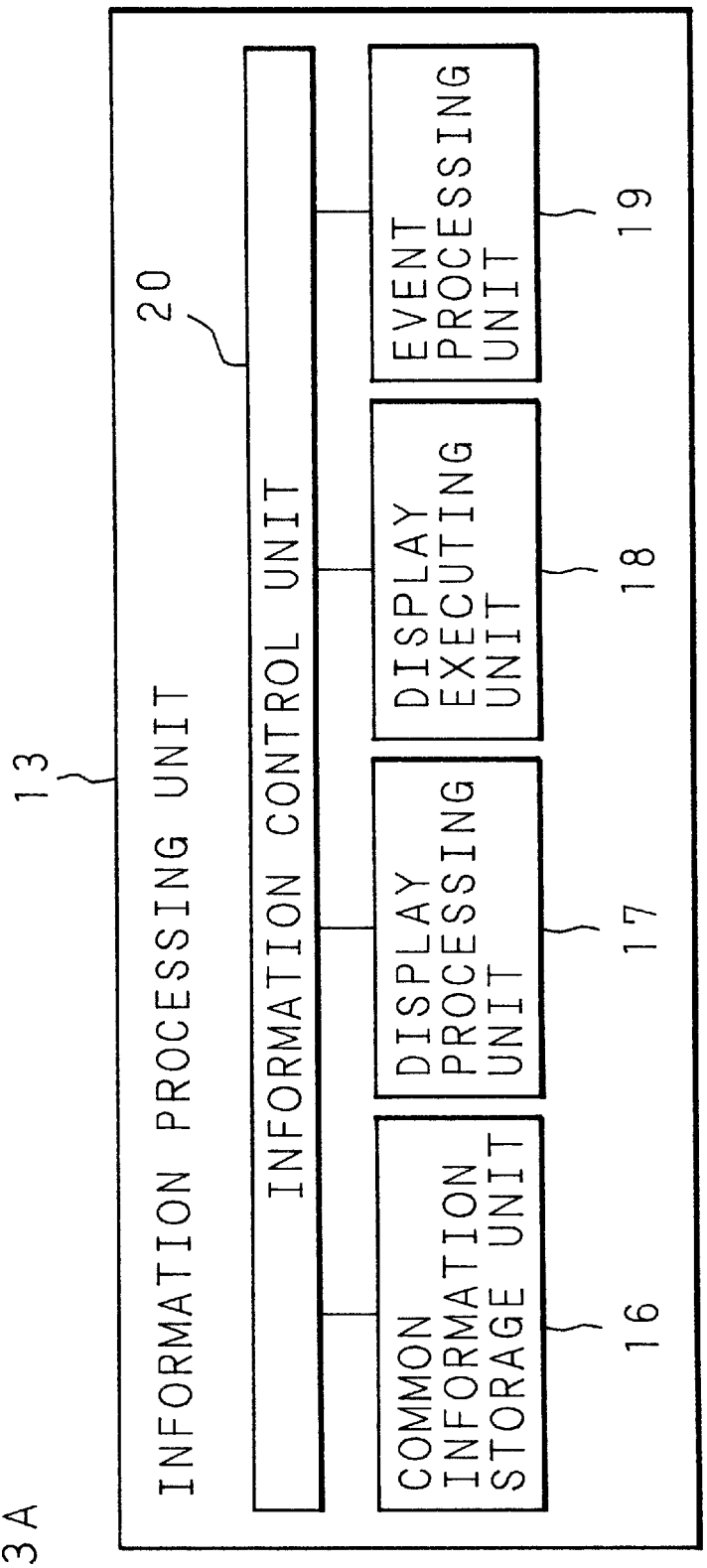
FIGS. 3A and 3B are schematic views showing the structure (the first aspect) of the information processing unit.
Figure 3B:
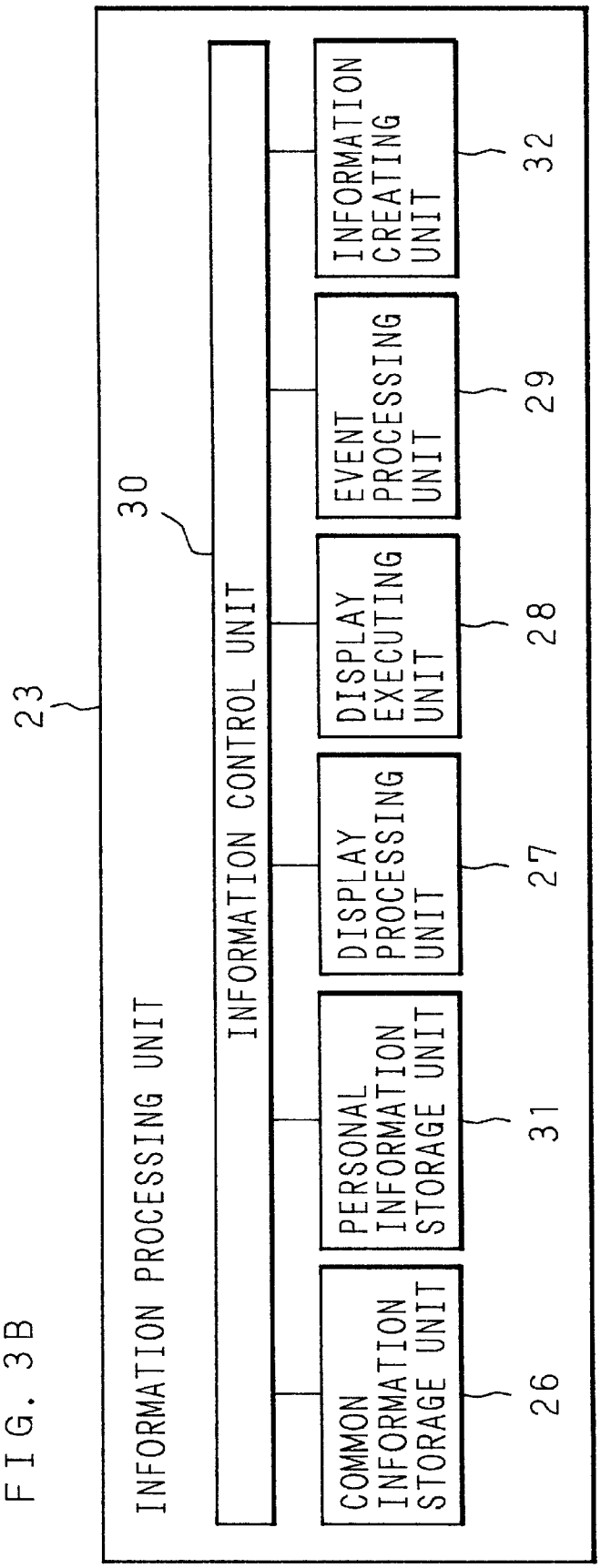

The common information processing apparatus 1 has a common display unit 11 having a projector of a size of 50 to 60 inches, an input unit 12 having a touch sensor 41 attached to the upper surface of the common display unit 11 and a keyboard 42 connected to the information processing unit 13, and an information processing unit 13 having a computer including software structured as shown in FIG. 3A. Each personal information processing apparatus 2 has a personal display unit 21 having a liquid crystal tablet of a size about 10 inches, an input unit 22 having a touch sensor 51 attached to the upper surface of the personal display unit 21, a keyboard 52 connected to the information processing unit 23 and an operation-right acquisition/suspension button (hereinafter called an "operation right button") 53, and an information processing unit 23 having a personal computer including software structured as shown in FIG. 3B. The information processing unit 13 having the computer and the information processing unit 23 having the personal computer obtain programs with which processes to be described later which are loaded from computer memory products 47 and 57 which are magnetic disks or the like having the programs recorded therein.

The operation right button 53 is a button for enabling information to be added to the common information display surfaces 14 and 24, and the operation right to be acquired for the attendant when the attendant edits or instructs information on the common information display surfaces 14 and 24 or the acquired operation right to be suspended. When the operation right button 53 is depressed, an information control unit 30 of the information processing unit 23 of the relevant personal information processing apparatus 2 is able to recognize in accordance with information supplied from an event processing unit 29 that the personal information processing apparatus 2 under control of the information control unit 30 is brought to a state in which the operation right has been acquired.

The keyboard 52 of the personal information processing apparatus 2 has an information creation end key 54, a personal document start key 55 and a personal start/end key 56 for an information input space (information input receiving surface) to be described later. The information creation end key 54 is a key for notifying completion of input of one information item in a case where information is being inputted on the information input space. The personal document start key 55 is a key for enabling each attendant to personally open a document on the personal information display surface 25 of the personal display unit 21. The personal start/end key 56 is a key arranged to be depressed when the information input space for use to create information to be displayed on the common information display surface 24 after the acquisition of the operation right is used to create information to be displayed on the personal information display surface 25, the personal start/end key 56 being depressed also in a case where the use of the information input space is stopped.

The embodiments of the present invention are described. In the first to seventh and tenth embodiments, the examples in which the kind of information object is limited to a text are explained.

FIRST EMBODIMENT

Figure 6A:
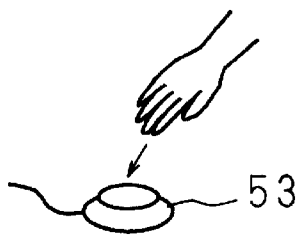
FIGS. 6A to 6N are schematic views showing examples of the operations and display according to the first embodiment.
Figure 6B:
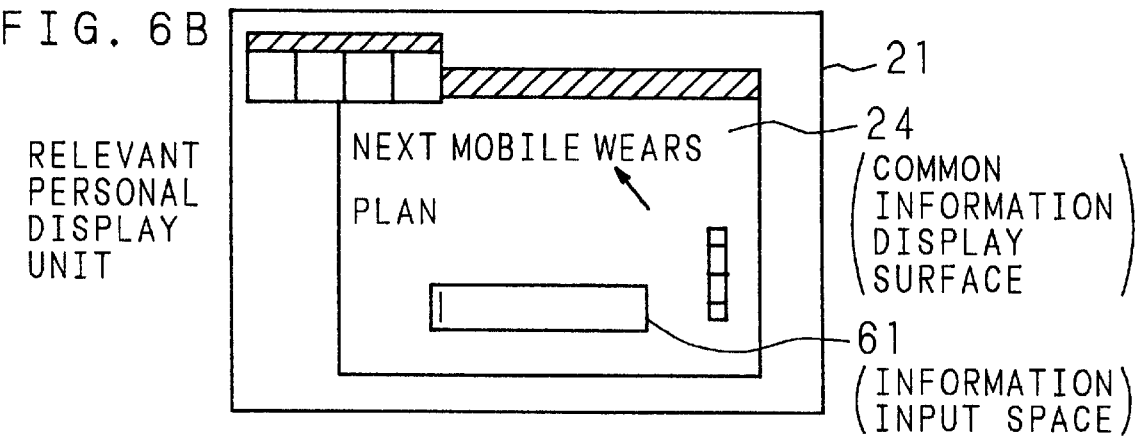
Figure 6C:
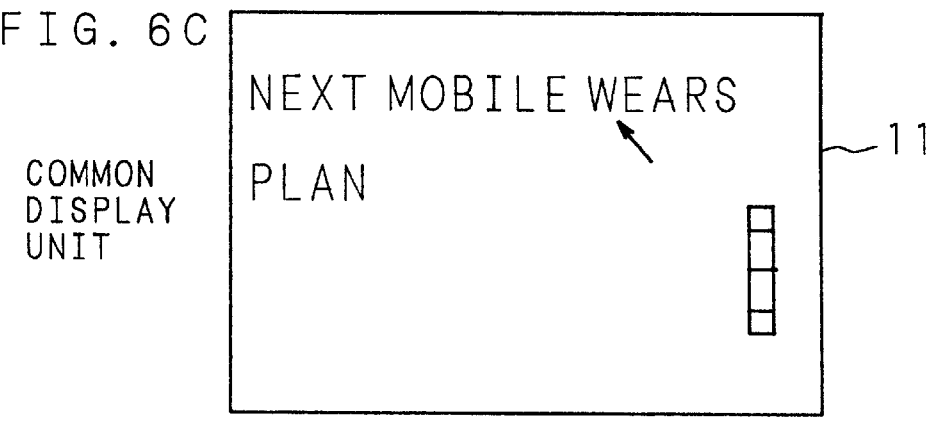
Figure 6D:
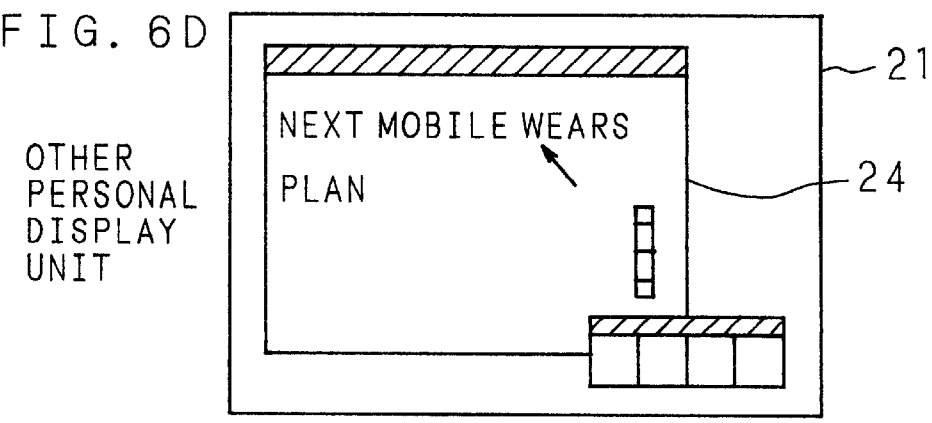
Figure 6E:
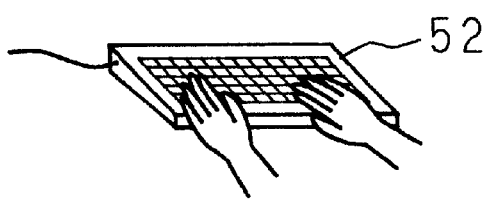
Figure 6F:
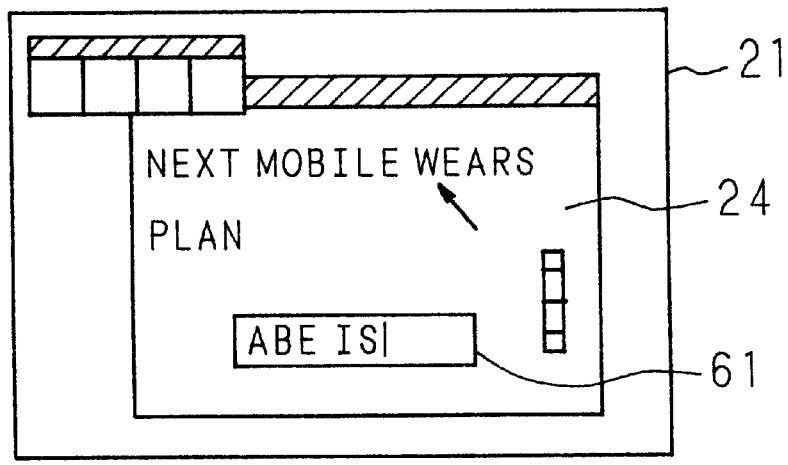
Figure 6G:
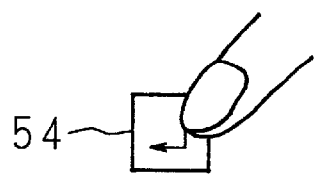
Figure 6H:
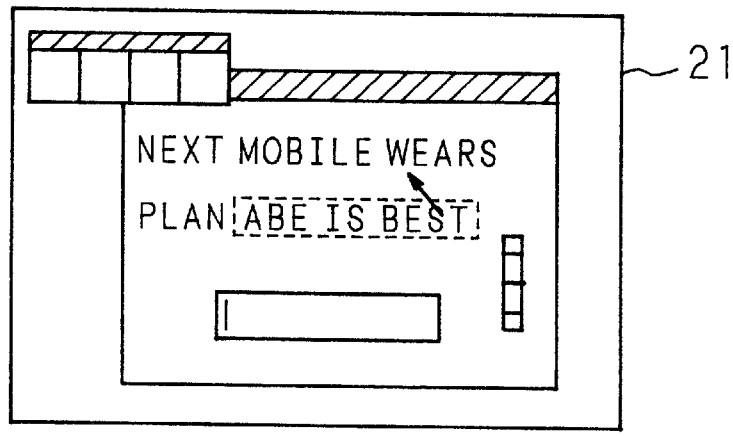
Figure 6I:
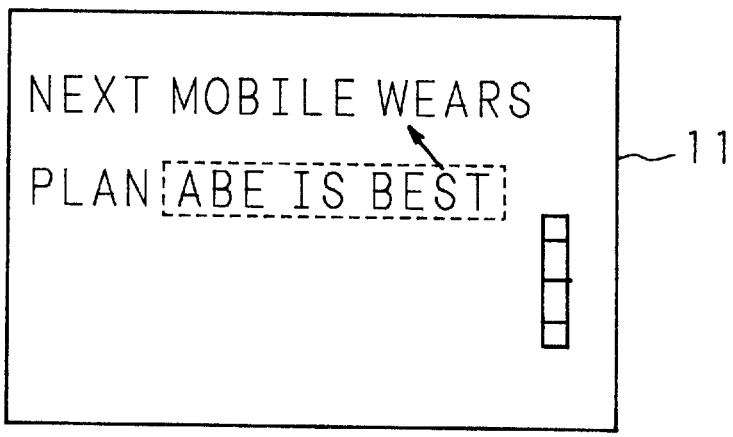
Figure 6J:
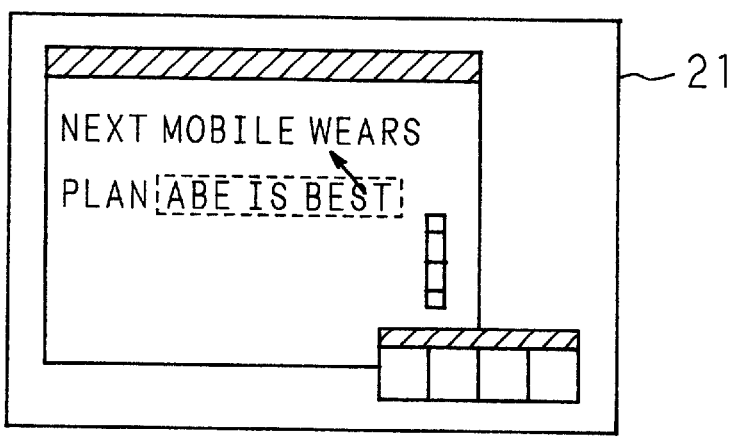
Figure 6K:
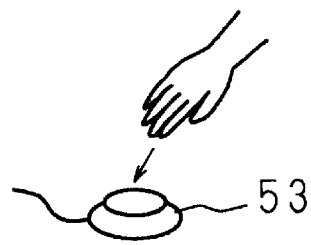
Figure 6L:
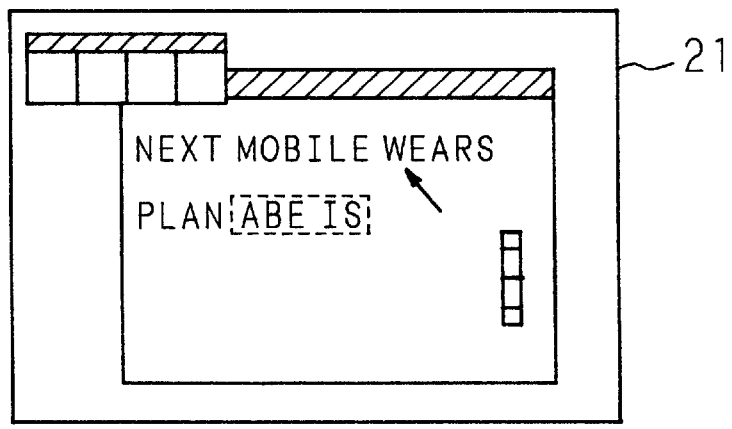
Figure 6M:
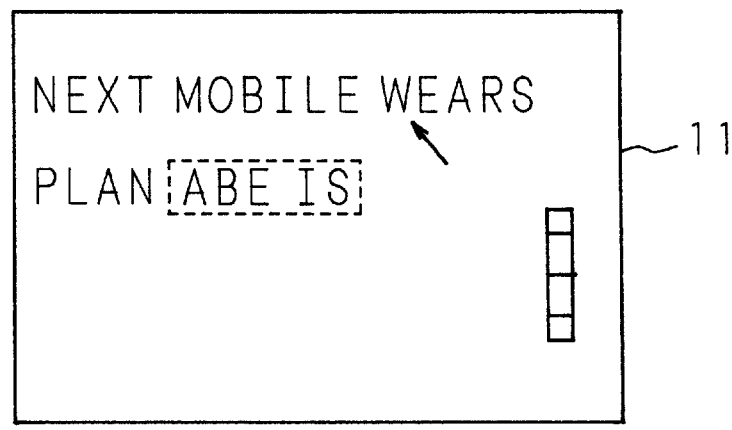
Figure 6N:
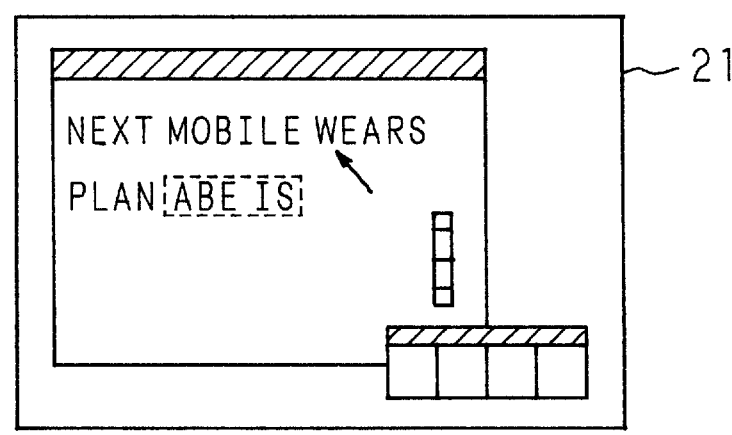

FIGS. 6A to 6N are schematic views showing examples of the operations and display according to a first embodiment of the first aspect of the present invention. When a certain attendant has depressed the operation right button 53 and thus acquired the operation right (see FIG. 6A), acquisition of the operation right is notified from the event processing unit 19 to the information control unit 20. As a result, the information control unit 20 displays an information input space 61 which is in a state waiting for an input (see FIG. 6B). Note that the information input space 61 is, in this embodiment, disposed to be superimposed on the common information display surface 24. The displayed information input space 61 has a rectangular shape having one line allowing tens of characters to be displayed, the information input space 61 having a caret at the leading end thereof. The information input space 61 is not displayed on the common display unit 11 and the other personal display units 21 (see FIGS. 6C and 6D).

When the attendant who has acquired the operation right inputs an arbitrary character or an edition code (see FIG. 6E), the information creating unit 32 displays the relevant character on the information input space 61 or deletes a character or moves the caret (see FIG. 6F). Note that another operation (direct input of a character to the common information display surface 14 or selectively movement of an information object on the common information display surface 14) can be performed without input to the information input space 61 or during input.

In a case where the input contents are intended to be displayed as the information object after information has been inputted, the attendant depresses the information creation end key 54 (see FIG. 6G). As a result, the input character which has been displayed on the information input space 61 is supplied to the own display processing unit 27 so as to be displayed as the information object and the information input space 61 disappears (see FIG. 6H). The input character is, through the event processing units 19 and 29, transmitted to the common information processing apparatus 1 and the other personal information processing apparatuses 2 so as to be displayed as the information object on the common display unit 11 and the personal display units 21 (see FIGS. 6I and 6J).

In a cases where the attendant does not depress the information creation end key 54 during input of information but depresses the operation right button 53 to relinquish the operation right (see FIG. 6K), the contents of input made to the moment of the relinquishment are displayed on the own personal display unit 21 as the information object (see FIG. 6L). Similarly, the contents of the input are displayed on the common display unit 11 and the personal display units 21 of the common information processing apparatus 1 and the other personal information processing apparatuses 2 as the information object (see FIGS. 6M and 6N). As a matter of course, the display of the information input space 61 is turned off.

Figure 7A:
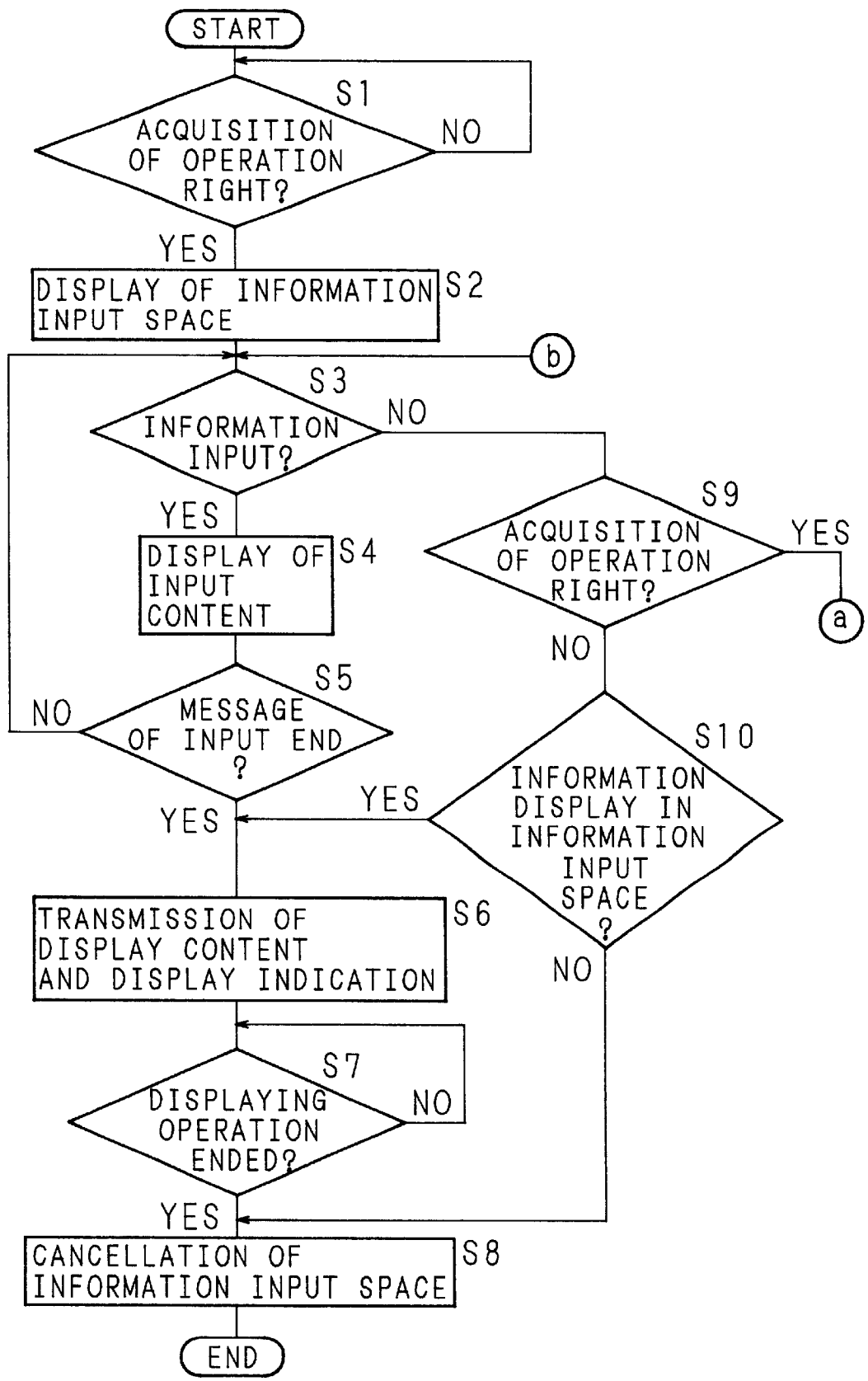
FIGS. 7A and 7B are flow charts showing the procedure of a process according to the first embodiment.
Figure 7B:
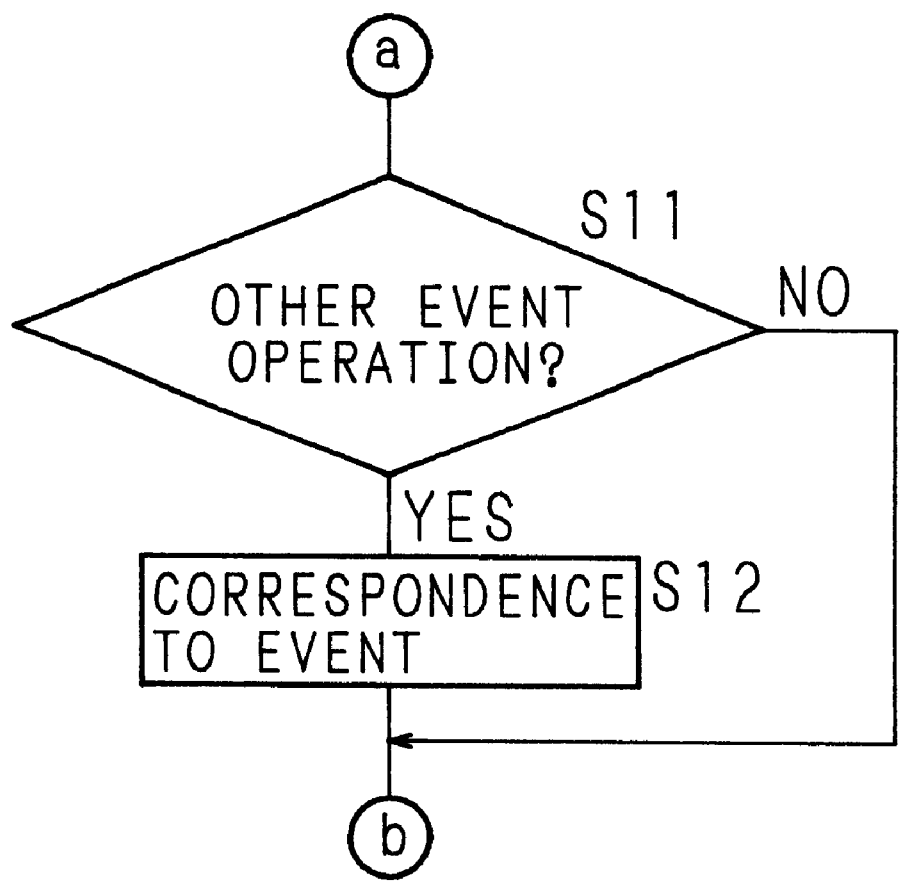

FIGS. 7A and 7B are flow charts of the procedure according to the first embodiment. The information control unit 30 of the information processing unit 23 judges whether the operation right has been acquired (whether not acquired or relinquished) (S1). If the operation right has been acquired, the information input space 61 is displayed on the personal display unit 21 (S2). Then, whether information has been supplied to the information input space 61 is judged (S3). If information has been inputted, the contents of the input are displayed on the information input space 61 (S4). Then, whether completion of the input has been notified is judged in accordance with whether the information creation end key 54 has been depressed (S5). If completion of input has been notified, the contents of the display and an instruction to display the contents are notified to own display processing unit 27 and as well as to the common information processing apparatus 1 and the other personal information processing apparatuses 2 (S6). Then, whether displaying completion notification has been supplied from the other information processing apparatuses 1 and 2 is judged (S7). If the displaying completion notification has been supplied, the information input space 61 of the own personal display unit 21 is turned off (S8), and the sequence process is completed.

If the completion of the input is not notified in step S5, the operation returns to step S3 so that a state for waiting for input of information starts. If no information is inputted in step S3, whether or not the operation right has been acquired is judged (S9). If the operation right is not acquired, whether or not information is displayed on the information input space 61 is judged (S10). If information is displayed, the operation proceeds to step S6. If information is not displayed, the operation proceeds to step S8. If the judgement has been made in step S9 that the operation right has been acquired, whether or not information has been inputted to the common information display surface 14 or an edition operation to the displayed information object has been made is judged (S11). If it has been made, an operation corresponding to the event is performed (S12), and then the operation returns to step S3. If it has not been made, the operation returns to step S3 as it is.

As described above, the first embodiment enables the attendant who acquires the operation right to devotedly input an opinion as information at once without a necessity of arrangement of new information.

SECOND EMBODIMENT

FIGS. 8A to 8C are schematic views showing examples of the operations and display according to the second embodiment of the first aspect of the present invention. Although the first embodiment has the structure such that depression of the information creation end key 54 causes display on the information input space 61 to be always turned off, the second embodiment has a structure that the depression of the information creation end key 54, performed after input of one information item, does not cause to interrupt displaying the information input space 61 unless the operation right is relinquished. Thus, a state for waiting for input of next information is realized.

That is, when an attendant obtained the operation right has turned on the information input space 61 on the own personal display unit 21 to create information (see FIG. 8A) and then depressed the information creation end key 54 to make input completion notification after the completion of the input of one information item (see FIG. 8B), similarly to the first embodiment, information on the information input space 61 is, as the information object, displayed on the common display unit 11 and all of the personal display units 21 of the common information processing apparatus 1 and the personal information processing apparatuses 2. Simultaneously, the display is considered as notification of start of next information creation, and therefore the information input space 61 of the personal display unit 21 of the relevant attendant is not turned off so that new input is waited for (see FIG. 8C). If the attendant does not relinquish the operation right, input of information can again be received.

Figure 9A:
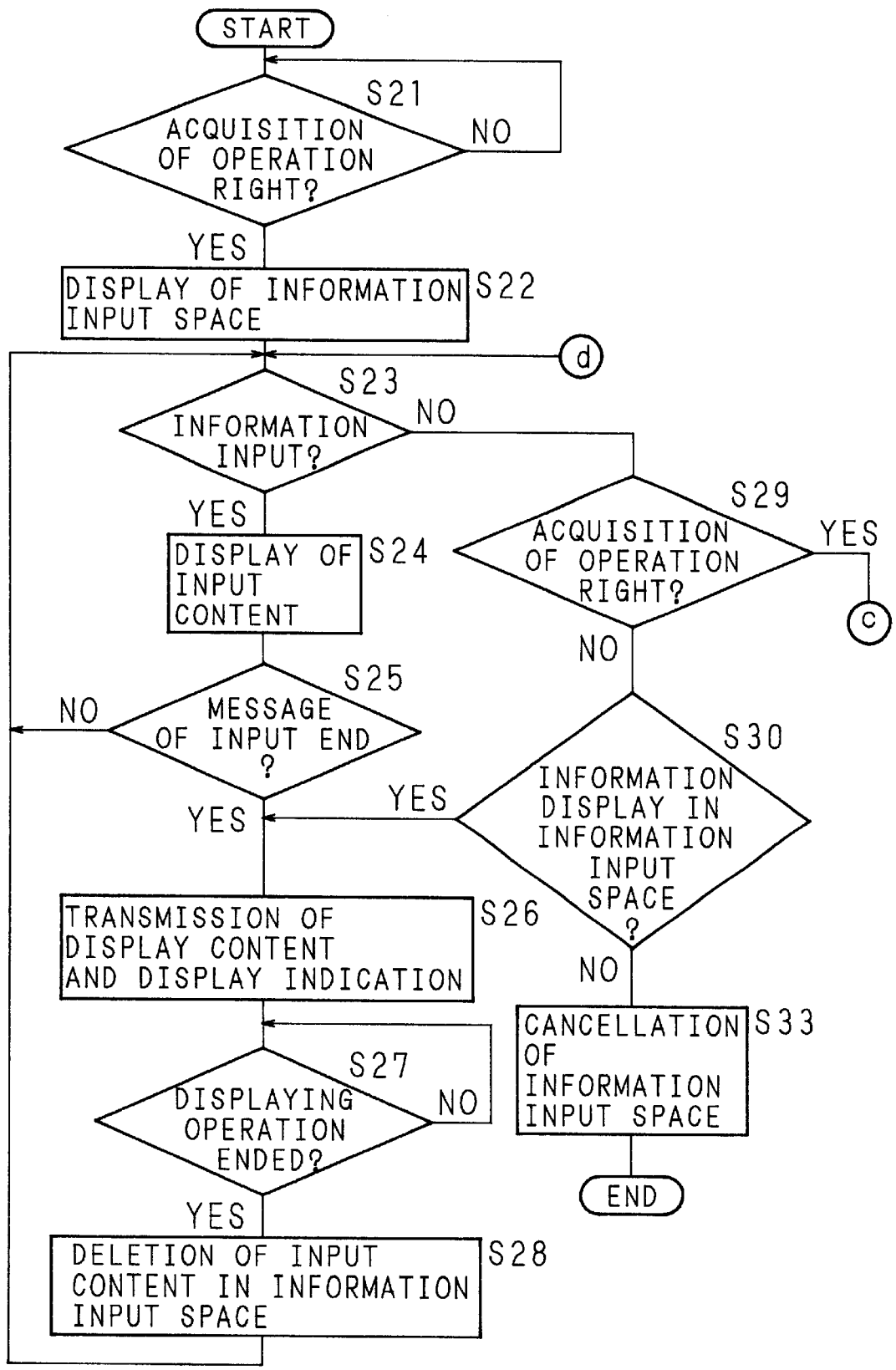
FIGS. 9A and 9B are flow charts showing the procedure of a process according to the second embodiment.
Figure 9B:
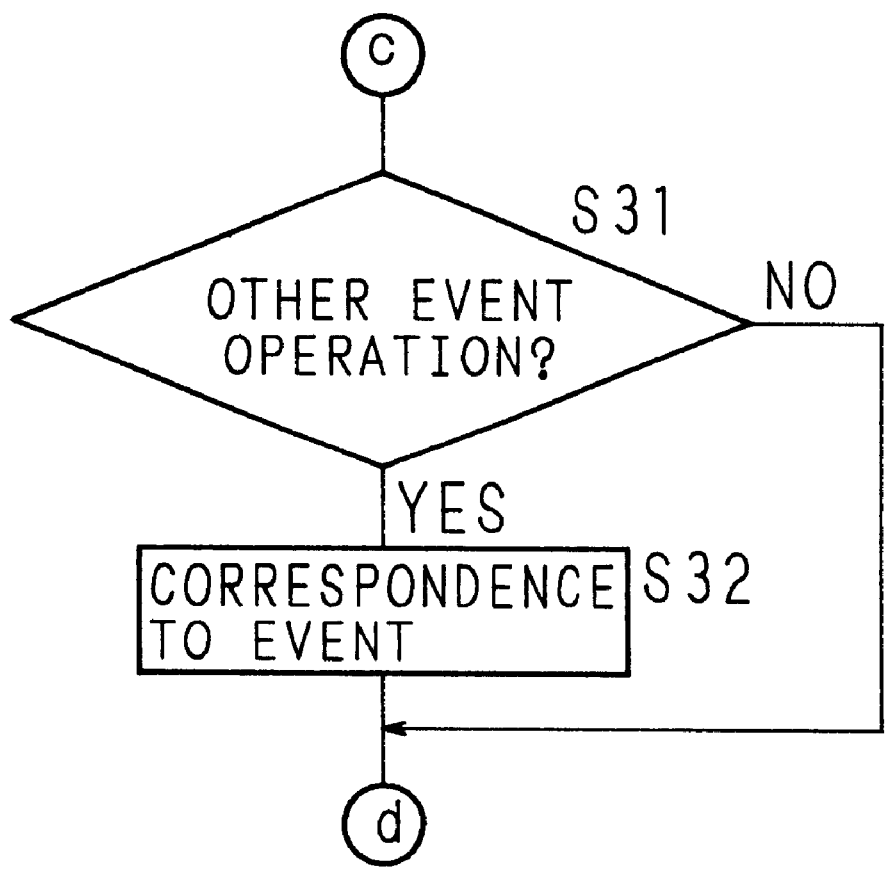

FIGS. 9A and 9B are flow charts showing the procedure of the operation according to the second embodiment. If the operation right has been acquired (S21), the information control unit 30 of the information processing unit 23 displays the information input space 61 on the personal display unit 21 (S22). Then, whether or not information has been inputted to the information input space 61 is judged (S23). If information has been inputted, the contents of the input are displayed on the information input space 61 (S24). Then, whether or not completion of the input has been notified is judged (S25). If the completion of the input has been notified, the contents of the display and an instruction to perform the display are notified to the own display processing unit 27 and are transmitted to the common information processing apparatus 1 and the other personal information processing apparatuses 2 (S26). When displaying completion notification has been received from the other information processing apparatuses 1 and 2 (S27), the input contents displayed on the information input space 61 of the own personal display unit 21 are deleted (S28). Then, the operation returns to step S23 so that new input of information is waited for.

If completion of the input is not notified in step S25, the operation returns to step S23 so that input of information is waited for. If input of information is not performed in step S23, whether or not the operation right has been acquired is judged (S29). If the operation right has been acquired, whether or not information has been inputted to the common information display surface 14 or an operation for editing the information object is performed is judged (S31). If the information input or the editing operation has been made, an operation corresponding to the event is performed (S32), and then the operation returns to step S23. If it has not been made, the operation directly returns to step S23. In a case where the operation right has not been acquired in step S29, whether or not information has been displayed on the information input space 61 is judged (S30). If information has been displayed, the operation proceeds to step S26. If information is not displayed, display of the information input space 61 of the own personal display unit 21 is stopped (S33). Then, the sequential process is completed.

As described above, the second embodiment enables an attendant who has once acquired the operation right to successively display some information objects on the common information display surfaces 14 and 24.

THIRD EMBODIMENT

FIGS. 10A to 10J are schematic views showing examples of the operations and display according to the third embodiment of the first aspect of the present invention. According to the third embodiment, when an attendant displays an information object created newly, a position at which the current information object is displayed is automatically determined in accordance with the position, at which the information object created previously has been displayed, and the length of the information object created this time.

Figure 10A:
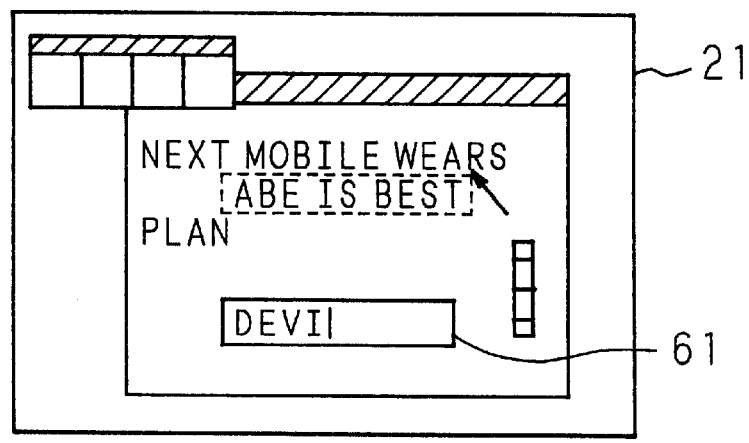
FIGS. 10A to 10J are schematic views showing examples of the operations and display according to the third embodiment.
Figure 10B:
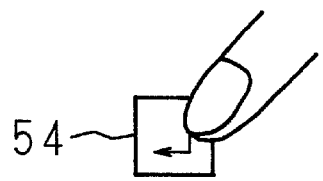
Figure 10C:
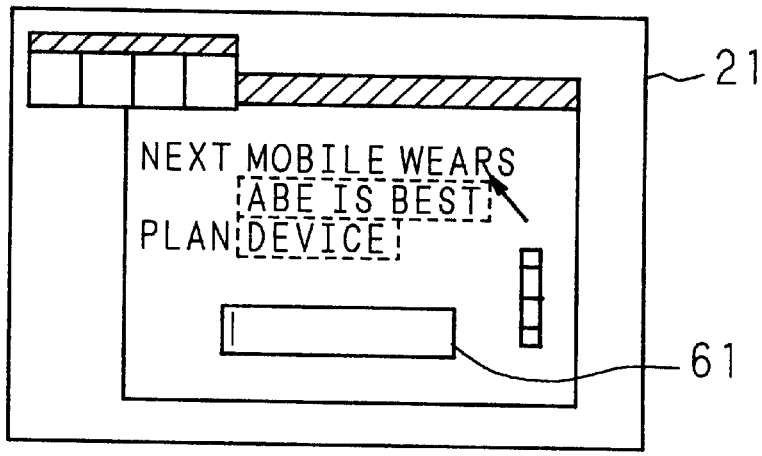
Figure 10D:
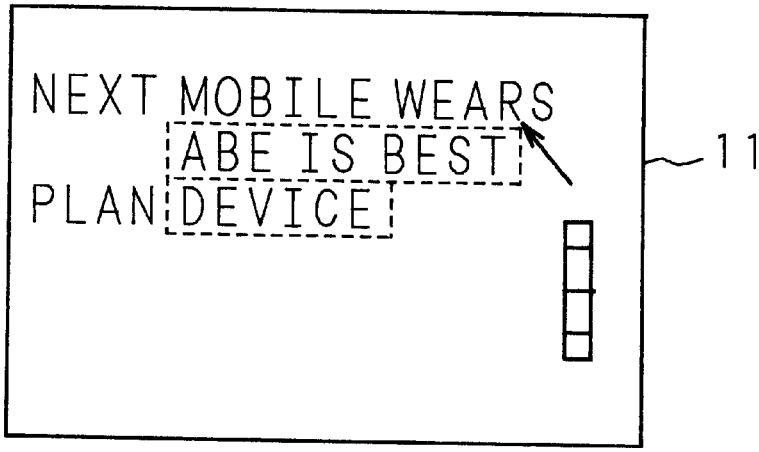
Figure 10E:
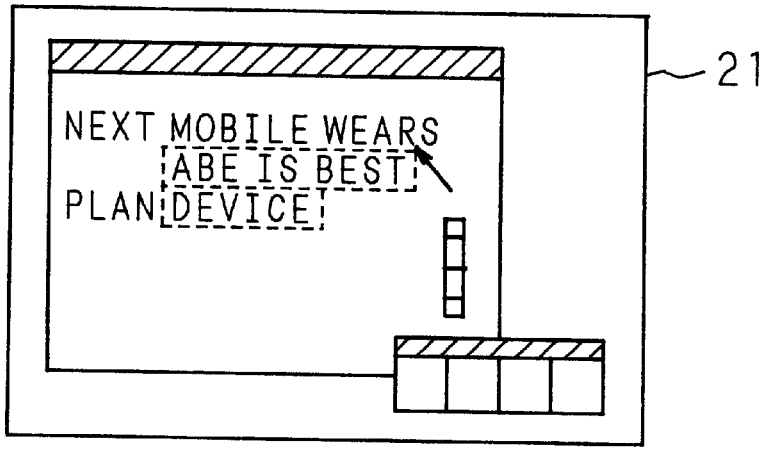

When an attendant has inputted a certain information item so that the information item has been displayed on the common display unit 11 and all of the personal display units 21 as information objects and then the attendant has started input of new information item onto the residual information input space 61 as is performed in the second embodiment, the information item is displayed (see FIG. 10A). When input of the new information item has been completed and then the attendant has depressed the information creation end key 54 (see FIG. 10B), the newly created information object is automatically disposed and displayed below the previous information object displayed immediately before in the own personal display unit 21, the common display unit 11 and the other personal display units 21 (see FIGS. 10C, 10D and 10E). Then, the information input space 61 is again made to wait for new input. In the foregoing case, since the blank portion on the right side of the previous information object is shorter than the length of the current information object and therefore a sufficient display space cannot be obtained, the current information object is disposed below the previous information object.

Figure 10F:
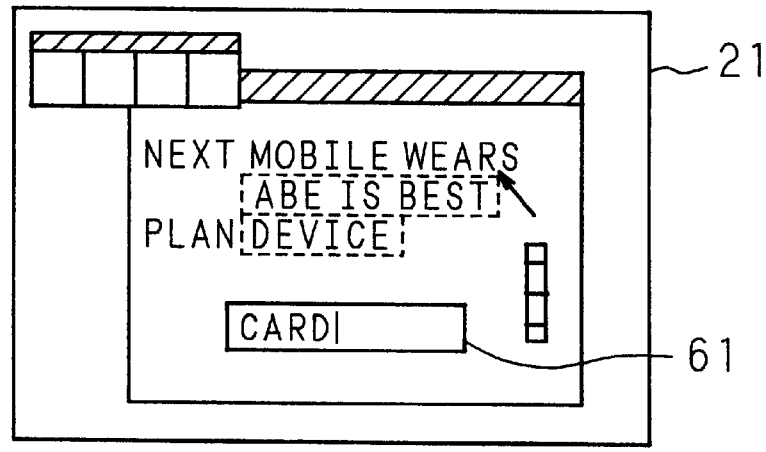
Figure 10G:
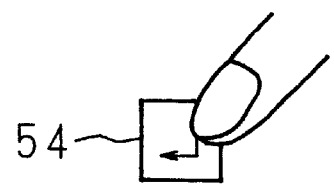
Figure 10H:
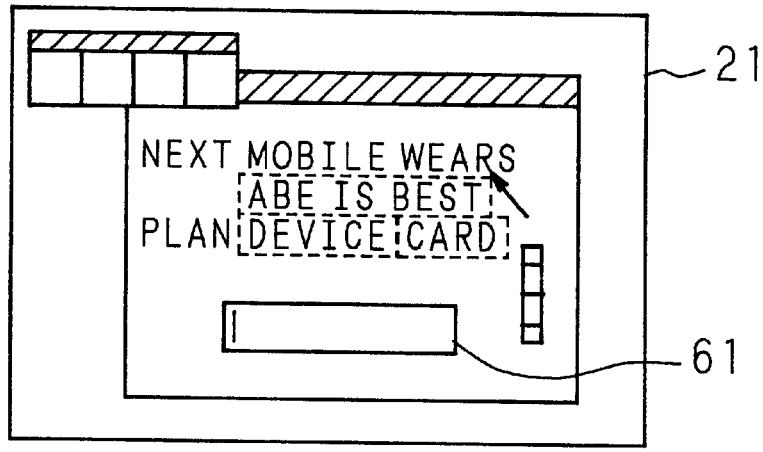
Figure 10I:
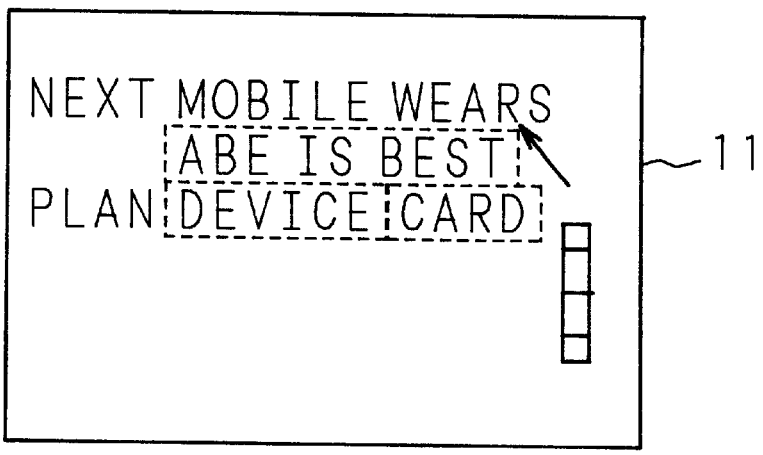
Figure 10J:
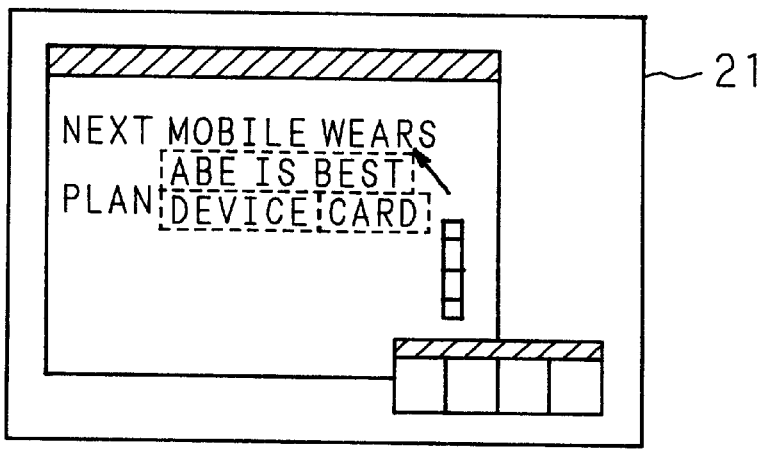

Then, input of new information item to the information input space 61 has been started, the information item is displayed (see FIG. 10F). When input of the new information item has been completed and then the information creation end key 54 has been depressed (see FIG. 10G), the new information object is, on the own personal display unit 21, the common display unit 11 and the other personal display units 21, displayed on the right side of the previous information object displayed immediately before (see FIGS. 10H, 10I and 10J). Then, the information input space 61 is again made to wait for new input. In this case, since the blank portion on the right side of the previous information object is longer than that of the current information object and therefore a sufficiently large display space can be obtained, the current information object is displayed on the right side of the previous information object.

Figure 11A:
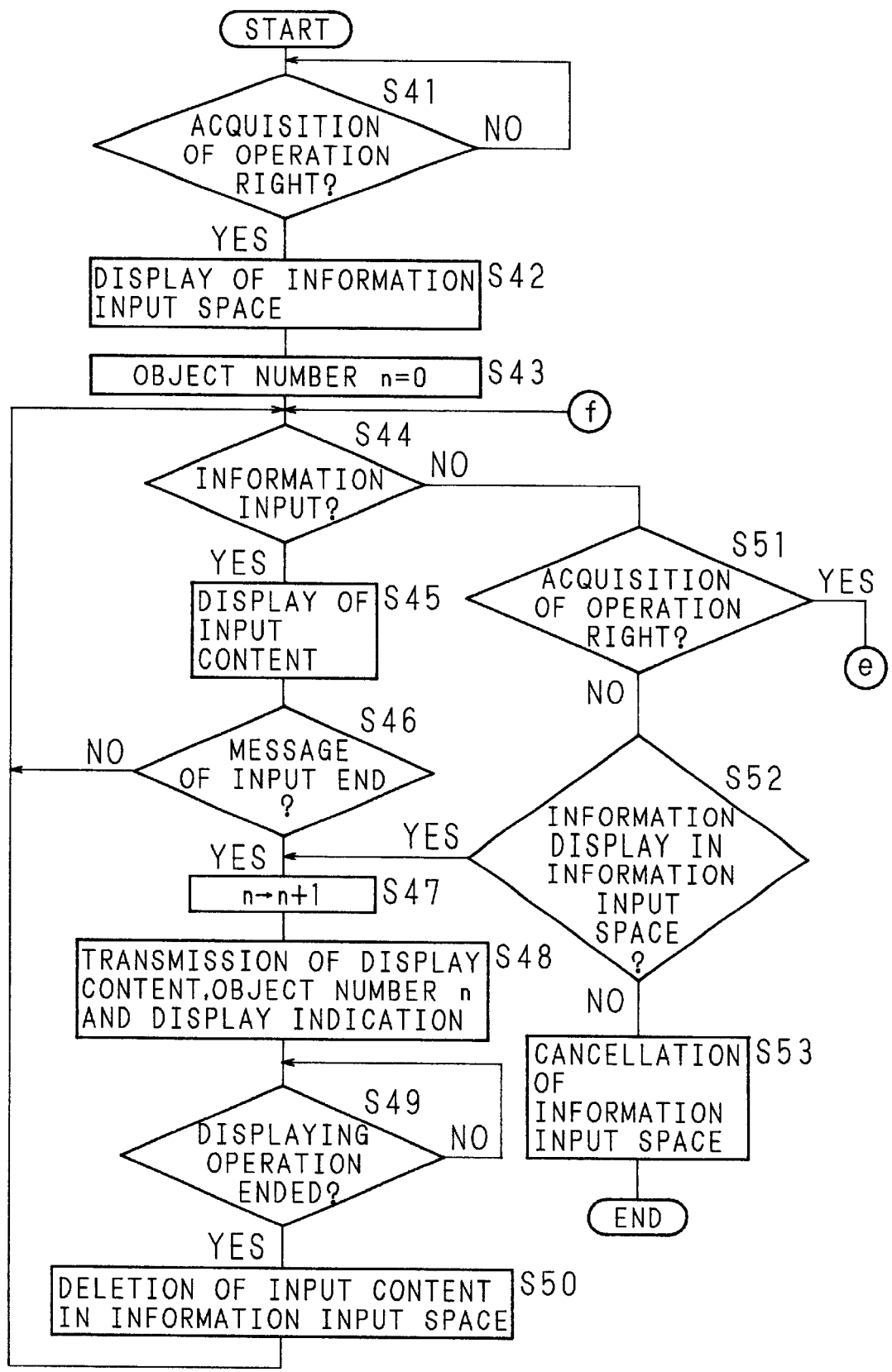
FIGS. 11A and 11B are flow charts showing the procedure of a process according to the third embodiment.
Figure 11B:
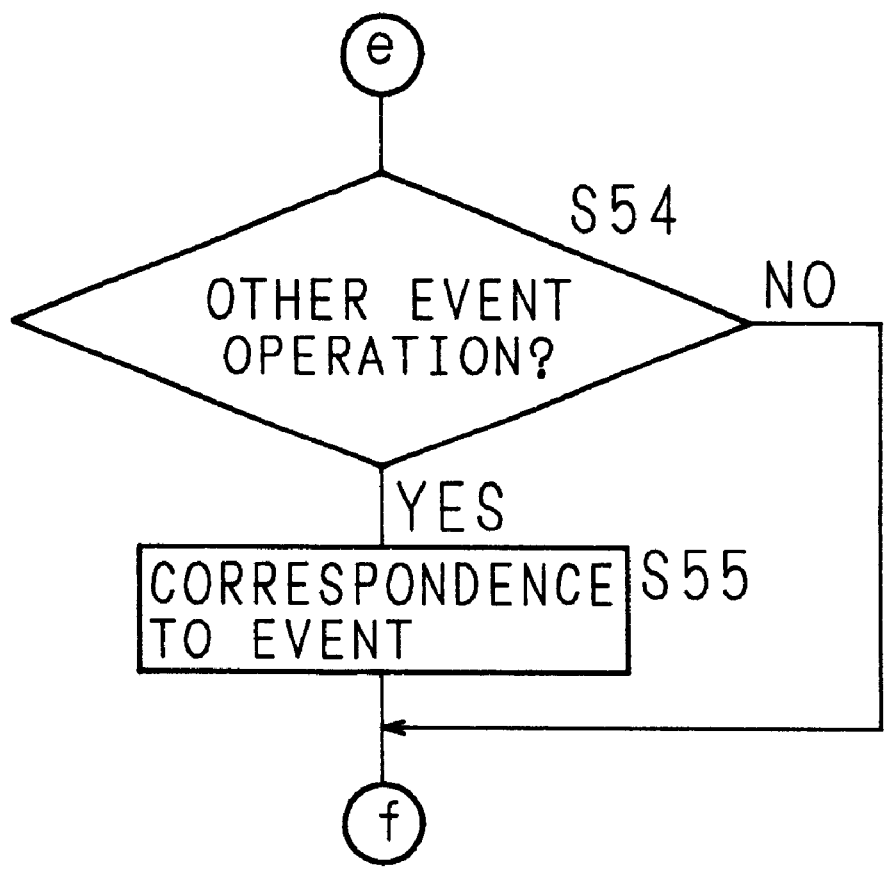

FIGS. 11A and 11B are flow charts showing the procedure of the operation according to the third embodiment. If the operation right has been acquired (S41), the information input space 61 is displayed on the personal display unit 21 (S42) and zero is set to object number n (S43). Then, whether or not information has been inputted to the information input space 61 is judged (S44). If information has been inputted, the contents of the input are displayed on the information input space 61 (S45). Then, whether or not completion of the input has been notified is judged (S46). If the completion of the input has been notified, 1 is automatically added to object number n (S47). Then, object number n, the contents of the display and an instruction to perform the display are notified to the own display processing unit 27 and to the common information processing apparatus 1 and the other personal information processing apparatuses 2 (S48). Note that whether the new information object is displayed below the previous information object or on the right side of the same is automatically determined. The determination process will be described later.

When displaying completion notification has been supplied from the other information processing apparatuses 1 and 2 (S49), the contents of the input displayed on the information input space 61 of the own personal display unit 21 are deleted (S50). Then, the operation returns to step S44 so that input of a next new information item is waited for. If completion of the input has not been notified, the operation returns to step S44 so that input of information is waited for. If information has not been inputted in step S44, whether or not the operation right has been acquired is judged (S51). If the operation right has been acquired, whether or not input of information to the common information display surface 14 has been made or an editing operation with respect to the information object has been performed is judged (S54). If it has been made, an operation corresponding to it is performed (S55), and then the operation returns to step S44. If the information input or the editing operation has been performed, the operation directly returns to step S44.

If the operation right has not been acquired in step S51, whether or not information has been displayed on the information input space 61 is determined (S52). If information has been displayed, the operation proceeds to step S47. If information has not been displayed, display of the information input space 61 on the own personal display unit 21 is stopped (S53). Thus, the sequential process is completed.

Figure 12:
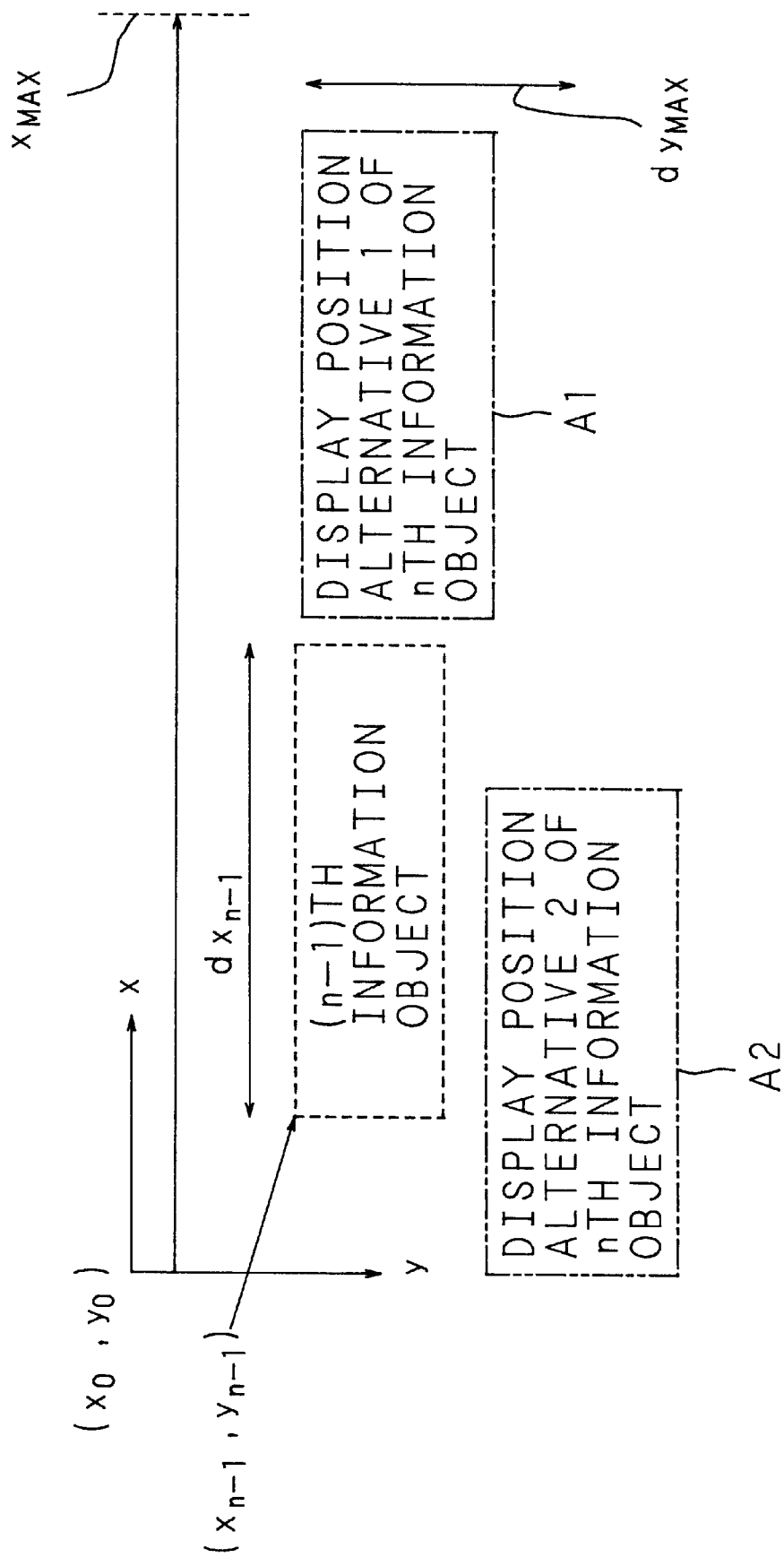
FIG. 12 is a diagram showing the coordinates of a display surface according to the third embodiment.

FIG. 12 is a view showing coordinates of the display surface for explaining the foregoing automatic determining process. Referring to FIG. 12, coordinates ($x_0$, $y_0$) is coordinates of a position at which display of the first information object is started, coordinates ($x_{n-1}$, $y_{n-1}$) are those of a position at which display of the previous (n−1)th information object is started, $dx_{n-1}$ indicates the length of the information object, $x_{MAX}$ is the x-coordinate of the display limit in the direction x, $dy_{MAX}$ indicates the maximum length of previous information objects in the direction y displayed by using $y_{n-1}$ as a reference. As the region for displaying the n-th information object of the current information object to be displayed next to the (n−1)th information object of the previous information object, a region (first region alternative A1 indicated by an alternate long and short dash line) on the right side of the (n−1)th information object or a region (second region alternative A2 indicated by an alternate lone and two short dashes line) below the (n−1)th information object is selected in accordance with the coordinates ($x_{n-1}$, $y_{n-1}$), the length $dx_{n-1}$ and the length $dx_n$ of the current information object.

Figure 13:
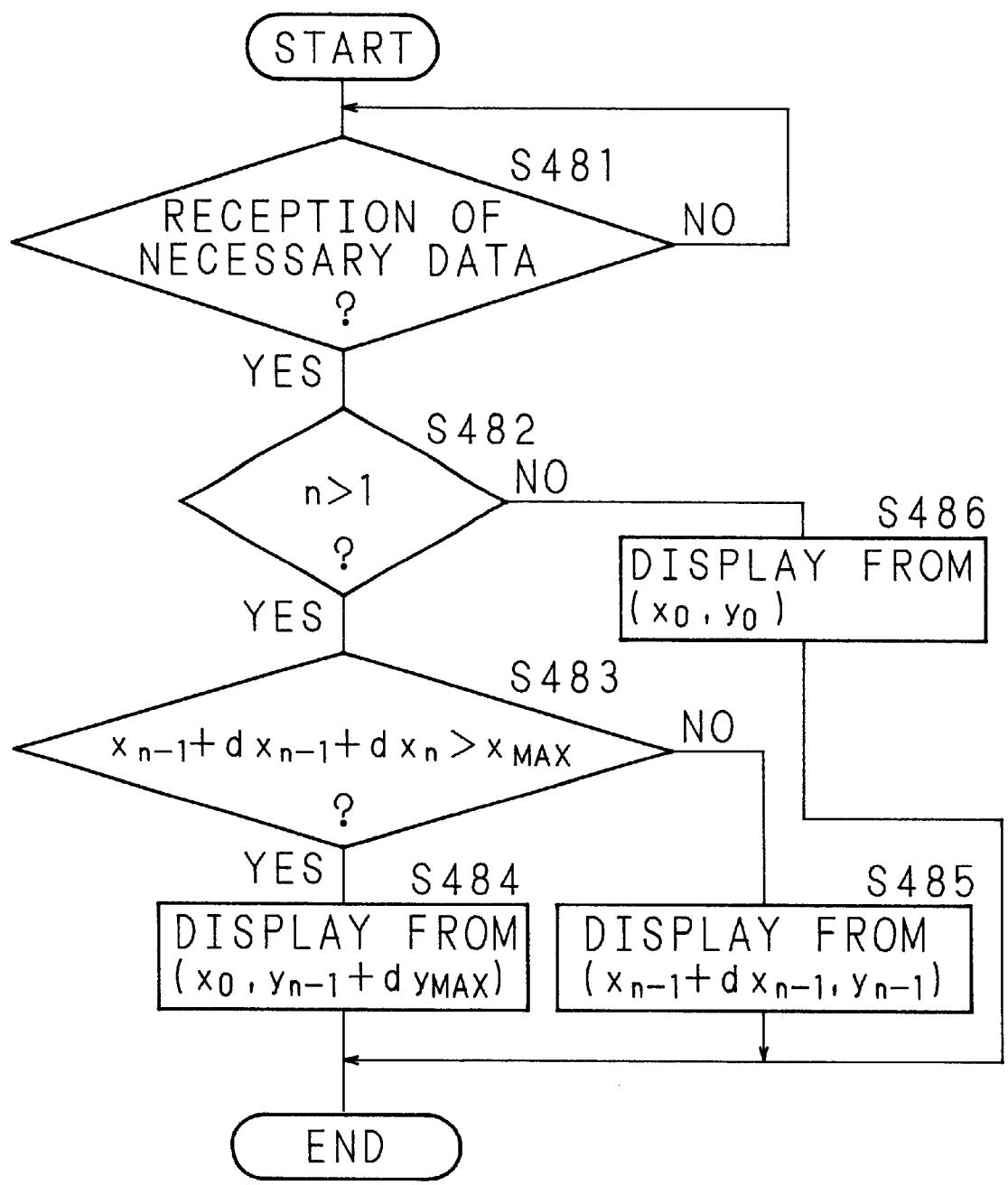
FIG. 13 is a flow chart showing the procedure of a process (the sub-routine of FIG. 11A) according to the third embodiment.

FIG. 13 is a flow chart showing the procedure (a subroutine of step S48 shown in FIG. 11A) of a process for automatically determining the display position of the information object in the display processing unit 27. Initially, whether or not object number n, the contents of the information object and an instruction of display have been received is judged (S481). If they have been received, whether or not n is larger than 1 is judged (S482). If n is larger than 1, whether or not value of $x_{n-1}+dx_{n-1}+dx_n$ is larger than that of $x_{max}$ is judged (S483). If the foregoing value is larger, a satisfactory large blank space cannot be obtained on the right side of the (n−1)th information object received previously. Therefore, the coordinates $(x_0, y_{n-1}+dy_{MAX})$ are employed as the start position to display the n-th information object to be displayed this time (S484). If the value is smaller in step S483, the blank space on the right side of the (n−1)th information object is used to display the n-th information object to be displayed this time in such a manner that the coordinates $(x_{n-1}+dx_{n-1}, y_{n-1})$ are used as the start position (S485). If n is not larger than 1 in step S482, the information object is an information object which must be displayed first. Therefore, the n-th information object to be displayed this time is displayed by using the coordinates $(x_0, y_0)$ as the start position (S486).

Thus, the third embodiment has the structure such that the attendant successively displays some information objects by effectively using the space in the common information display surfaces 14 and 24. Therefore, some information objects can easily be presented.

FOURTH EMBODIMENT

FIGS. 14A to 14L are schematic views showing examples of the operations and display according to the fourth embodiment of the first aspect of the present invention. In the fourth embodiment, when a certain attendant has obtained an operation right, the information input space 61 is displayed on all of the common display unit 11 and the personal display units 21 as well as the relevant personal display unit 21. Thus, all of the attendants are able to observe the process for creating information by the attendant having the operation right.

Figure 14A:
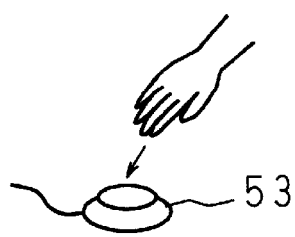
FIGS. 14A to 14L are schematic views showing examples of the operations and display according to the fourth embodiment.
Figure 14B:
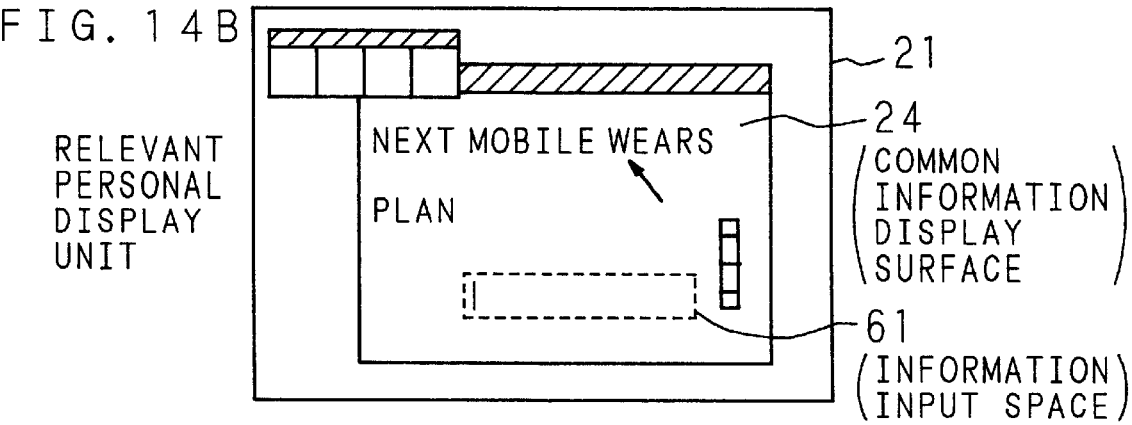
Figure 14C:
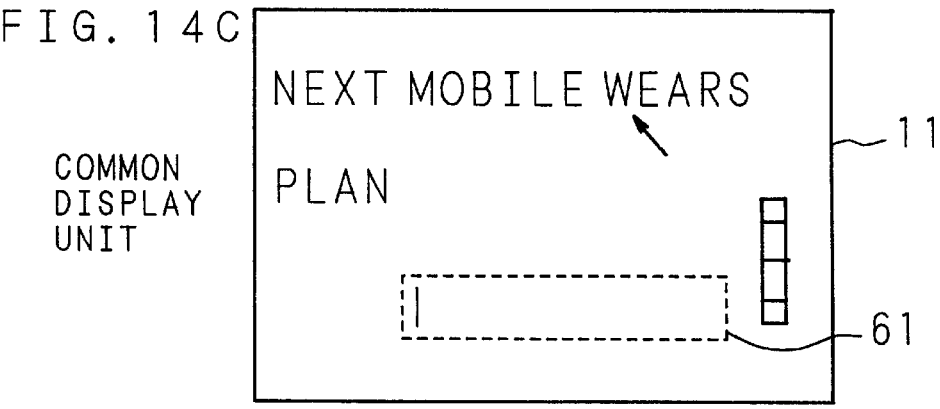
Figure 14D:
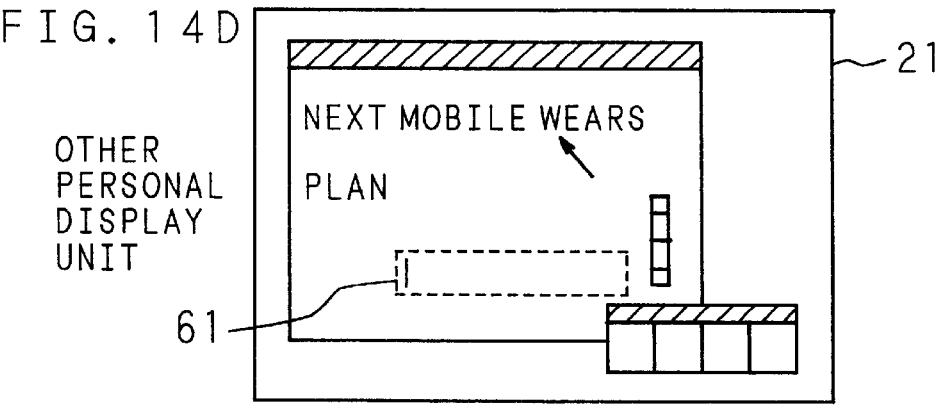
Figure 14E:
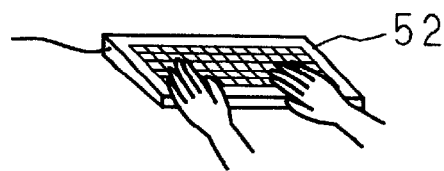

When a certain attendant has depressed the operation right button 53 and therefore has acquired the operation right (see FIG. 14A), the information input space 61 in a state for waiting a new input is displayed on the personal display unit 21 of the relevant attendant (see FIG. 14B). Simultaneously, the information input space 61 is displayed on the common display unit 11 and the personal display units 21 of the other attendants (see FIGS. 14C and 14D). However, information cannot be inputted to the information input spaces 61 except that for the relevant attendant. Since this embodiment has the structure such that common information is displayed on only the common information display surfaces 14 and 24, the information input space 61 is, in the display units 11 and 21, displayed on the common information display surfaces 14 and 24 which has been displayed. In order to make information, which is being created, to be recognized as an information object, the boundary line of the information input space 61 has the same design as that of the information object. Thus, the design of the boundary line is different from that according to the first to third embodiments.

Figure 14F:
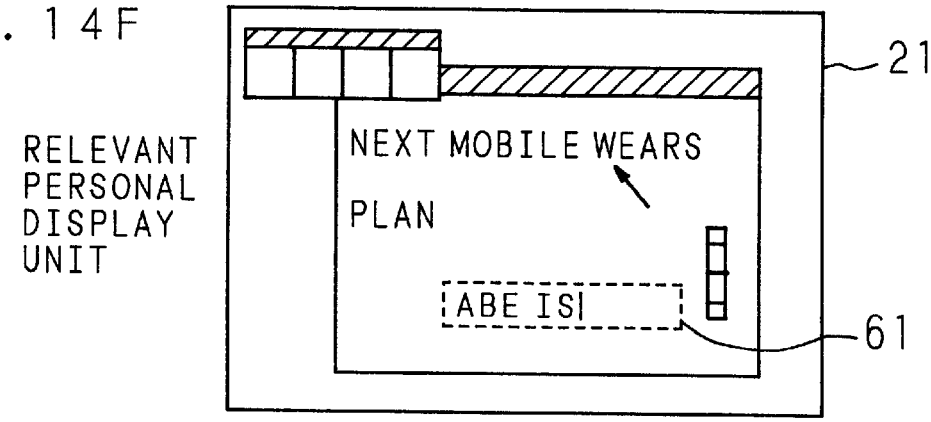
Figure 14G:
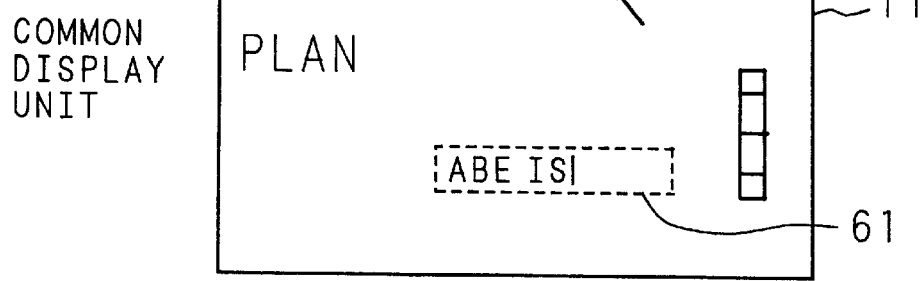
Figure 14H:
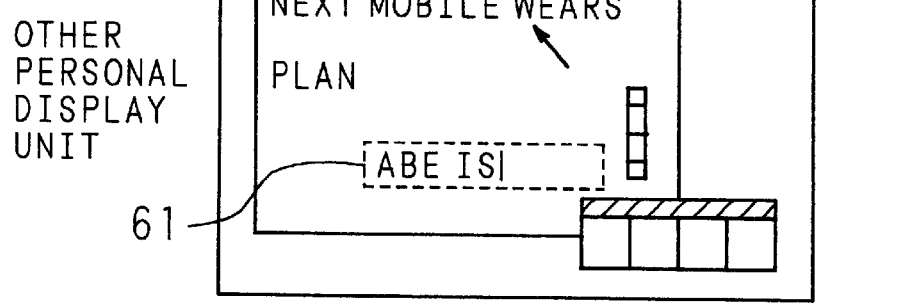
Figure 14I:
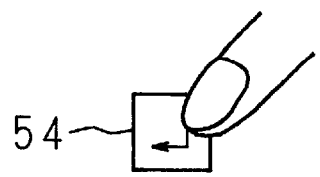
Figure 14J:
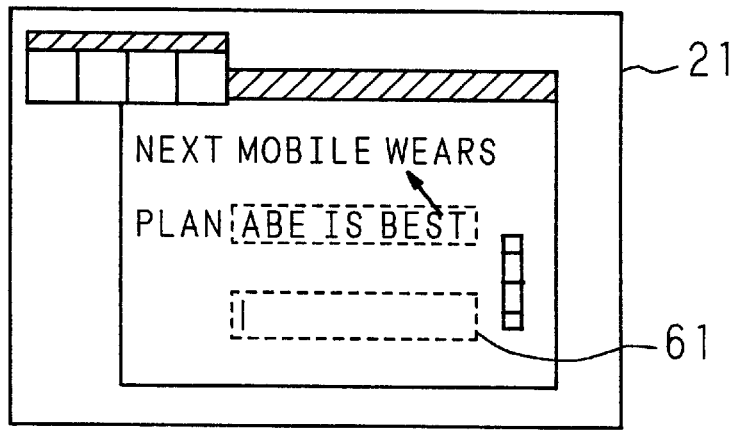
Figure 14K:
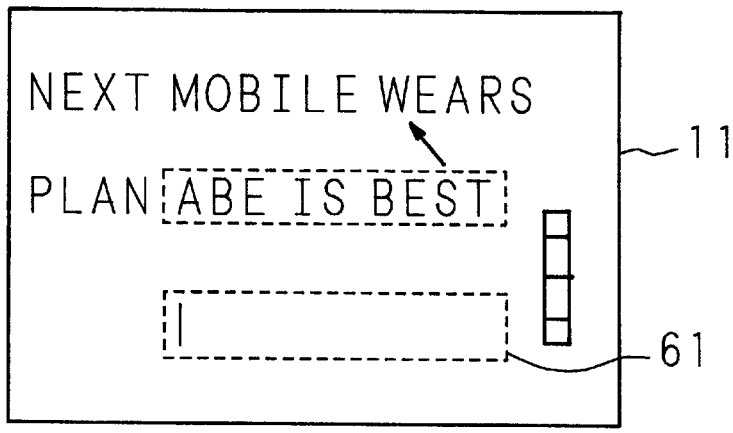
Figure 14L:
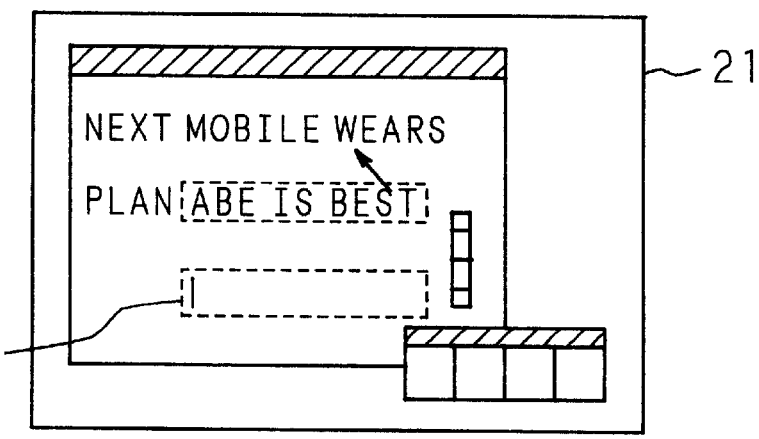

When a certain attendant has started inputting information through the keyboard 52 (see FIG. 14E), input information is displayed on the information input space 61 of the personal display unit 21 of the relevant attendant (see FIG. 14F). Simultaneously, input information is displayed on the information input spaces 61 of the common display unit 11 and all of the other personal display units 21 (see FIGS. 14G and 14H). When the attendant has depressed the information creation end key 54 after information has been inputted (see FIG. 14I), information inputted to the information input space 61 is, in the personal display unit 21 of the relevant attendant, independently displayed on the common information display surface 24 of the personal display unit 21 as an information object (see FIG. 14J). Similarly, the input information is displayed on the common display unit 11 and the common information display surfaces 24 of all of the other personal display units 21 (see FIG. 14K and 14L). The information input space 61 is brought to a state where new input is waited for, this state being also displayed on all of the display units 11 and 21.

Figure 15A:
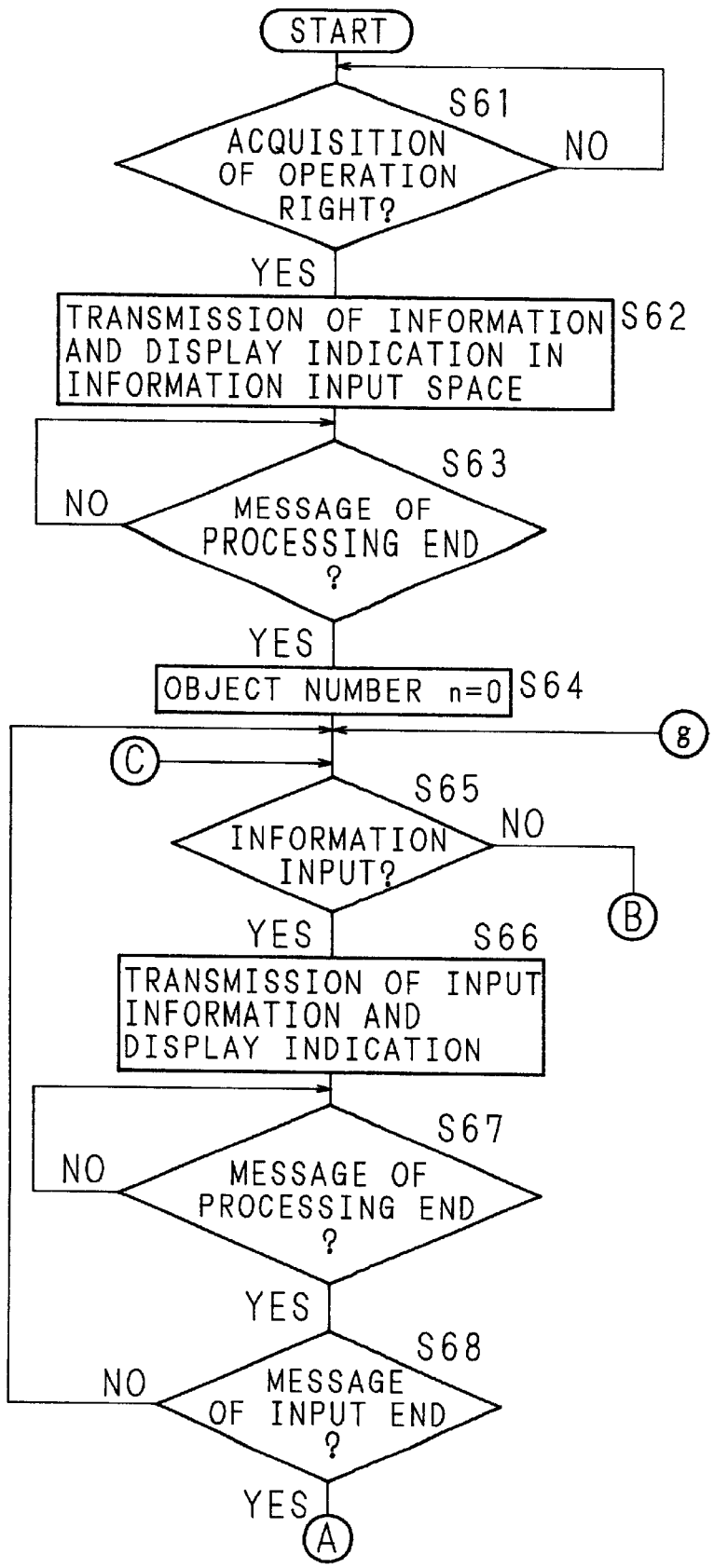
FIGS. 15A to 15C are flow charts showing the procedure of a process according to the fourth embodiment.
Figure 15B:
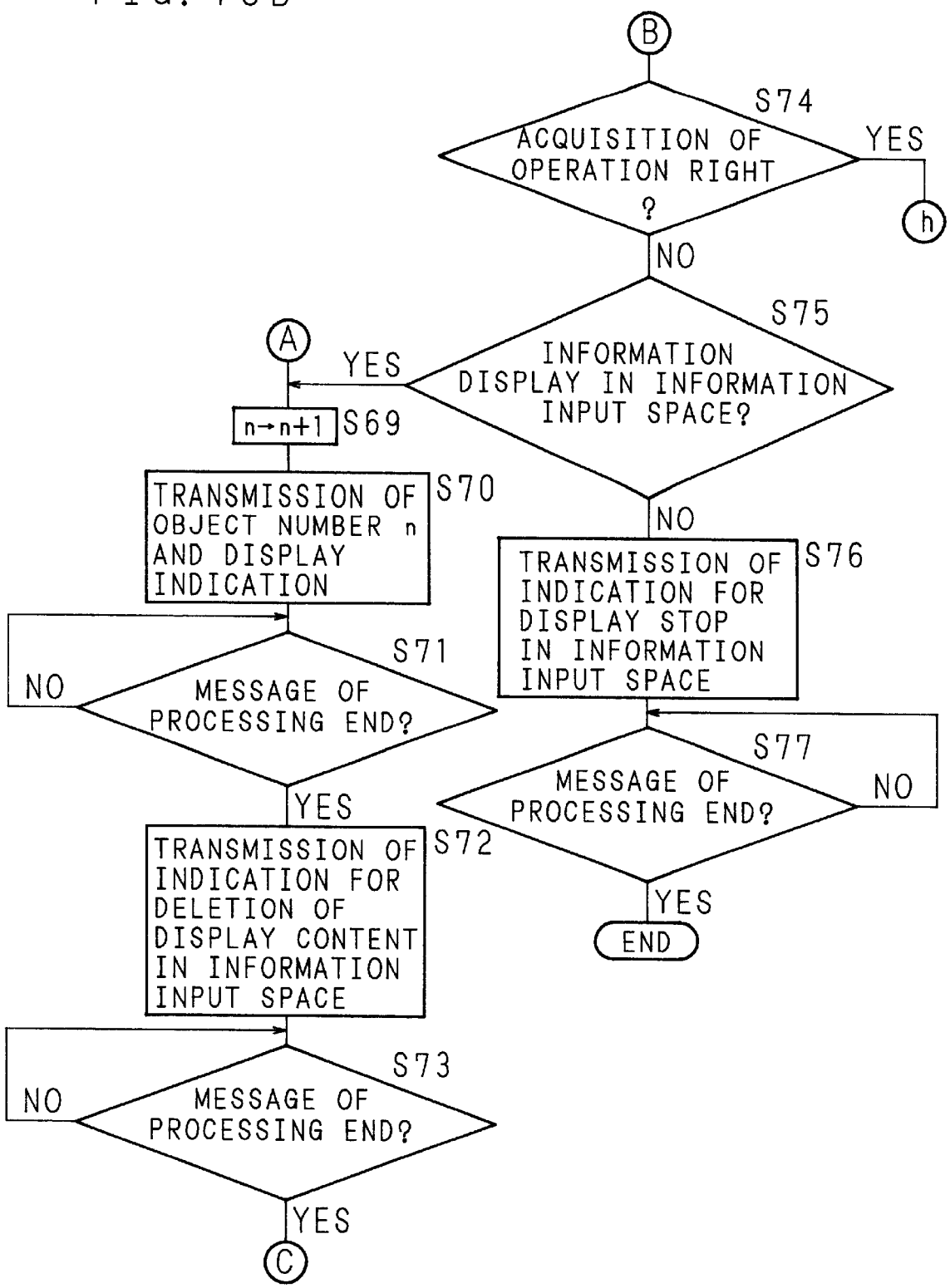
Figure 15C:
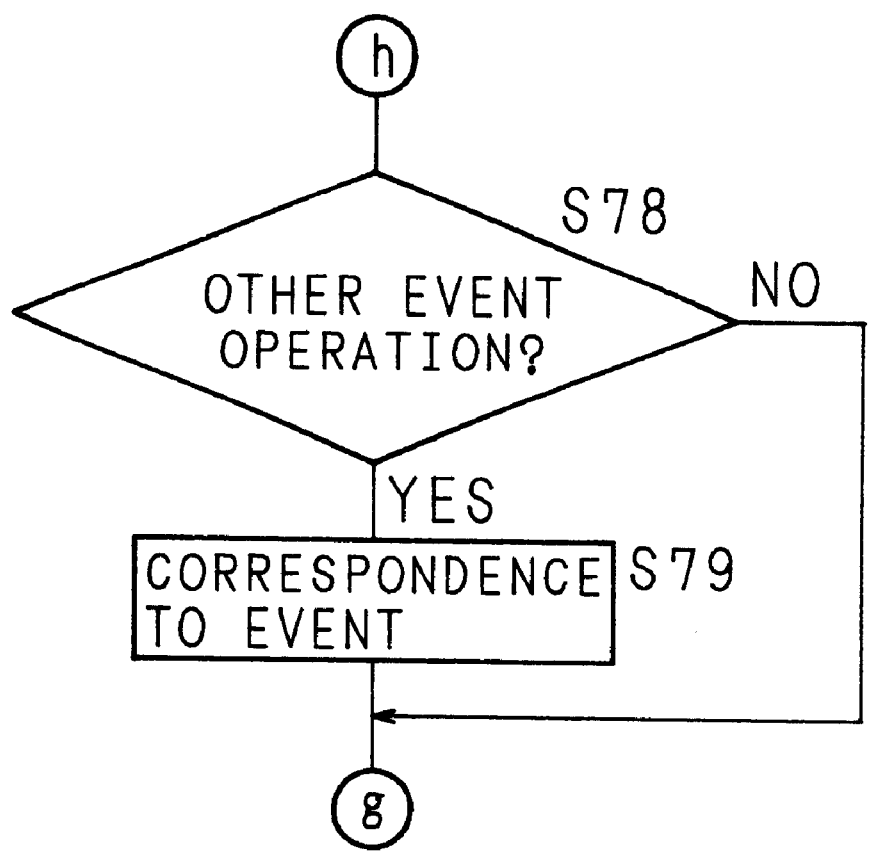

FIGS. 15A to 15C are flow charts showing the procedure of the operation according to the fourth embodiment. Initially, whether or not the operation right has been acquired is judged (S61). If the operation right has been acquired in step S61, an instruction to display the information input space 61 on the common information display surfaces 14 and 24 is notified to the own display processing unit 27 and to the other information processing apparatuses 1 and 2 (S62). Then, whether or not notification of completion of the instructed process has been supplied from the other information processing apparatuses 1 and 2 is judged (S63). If the notification of the completion has been supplied, zero is set to the object number n (S64). Then, whether or not information has been inputted to the information input space 61 is judged (S65). If information has been inputted, the contents of the input and an instruction to perform display on the information input space 61 are notified to the own display processing unit 27 and transmitted to the other information processing apparatuses 1 and 2 (S66).

When completion of the instructed process has been notified from the other information processing apparatuses 1 and 2 (S67), whether or not completion of the input has been notified is judged in accordance with whether or not the information creation end key 54 has been depressed (S68). If completion of the input has been notified, 1 is automatically added to the object number n (S69). Then, object number n and an instruction to display the object are notified to the own display processing unit 27 and transmitted to the other information processing apparatuses 1 and 2 (S70). When completion of the instructed process has been notified from the other information processing apparatuses 1 and 2 (S71), an instruction to delete the contents displayed on the information input space 61 is notified to the own display processing unit 27 and transmitted to the other information processing apparatuses 1 and 2 (S72). When completion of the instructed process has been notified from the other information processing apparatuses 1 and 2 (S73), the operation returns to step S65 so that input of new information item is waited for. If completion of the input has not been notified in step S68, the operation returns to step S65 so that input of information is waited for.

If information has not been inputted in step S65, whether or not the operation right has been acquired is judged (S74). If the operation right has been acquired, whether or not information has been inputted to the common information display surface 14 or an operation to edit the displayed information object has been performed is judged (S78). If information input or the editing operation has been performed, an operation corresponding to the event is performed (S79). Then, the operation returns to step S65. If it has not been performed, the operation directly returns to step S65. If the operation right has not been acquired in step S74, whether or not input information has been displayed on the information input space 61 is judged (S75). If input information has been displayed, the operation proceeds to step S69. If it has not been displayed, an instruction to stop the display of the information input space 61 is notified to the own display processing unit 27 and transmitted to the other information processing apparatuses 1 and 2 (S76). When completion of the instructed process has been notified from the other information processing apparatuses 1 and 2 (S77), the sequential process is completed. As described above, the fourth embodiment enables information to be processed while permitting all of the attendants to look at the process of creating information from a moment at which a certain attendant has obtained the operation right to relinquish.

FIFTH EMBODIMENT

FIGS. 16A to 16K are schematic views showing examples of the operations and display of the fifth embodiment of the first aspect of the present invention. In the fifth embodiment, a certain attendant is permitted to use the information input space to create personal information in a case where the attendant has not acquired the operation right. When the attendant then acquires the operation right, the created personal information can be, as a common information object, displayed on all of the common display unit 11 and the personal display units 21.

Figure 16A:
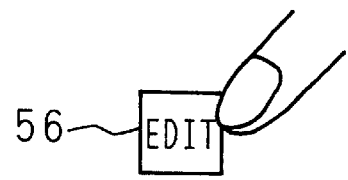
FIGS. 16A to 16K are schematic views showing examples of the operations and display according to the fifth embodiment.
Figure 16B:
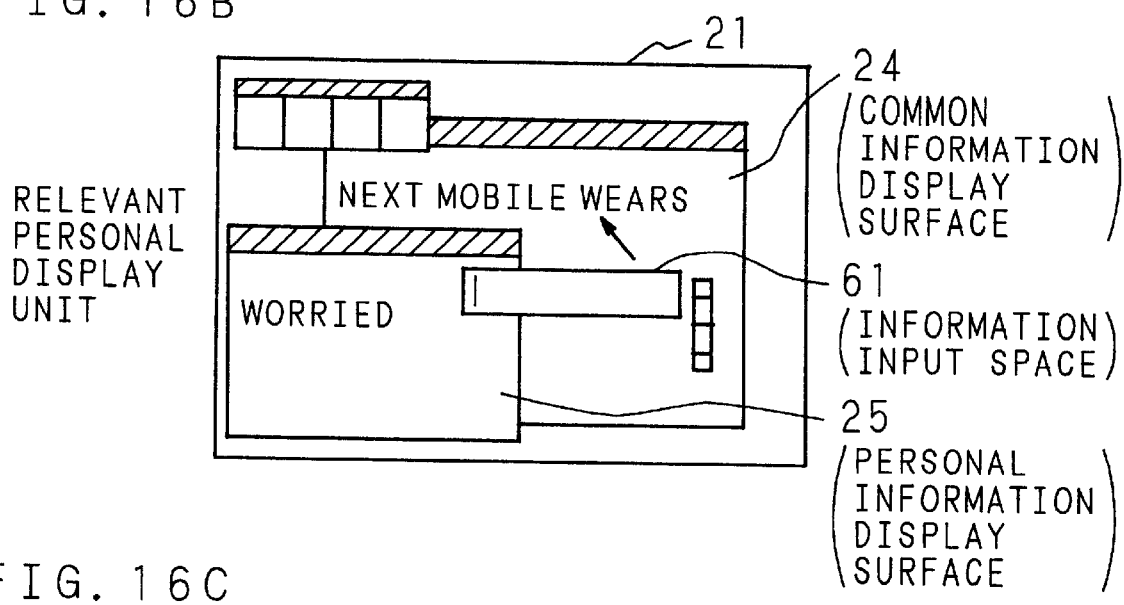
Figure 16C:
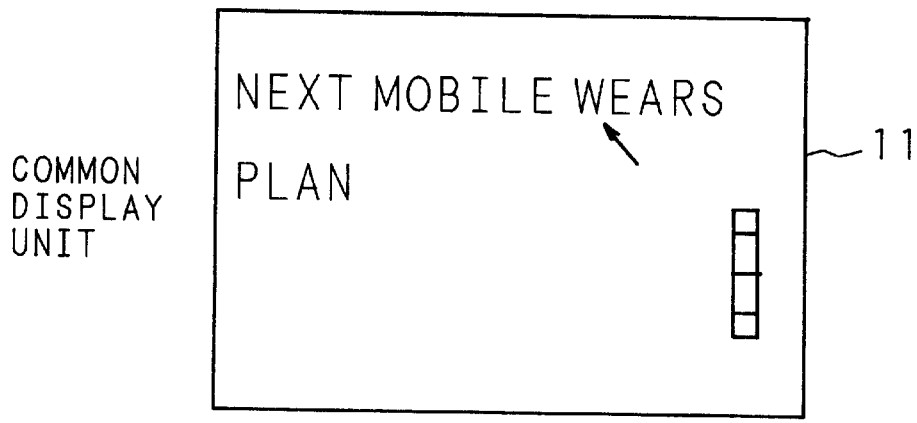
Figure 16D:
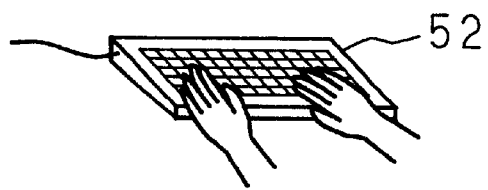

When a certain attendant, who has not acquired the operation right, has depressed the local start/end key 56 (see FIG. 16A), the information input space 61 is displayed on the personal display unit 21 of the relevant attendant at an arbitrary position in a state where the information input space 61 is waited for new input (see FIG. 16B). In this embodiment, the information input space 61 is displayed across the common information display surface 24 and the personal information display surface 25. Since the foregoing operation is a personal operation, nothing is displayed on the common display unit 11 and the other personal display units 21 (see FIG. 16C). When the relevant attendant has inputted onto the information input space 61 a character by using the keyboard 52 (see FIG. 16D), input information is displayed on the information input space 61 of the personal display unit 21 (see FIG. 16E).

Figure 16E:
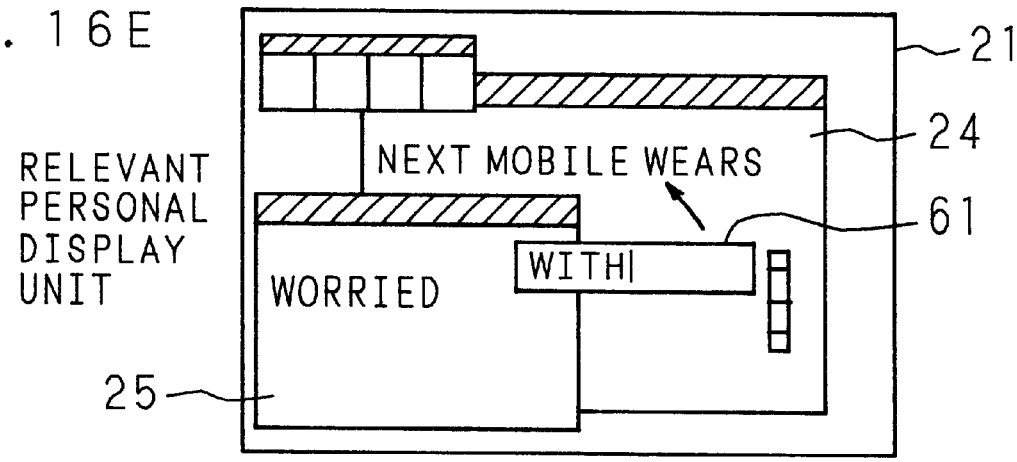
Figure 16F:
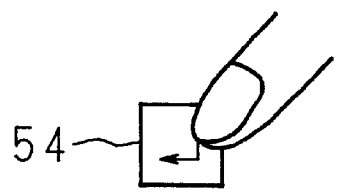
Figure 16G:
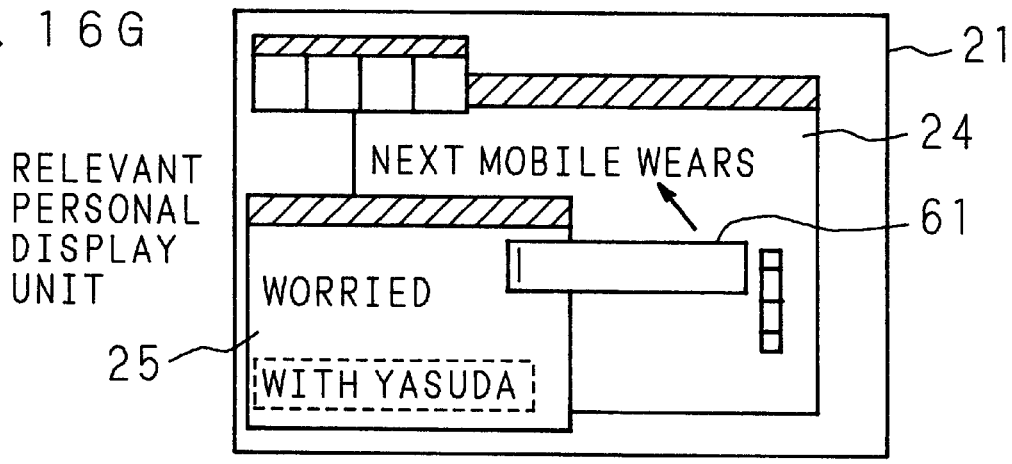
Figure 16H:
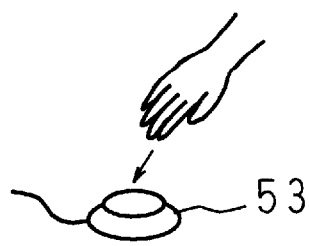
Figure 16I:
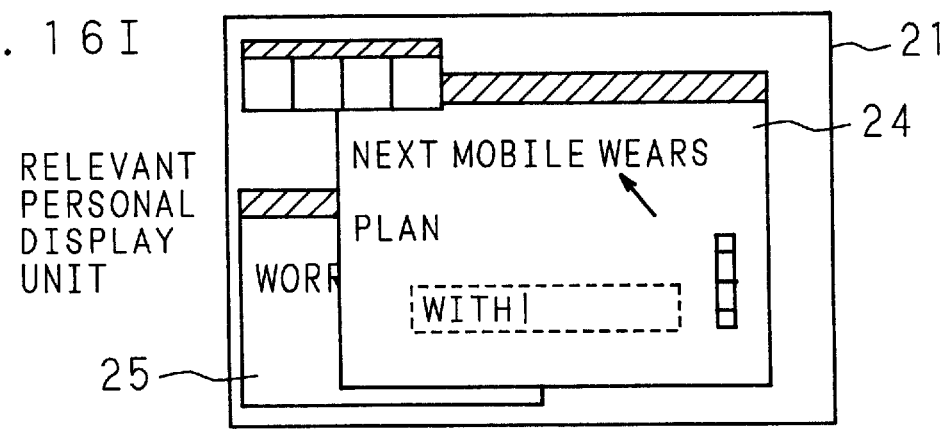
Figure 16J:
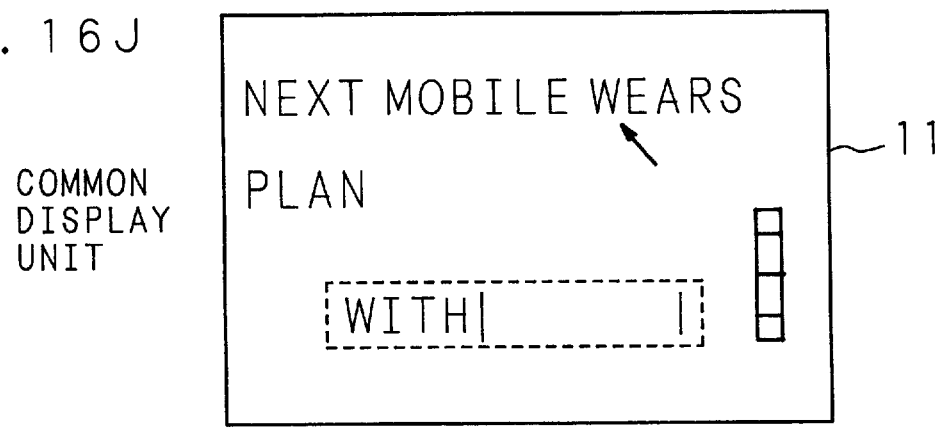
Figure 16K:
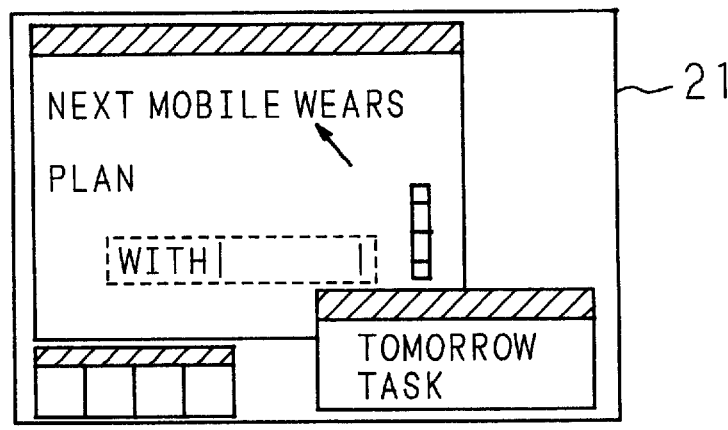

When the attendant has depressed the information creation end key 54 after input of information has been completed (see FIG. 16F), input information is, as an information object, displayed on the personal information display surface 25 of the personal display unit 21 of the attendant so that the information input space 61 waits for new input (see FIG. 16G). If the attendant depresses the local start/end key 56 to make a notification to interrupt personal use of the information input space 61, the information input space 61 is turned off from the relevant personal display unit 21.

When the operation right button 53 has been depressed to acquire the operation right after the state shown in FIG. 16E (see FIG. 16H), the input information is converted to information to be created on the common information display surfaces 14 and 24. That is, the common information display surface 24 is, in the relevant personal display unit 21, displayed on the front surface, and the information input space 61 is displayed on the common information display surface 24 (see FIG. 16I). Similarly to the fourth embodiment, the information input space 61 is simultaneously displayed on the common information display surfaces 14 and 24 of the common display unit 11 and the other personal display units 21 together with the input contents (see FIGS. 16J and 16K). The design of the boundary line of the information input space 61 is, similarly to the fourth embodiment, the same as that of a usual information object.

When the relevant attendant continues input of information while looking the information input space 61 on the common information display surface 24 and then depresses the information creation end key 54, input information is made to be independent as an information object so as to be displayed on the common information display surface 24 of the own personal display unit 21, and the common information display surfaces 14 and 24 of the common display unit 11 and the other personal display units 21.

Figure 17A:
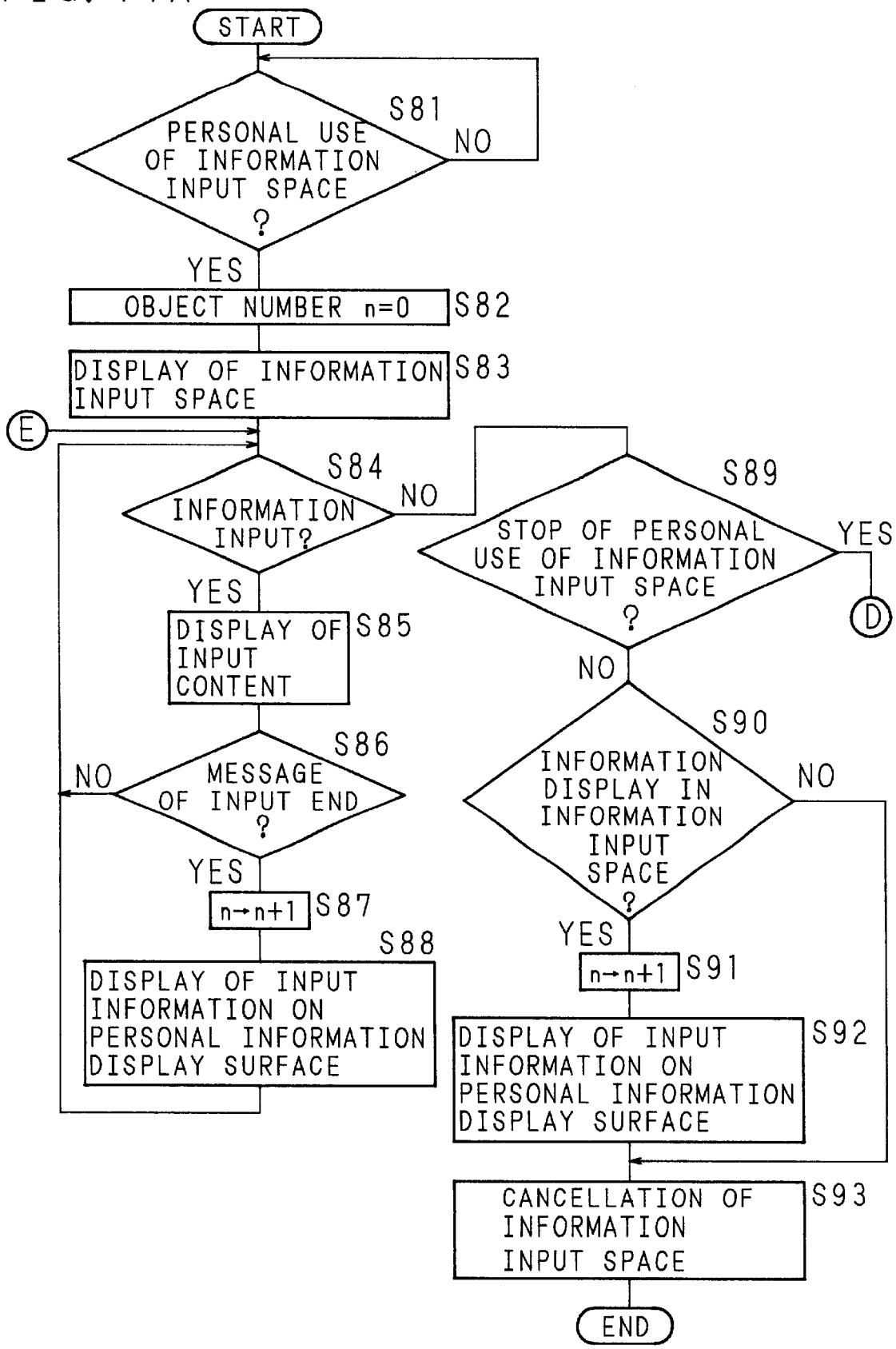
Figure 17C:
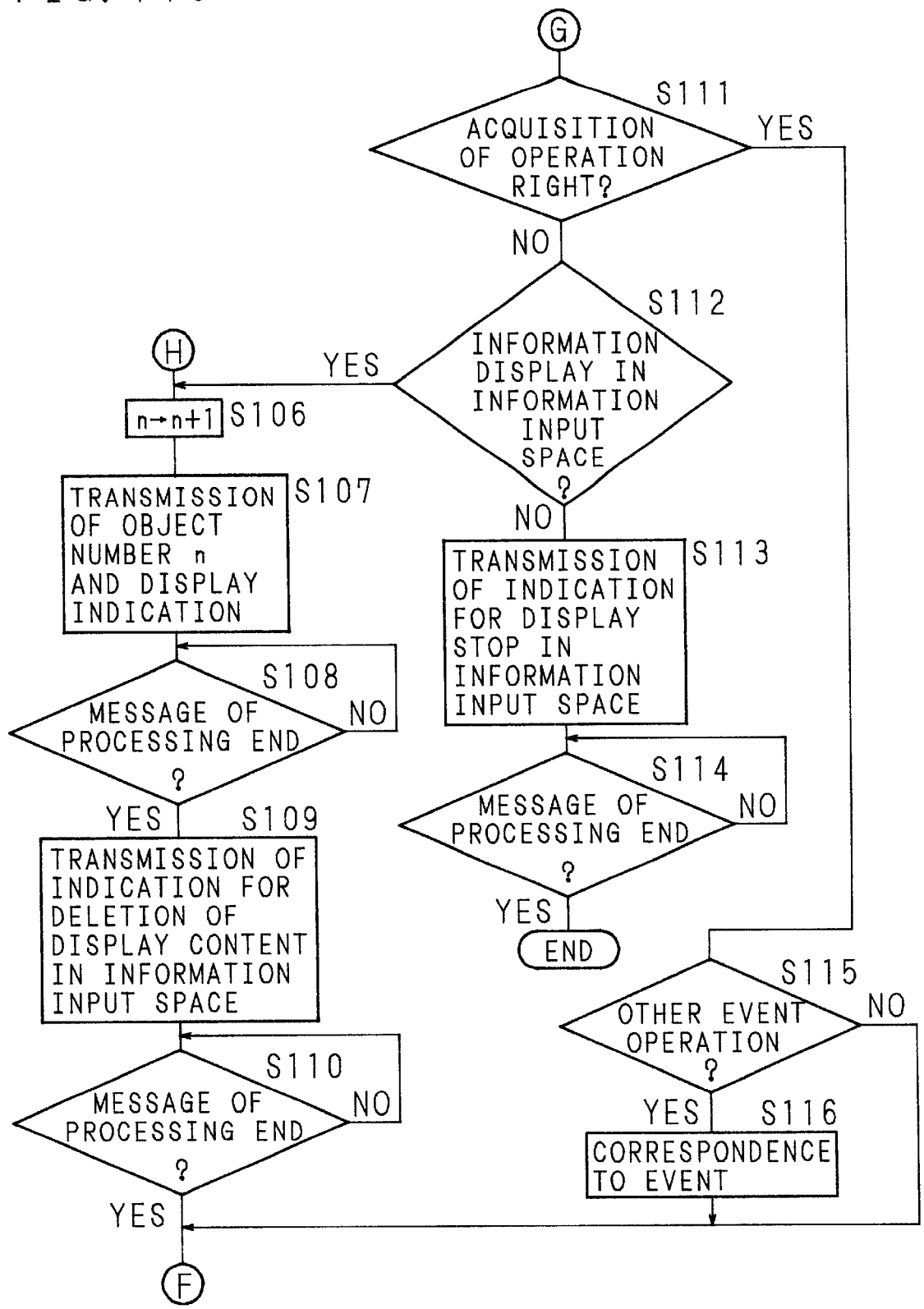

FIGS. 17A to 17C are flow charts showing the procedure of the operation according to the fifth embodiment. In a case where the operation right has not been acquired, whether or not the information input space 61 is personally used is initially judged in accordance with whether or not the local start/end key 56 has been depressed (S81). In a case where the information input space 61 is personally used, zero is set to object number n (S82) so that the information input space 61 is displayed on the personal display unit 21 (S83). Then, whether or not information has been inputted onto the information input space 61 is judged (S84). If information has been inputted, input information is displayed on the information input space 61 (S85).

Then, whether or not completion of input has been notified is judged in accordance with whether or not the information creation end key 54 has been depressed (S86). If completion of input has been notified, 1 is added to object number n (S87). Then, object number n and the contents of the object are notified to the own display processing unit 27 and displayed on the personal information display surface 25 (S88). Then, the operation returns to step S84 so that input of new information item is waited for. If completion of input has not been notified in step S86, the operation returns to step S84 so that input of information is waited for.

If input of information of input has not been made in step S84, whether or personal use of the information input space 61 is stopped is judged in accordance with whether or not the local start/end key 56 has been again depressed (S89). If the personal use is stopped, whether or not input information is being displayed on the information input space 61 is judged (S90). If input information is not being displayed, the operation directly proceeds to step S93. If the input information is being displayed, 1 is added to object number n (S91). Then, object number n and the contents of the object are notified to the own display processing unit 27 to display the same on the personal information display surface 25 (S92). Then, the operation proceeds to step S93. Then, the information input space 61 which has been displayed on the personal display unit 21 is turned off (S93). Thus, the process is completed.

If the personal use is not stopped in step S89, whether or not the operation right has been acquired is judged (S94). If the operation right has not been acquired, whether or not another event exists is judged (S117). If another event exists, an operation corresponding to the event is performed (S118). Then, the operation returns to step S84. If no event exists, the operation directly returns to step S84. If the operation right has been acquired in step S94, an instruction to delete the current information input space 61 and to display the information input space 61 on the common information display surface 24 is notified to the own display processing unit 27. Moreover, an instruction to display the information input space 61 on the common information display surfaces 14 and 24 is transmitted to the common information processing apparatus 1 and the other personal information processing apparatuses 2 (S95). When completion of the instructed process has been notified from the other information processing apparatuses 1 and 2 (S96), whether or not information is being displayed on the information input space 61 is judged (S97). If information is not being displayed, the operation directly proceeds to step S100. If information is being displayed, input information and an instruction to perform display on the information input space 61 are notified to the own display processing unit 27 and transmitted to the common information processing apparatus 1 and the other personal information processing apparatuses 2 (S98). When completion of the instructed process has been notified from the information processing apparatuses 1 and 2 (S99), the operation proceeds to step S100. Then, zero is set to object number n (S100), and the information input space 61 which has been displayed on only the personal display unit 21 is turned off (S101).

Then, whether or not information has been inputted to the information input space 61 is judged (S102). If information has been inputted, input information and an instruction to display the same on the common information display surface 24 are notified to the own display processing unit 27 and transmitted to the common information processing apparatus 1 and the other personal information processing apparatuses 2 (S103). When completion of the instructed process has been notified from the other information processing apparatuses 1 and 2 (S104), whether or not completion of input has been notified is judged in accordance with whether or not the information creation end key 54 has been depressed (S105). If completion of input has been notified, 1 is added to object number n (S106). Moreover, object number n and an instruction to display the object are notified to the own display processing unit 27 and transmitted to the common information processing apparatus 1 and the other personal information processing apparatuses 2 (S107). When completion of the instructed process has been notified from the information processing apparatuses 1 and 2 (S108), an instruction to delete the contents of display on the information input space 61 is notified to the own display processing unit 27 and transmitted to the common information processing apparatus 1 and the other personal information processing apparatuses 2 (S109). When completion of the instructed process has been notified from the information processing apparatuses 1 and 2 (S110), the operation returns to step S102 so that input of a new information item is waited for. If completion of input has not been notified in step S105, the operation returns to step S102 so that input of information is waited for.

If input of information is not performed in step S102, whether or not the operation right has been acquired is judged (S111). If the operation right has been acquired, whether or not information has been inputted to the common information display surface 14 or an operation of editing of the displayed information object is performed is judged (S115). If the information input has been made or if the editing operation is performed, an operation corresponding to the event is performed (S116). Then, the operation returns to step S102. If it has not been performed, the operation directly returns to step S102. If the operation right has not been acquired in step S111, whether or not input information is being displayed on the information input space 61 is judged (S112). If the display is being performed, the operation returns to step S106. If it is not being performed, an instruction to stop display of the information input space 61 is notified to the own display processing unit 27 and transmitted to the other information processing apparatuses 1 and 2 (S113). When completion of the instructed process has been notified from the other information processing apparatuses 1 and 2 (S114), the sequential process is completed.

As described above, the fifth embodiment enables information, which an attendant started to create firstly for his personal use, and which he, by some reasons, later changes to present to the other attendants, to immediately be presented to the other attendants in the incomplete state while continuing the creating operation. After the information item has been completed, it can be made to be common information.

SIXTH EMBODIMENT

Figure 18A:
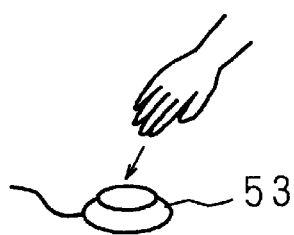
FIGS. 18A to 18P are schematic views showing examples of the operations and display according to the sixth embodiment.
Figure 18B:
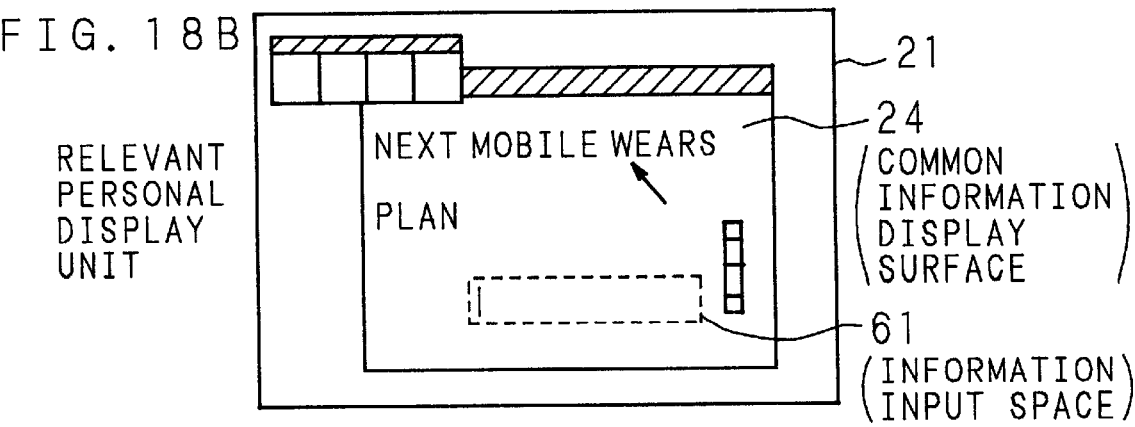
Figure 18C:
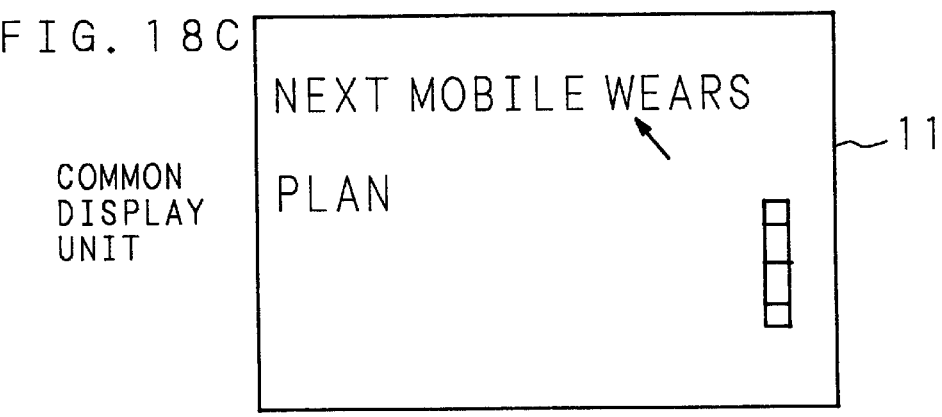
Figure 18D:
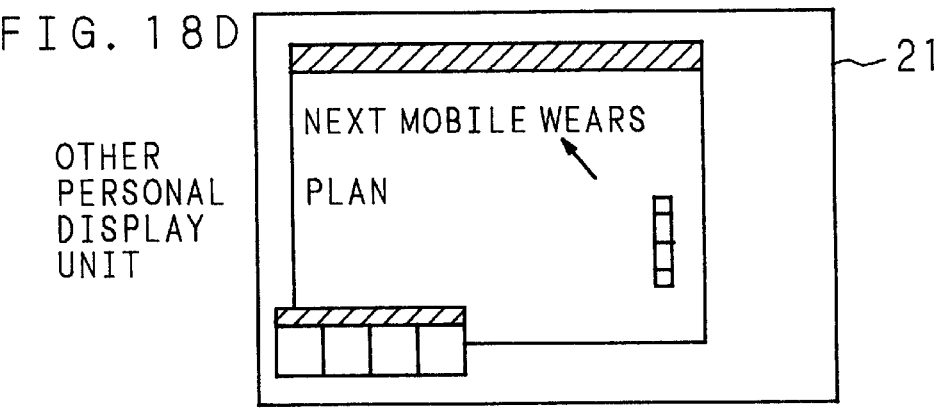
Figure 18E:
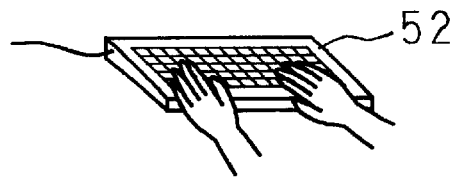
Figure 18F:
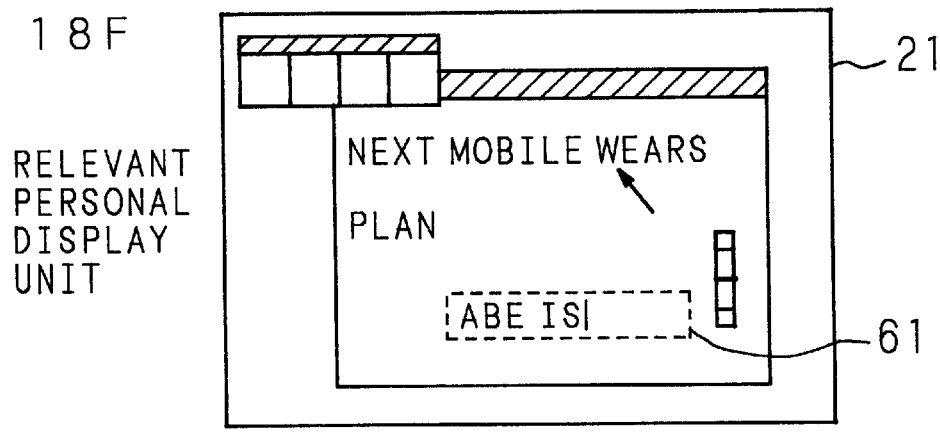
Figure 18G:
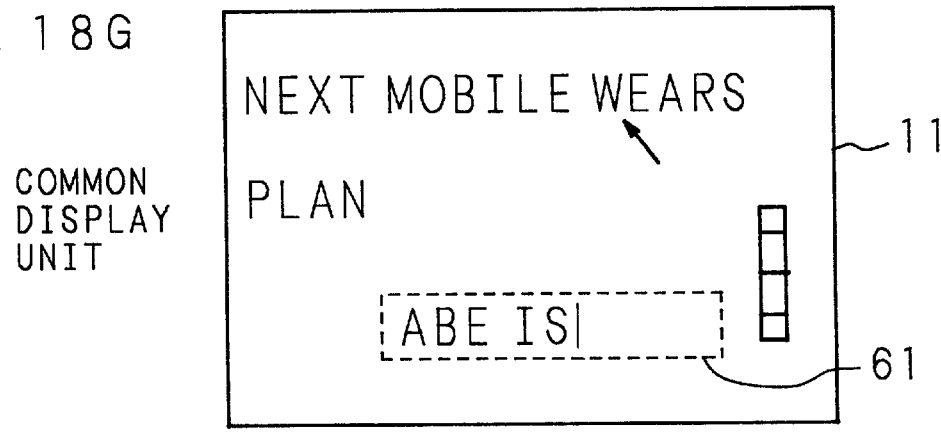
Figure 18H:
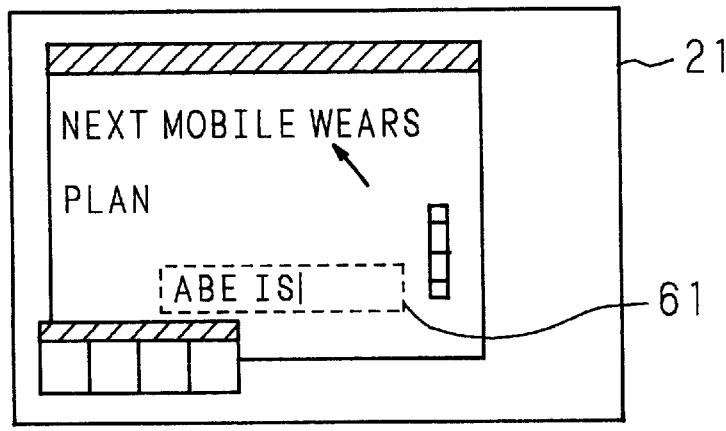
Figure 18I:
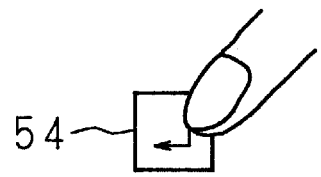
Figure 18J:
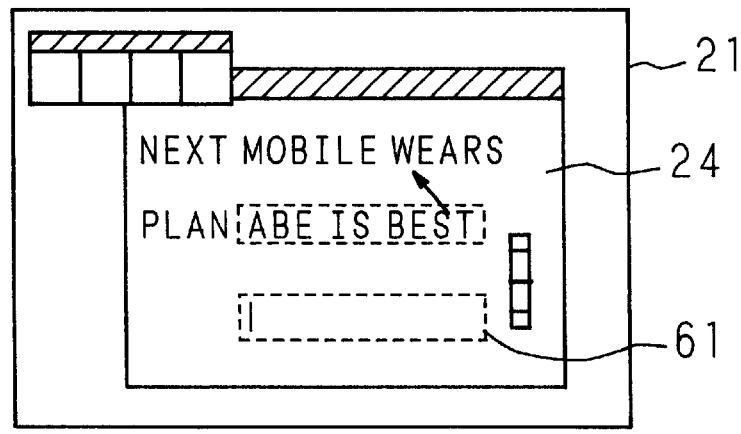
Figure 18K:
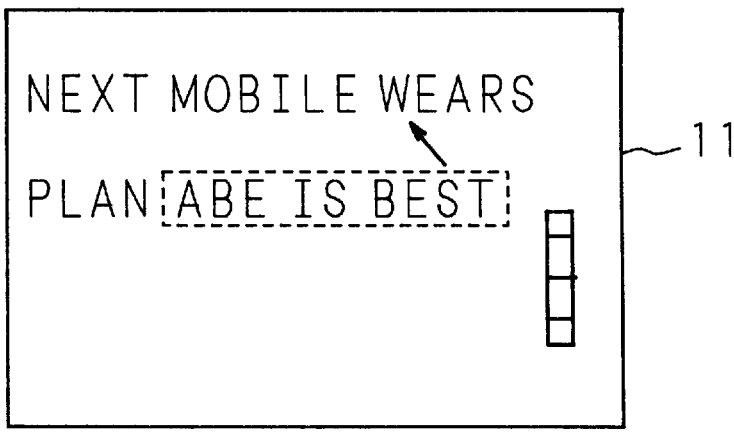
Figure 18L:
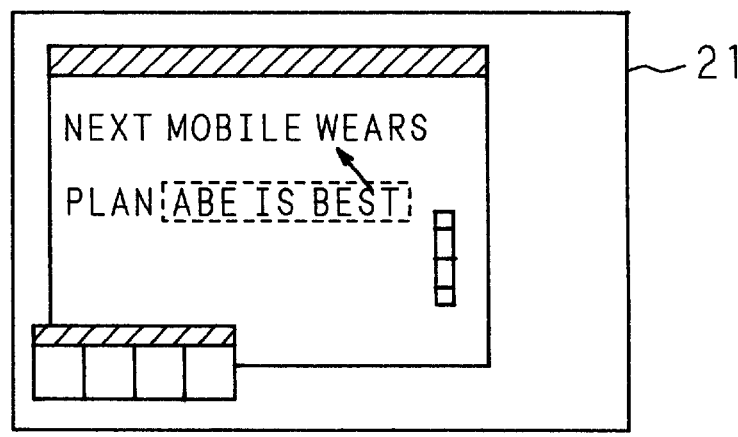
Figure 18M:
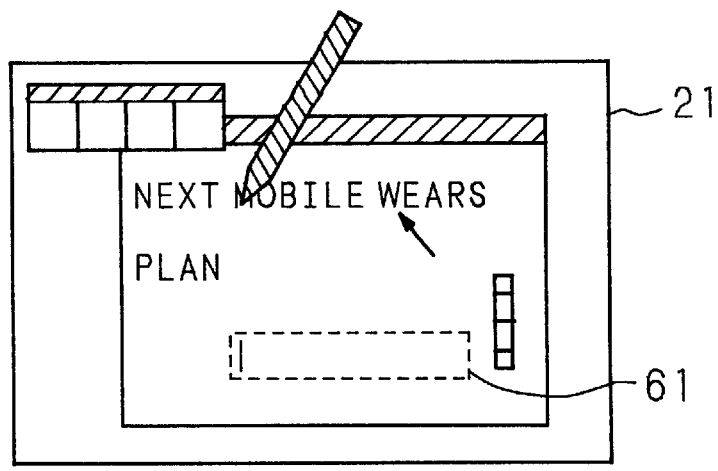
Figure 18N:
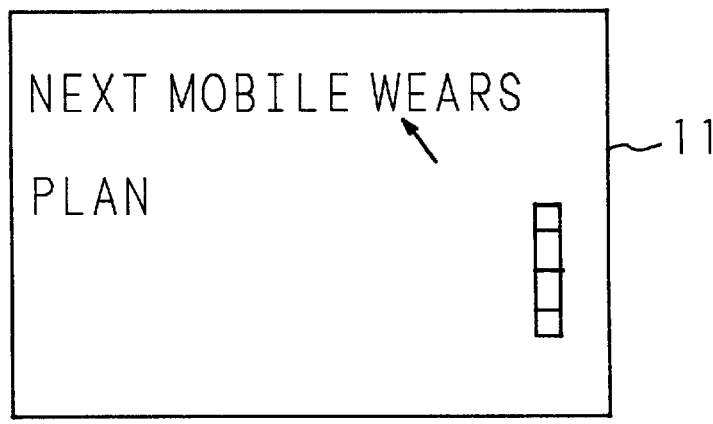
Figure 18O:
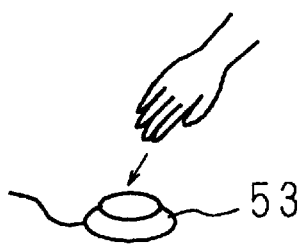
Figure 18P:
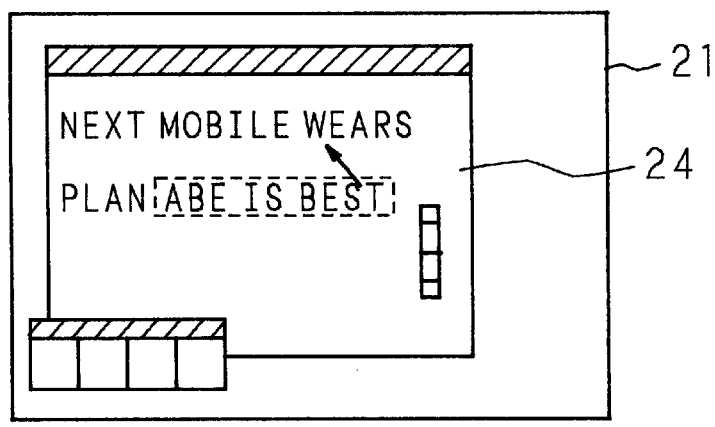

FIGS. 18A to 18P are schematic views showing examples of the operations and display according to the sixth embodiment of the first aspect of the present invention. In the sixth embodiment, when a certain attendant has acquired an operation right, the information input space 61 is, at this time, displayed on the own personal display unit 21. However, the information input space 61 is not displayed on the common display unit 11 and the other personal display units 21. When the relevant attendant has started inputting information to the information input space 61, the information input space 61 and input information are displayed on the common display unit 11 and the other personal display units 21.

When a certain attendant has depressed the operation right button 53 to acquire the operation right (see FIG. 18A), the information input space 61 in a state where new input is waited for is displayed on the relevant personal display unit 21 (see FIG. 18B). Note that the information input space 61 is not displayed on the common display unit 11 and the other personal display units 21 at this time (see FIGS. 18C and 18D). Although the information input space 61 in a state where new input is waited for is considered to be located at which the attendant who has acquired the operation right is able to easily input information, the display is considered to be meaningless for the other attendants because no information worthy of looking for the other attendants exists. Thus, the information input space 61 is not displayed.

When the relevant attendant has started inputting information by using the keyboard 52 (see FIG. 18E), input information is displayed on the information input space 61 of the personal display unit 21 of the relevant attendant (see FIG. 18F). When the attendant, who has acquired the operation right, has started inputting information onto the information input space 61, the information input space 61 and notification of display of the input contents are transferred from the personal information processing apparatus 2 to the common information processing apparatus 1 and the other personal information processing apparatuses 2 so that the information input space 61 and input information are displayed on the common display unit 11 and each of the personal display units 21 (see FIGS. 18G and 18H).

When the attendant has depressed the information creation end key 54 after information has been inputted (see FIG. 18I), input information of the information input space 61 is, in the personal display unit 21 of the relevant attendant, displayed independently on the common information display surface 24 as an information object. Then, the information input space 61 is brought to a state where new input is waited for (see FIG. 18J). On the other hand, input information is independently displayed as an information object on the common display unit 11 and all of the other personal display units 21. However, the information input space 61 is turned off until next information is inputted (see FIGS. 18K and 18L).

In a case where the relevant attendant does not input information onto the information input space 61 in the state shown in FIG. 18B and another operation, for example, movement of a pointer with a pen, is performed (see FIG. 18M), movement of the pointer is displayed on the common display unit 11 and all of the other personal display units 21. However, the information input space 61 is not displayed (see FIG. 18N).

When the operation right button 53 has been depressed and thus the operation right has been relinquished (see FIG. 18O), the information input space 61, which has been displayed on the personal display unit 21 is turned off (see FIG. 18P).

Figure 19A:
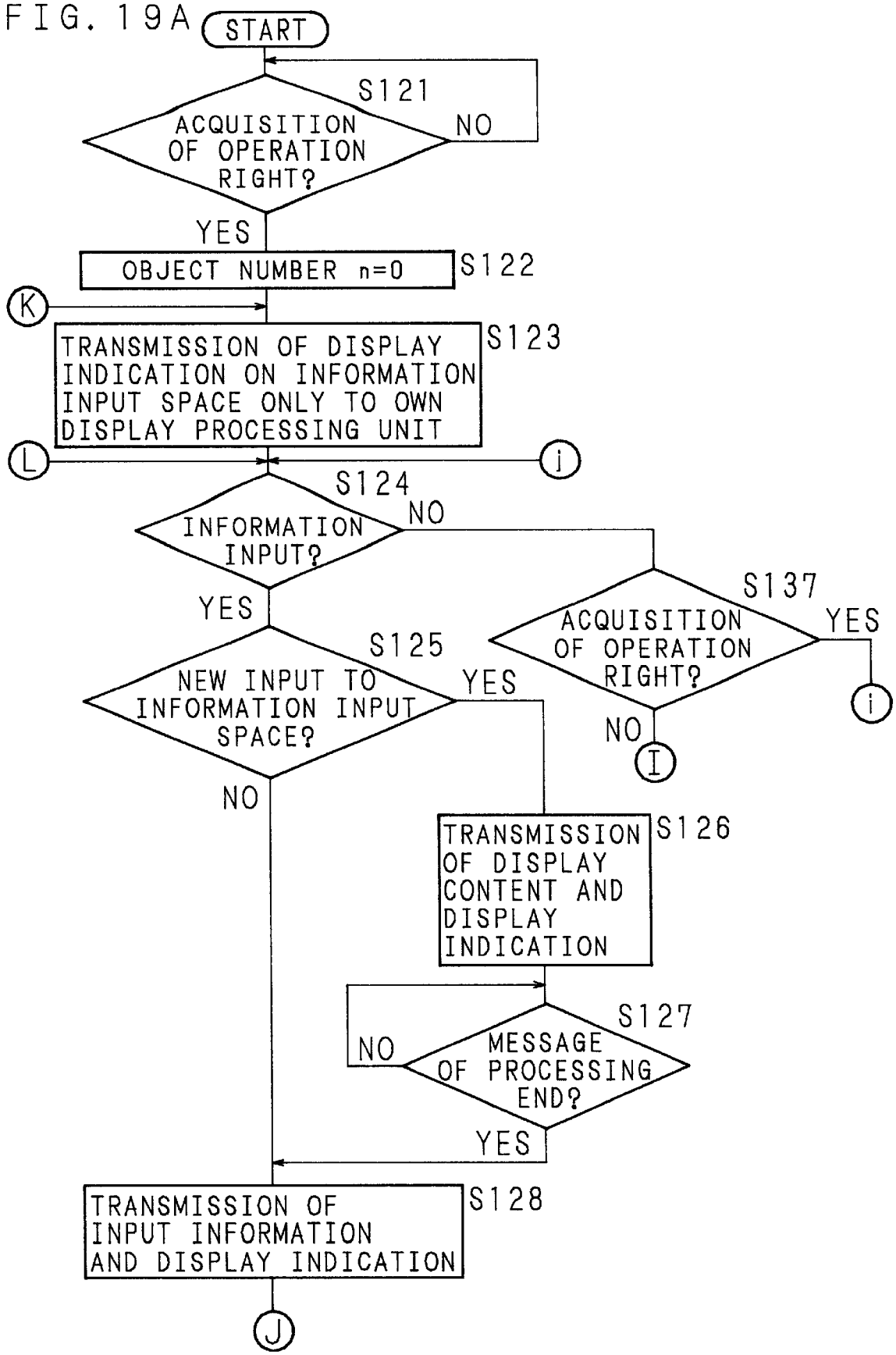
FIGS. 19A to 19C are flow charts showing the procedure of a process according to the sixth embodiment.
Figure 19B:
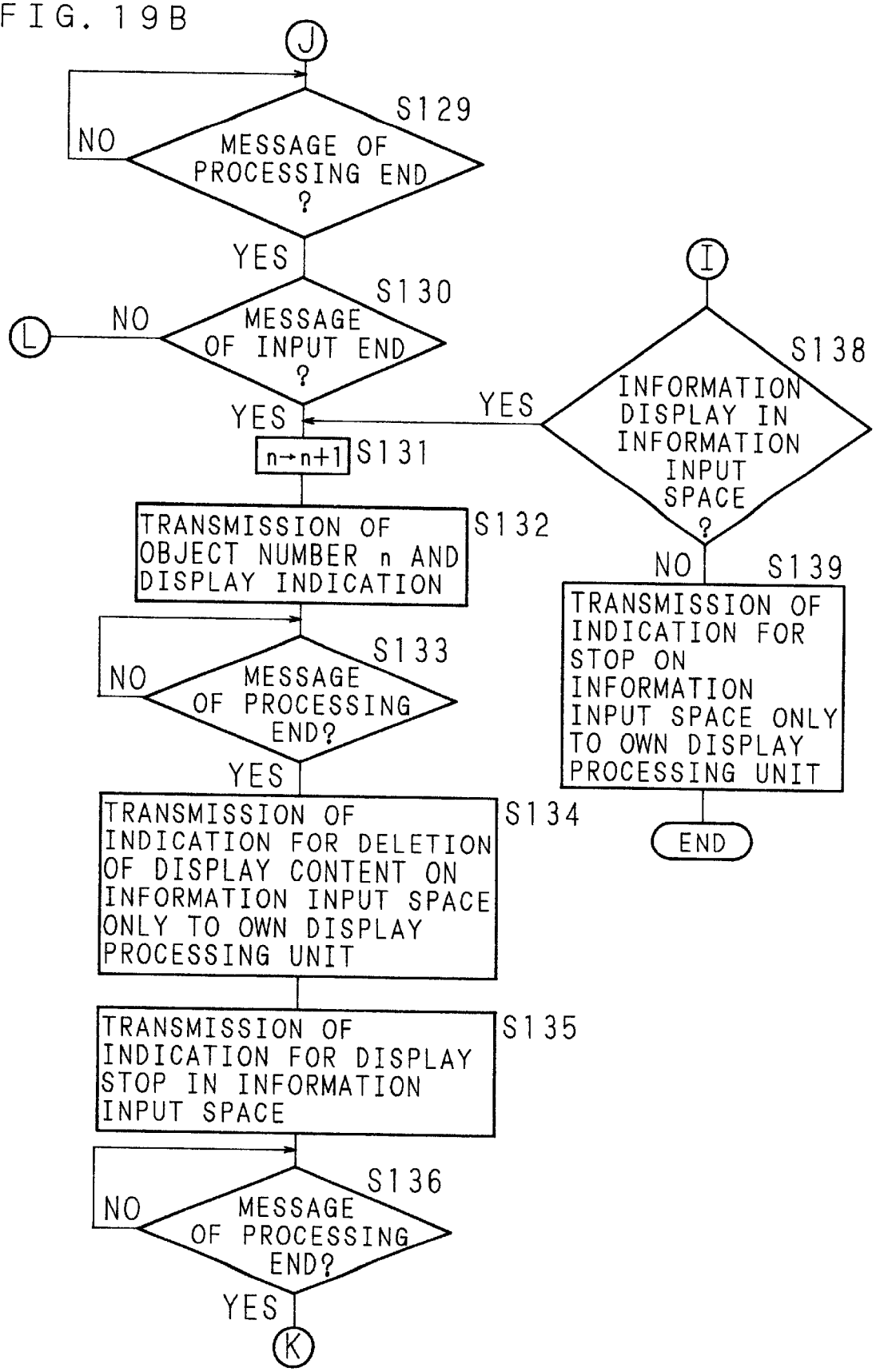
Figure 19C:
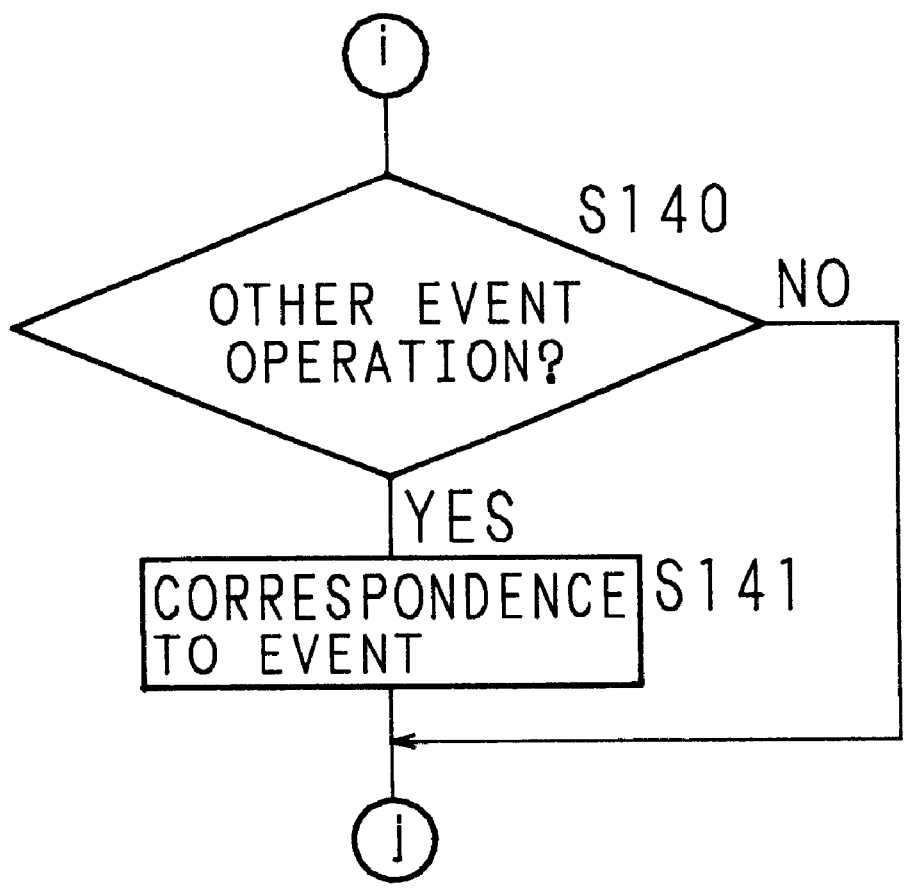
Figure 20A:
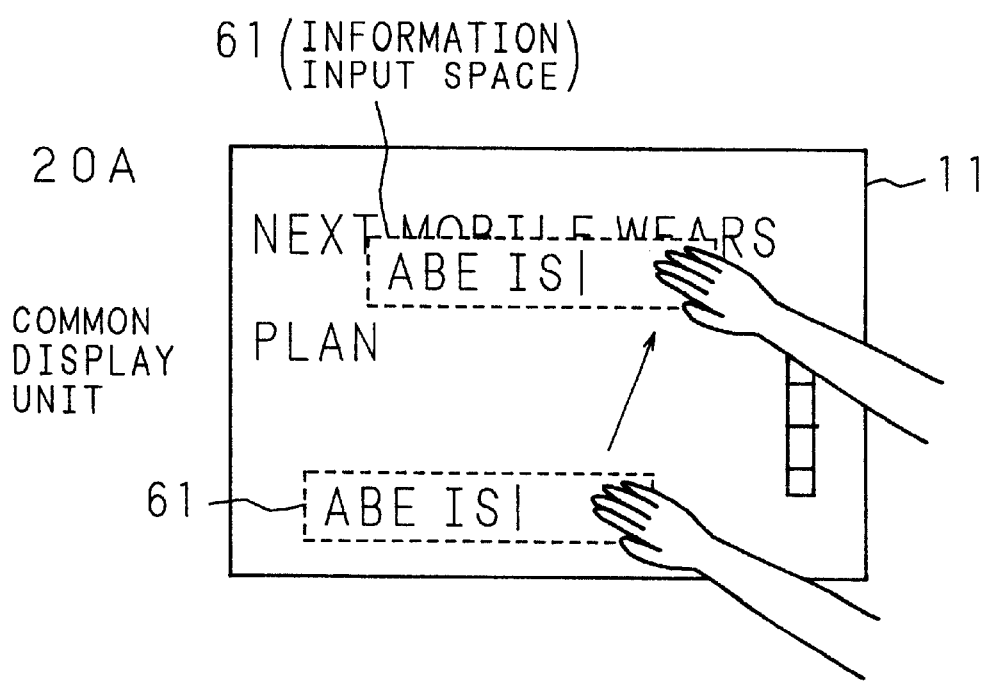
FIGS. 20A to 20F are schematic views showing examples of the operations and display according to the seventh embodiment.
Figure 20B:
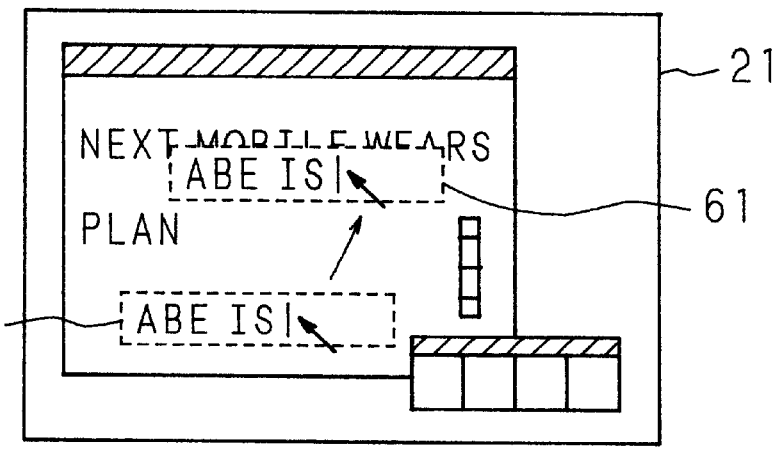
Figure 20C:
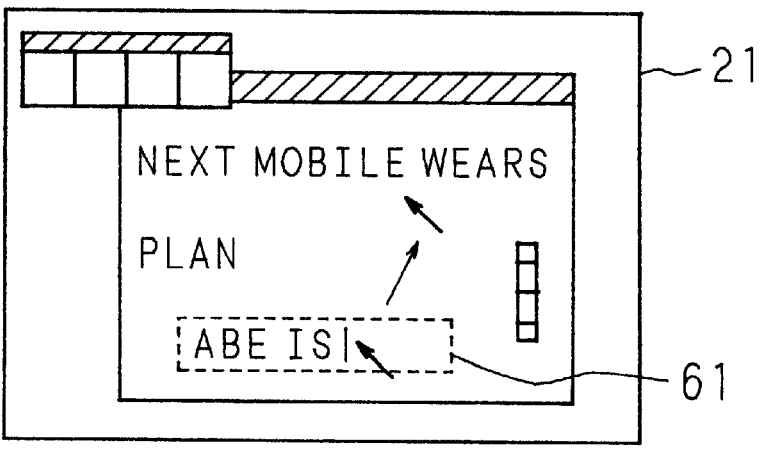
Figure 20D:
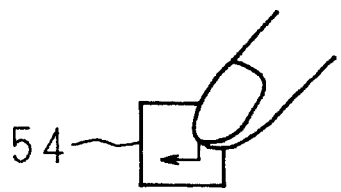
Figure 20E:
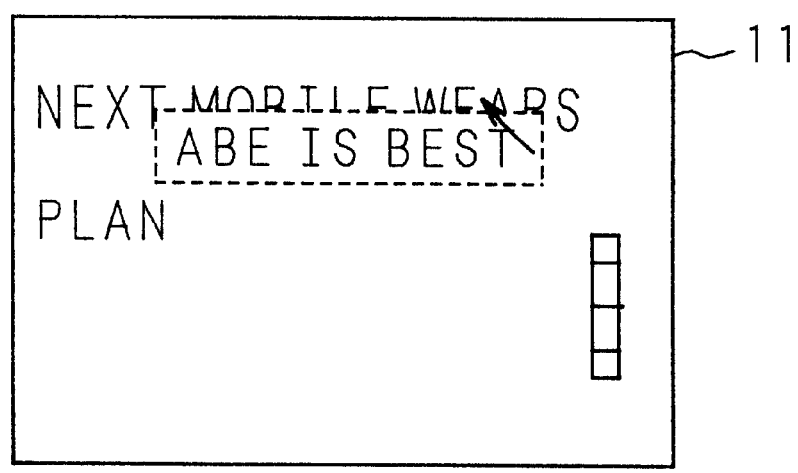
Figure 20F:
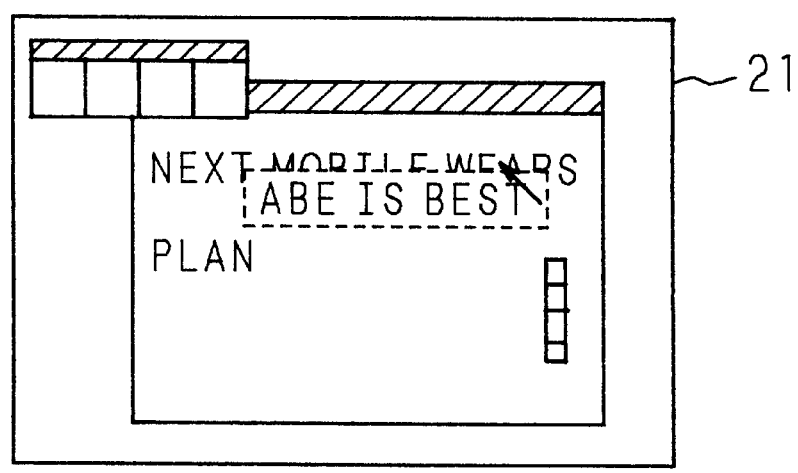

FIGS. 19A to 19C are flow charts showing the procedure of the operation according to the sixth embodiment. If the operation right has been acquired (S121), zero is set to object number n (S122). Then, an instruction to display the information input space 61 onto the common information display surface 24 is notified to only the own display processing unit 27 (S123). Then, whether or riot information has been inputted to the information input space 61 is judged (S124). If information has been inputted, whether or not the input is a new input to the information input space 61 is judged (S125). If it is not new input, the operation directly proceeds to step S128. If it is new input, information on the information input space 61 and an instruction to display it on the common information display surfaces 14 and 24 are transmitted to the common information processing apparatus 1 and the other personal information processing apparatuses 2 (S126). After completion of the instructed process has been notified from the information processing apparatuses 1 and 2 (S127), the operation proceeds to step S128.

Then, input information and an instruction to perform display on the common information display surface are notified to the own display processing unit 27 and transmitted to the common information processing apparatus 1 and the other personal information processing apparatuses 2 (S128). After completion of the instructed process has been notified from the information processing apparatuses 1 and 2 (S127), whether or not completion of the input has been notified is judged in accordance with whether or not the information creation end key 54 has been depressed (S130). If completion of the input has been notified, 1 is added to object number n (S131). Then, object number n and an instruction to display the object are transmitted to the common information processing apparatus 1 and the other personal information processing apparatuses 2 (S132). When completion of the instructed process has been notified from the information processing apparatuses 1 and 2 (S133), an instruction to delete the contents displayed on the information input space 61 on the common information display surface 24 is notified to only the own display processing unit 27 (S134). Moreover, an instruction to stop display of the information input space 61 on the common information display surfaces 14 and 24 is transmitted to the common information processing apparatus 1 and the other personal information processing apparatuses 2 (S135). When completion of the instructed process has been notified from the information processing apparatuses 1 and 2 (S136), the operation returns to step S123. If completion of the input is not notified in step S130, the operation returns to step S124 so that a state where input of information is waited for starts.

If input of information is not performed in step S124, whether or not the operation right has been acquired is judged (S137). If the operation right has been acquired, input of information to the common information display surface 14 has been made or an operation of editing the displayed information object is performed is judged (S140). If the information input or the editing operation is performed, an operation corresponding to the event is performed (S141). Then, the operation returns to step S124. If it is not performed, the operation directly returns to step S124. If the operation right has not been acquired in step S137, whether or not input information is being displayed on the information input space 61 is judged (S138). If input information is being displayed, the operation proceeds to step S131. If input information is not being displayed, an instruction to stop display of the information input space 61 on the personal display unit 21 is notified to the own display processing unit 27 (S139). Thus, the sequential process is completed.

As described above, the sixth embodiment has the structure that information on the common information display surface is not completely shared by the information processing apparatuses but sometimes incompletely shared, which enables the attendant having the operation right to easily input information while the other attendants are free from adverse stimulus when information is created and presented.

SEVENTH EMBODIMENT

FIGS. 20A to 20F are schematic views showing examples of the operations and display according to the seventh embodiment of the first aspect of the present invention. In the seventh embodiment, in a period in which a certain attendant, who has acquired the operation right, is creating information on the information input space 61, the other attendants are able to move the information item which is being created. However, the movement is not reflected on the personal display unit 21 of the attendant who creates the information item during the creation.

During a period in which attendant A is creating new information on the information input space 61, another attendant B, through the input unit 12 of the common information processing apparatus 1 (or the input unit 22 of the own personal information processing apparatus 2), selects and moves information, which is being created, that is, input information on the information input space 61 which has not been made to be independent as an information object. For example, the attendant B stands in front of the common display unit 11 to operate the touch sensor 41 attached on the common display unit 11 to manually select the information input space 61, which is being created so as to move the information input space 61 in a direction indicated by an arrow (see FIG. 20A).

The information control unit 20 (or 30) of the information processing unit 13 (or 23) operated by the attendant B recognizes the foregoing operation as a movement operation. Thus, the information control unit 20 (or 30) notifies each information processing unit 23 (or 13) to select and display movement of the information input space 61 similarly to the other information objects. As a result, if the attendant B performs the movement operation with the common information processing apparatus 1, the information input space 61 is moved on the personal display units 21 except that for the attendant A (see FIG. 20B). However, since the attendant A has the operation right in the display processing unit 27, information of the movement of the display is stored in the common information storage unit 26 of the attendant A and the movement of the display is retained. As a result, the pointer moves as indicated by an arrow on the personal display unit 21 of the attendant A. However, the information input space 61 is not moved (see FIG. 20C). Therefore, the attendant A is able to continue input of information without paying attention to the movement of the information input space 61. On the other hand, the attendant B is able to move input information in the information input space 61 similarly to the information object even if information is being created.

After the attendant A has completed input of information and depressed the information creation end key 54 (see FIG. 20D), notification of display of the information object is supplied from the information control unit 30 to the display processing unit 27. Therefore, it is displayed on the personal display unit 21 of the attendant A as an information object at the moved display position instructed previously. As a result, the displayed contents are made to be the same among all of the common display unit 11 and the personal display units 21 (see FIGS. 20E and 20F).

Figure 21:
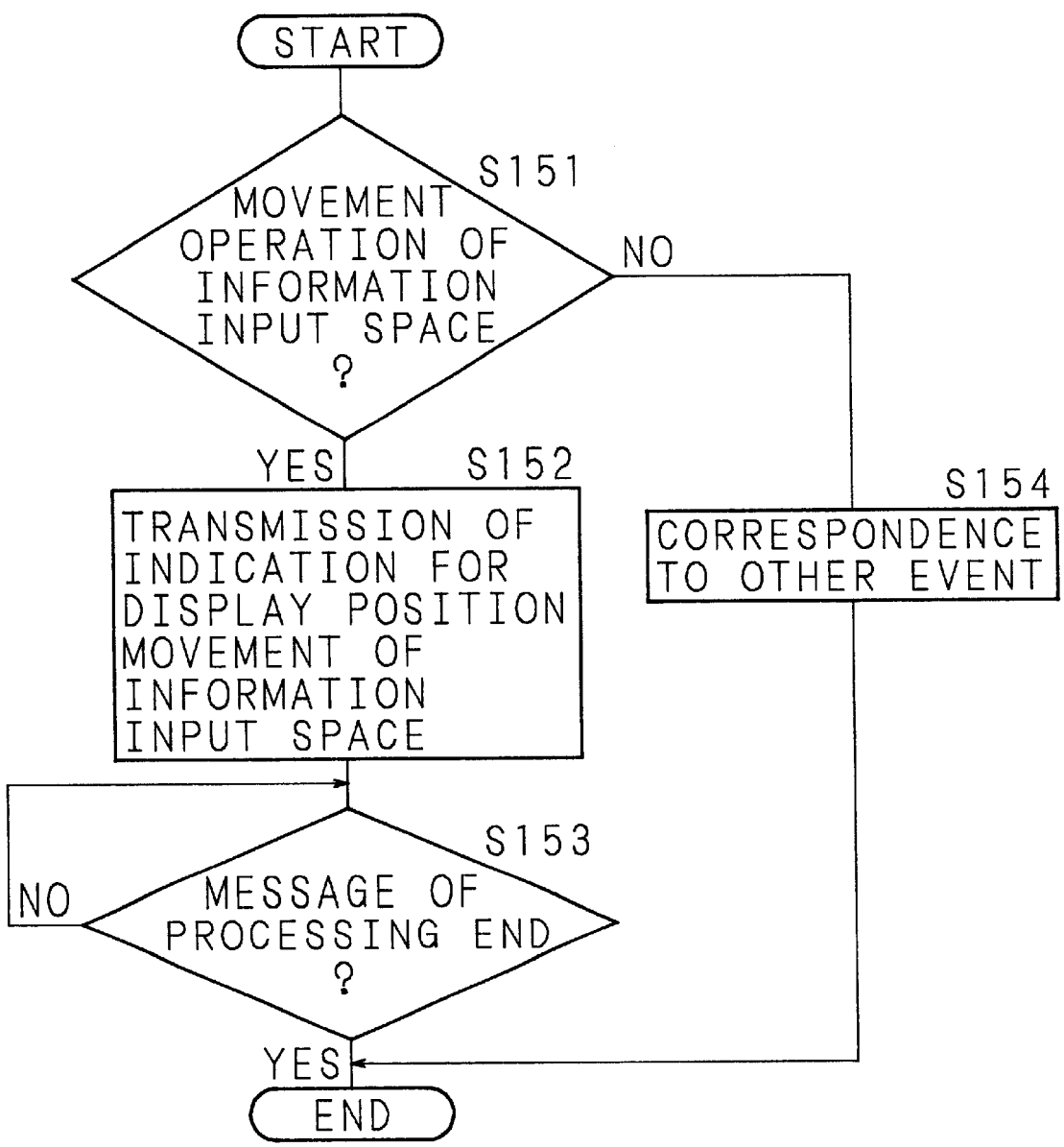
FIG. 21 is a flow chart showing the procedure of a process according to the seventh embodiment (an information control unit)
Figure 22:
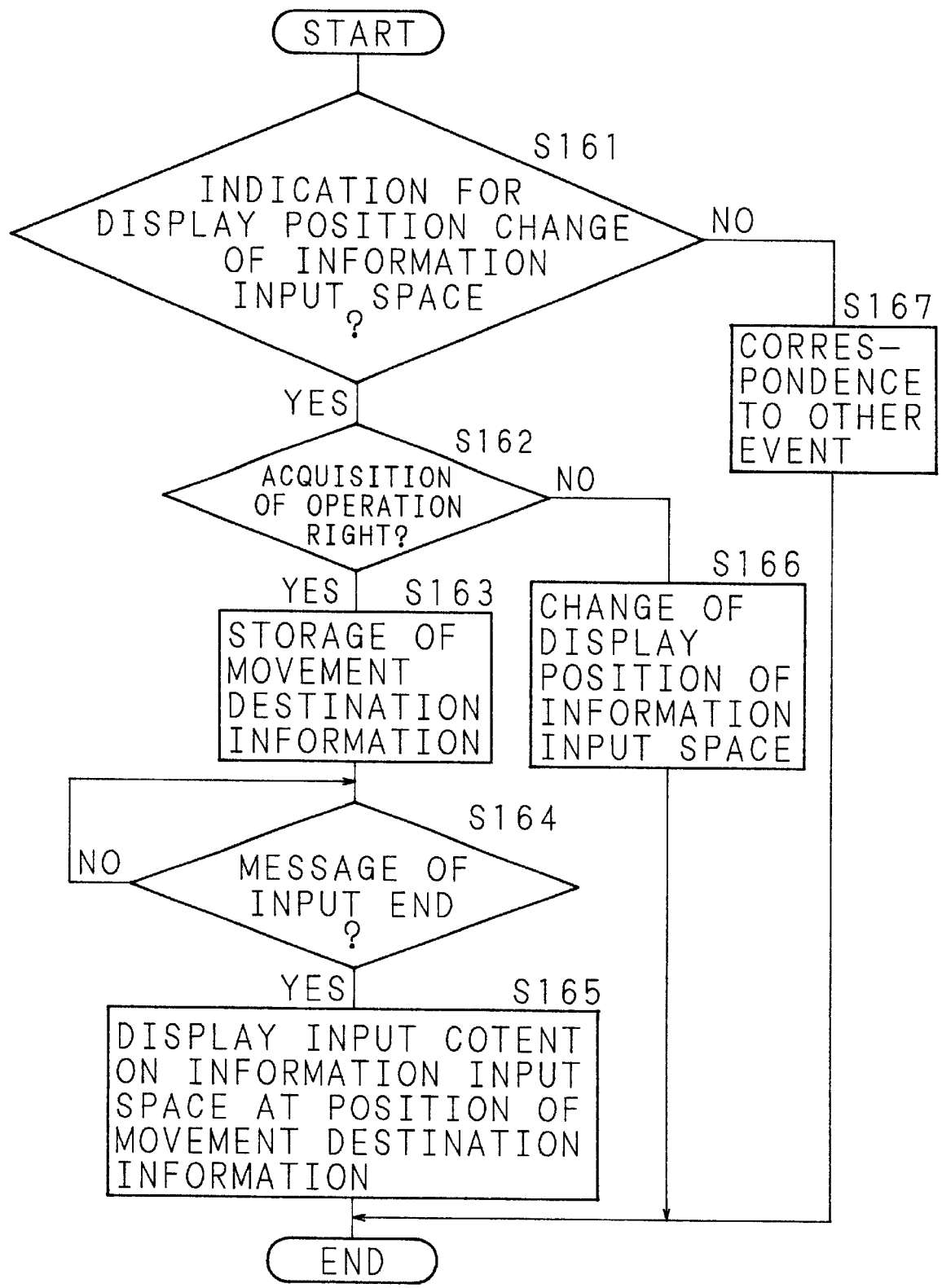
FIG. 22 is a flow chart showing the procedure of a process according to the seventh embodiment (a display processing unit)
Figure 23A:
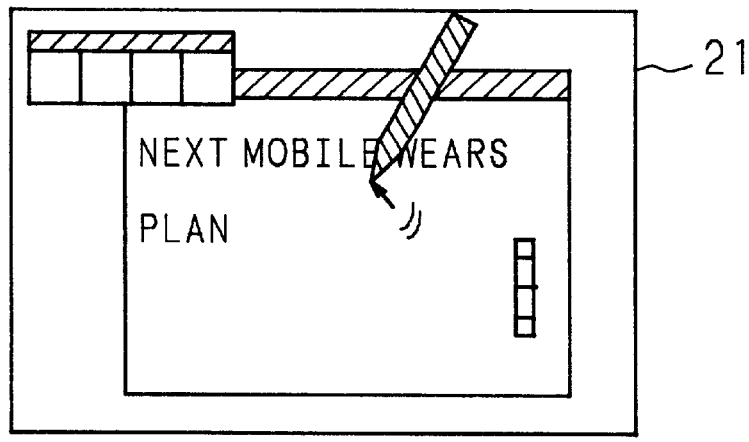
FIGS. 23A to 23F are schematic views showing examples of the operations and display according to the eighth embodiment.
Figure 23B:
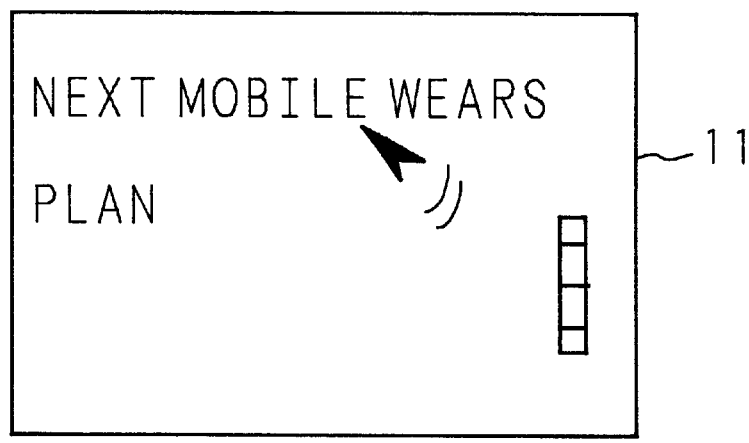
Figure 23C:
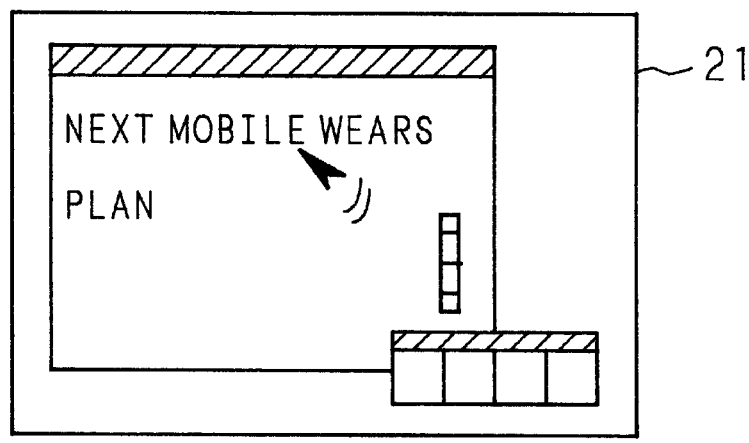
Figure 23D:
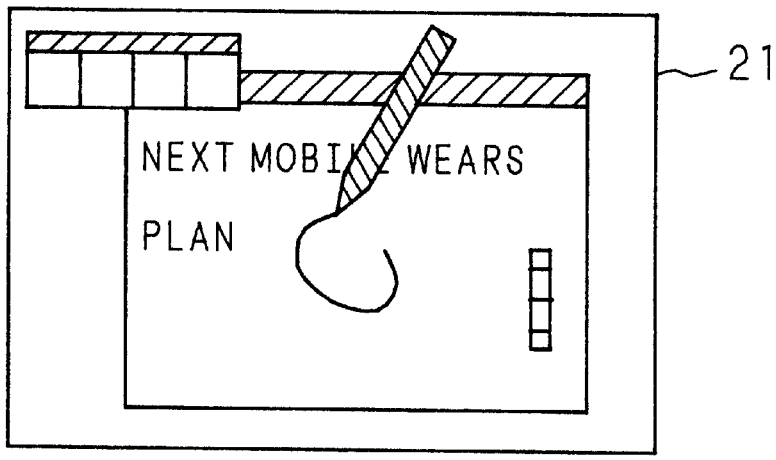
Figure 23E:
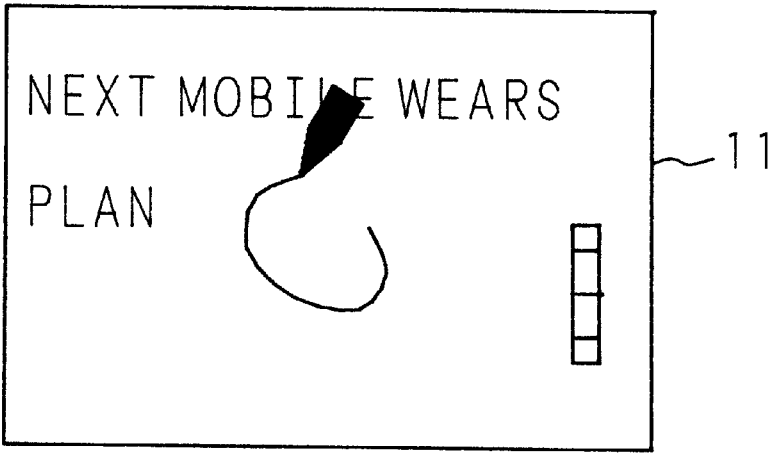
Figure 23F:
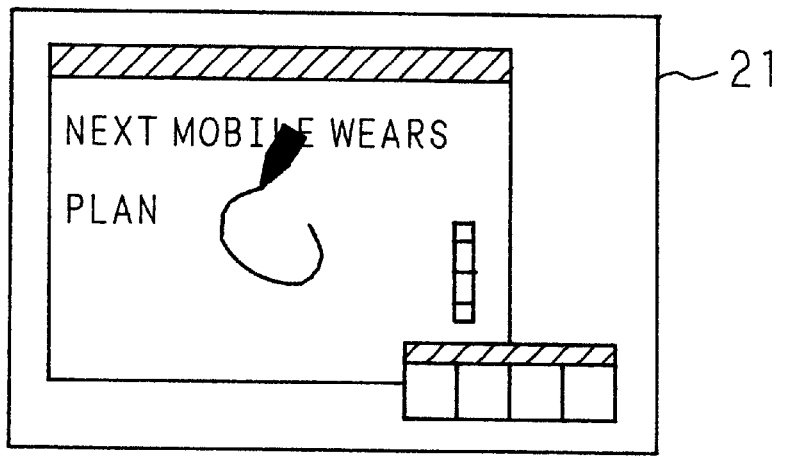

FIGS. 21 and 22 are flow charts showing the procedure of the operation according to the seventh embodiment (shown in FIGS. 20A to 20F). FIG. 21 shows a procedure of a process to be performed by the information control unit 20 of the common information processing apparatus 1. FIG. 22 shows a procedure of a process to be performed by the display processing unit 27 of the personal information processing apparatus 2 of the attendant A.

In a case where an operation event with respect to the common information display surface is performed, whether or not the operation is the operation for moving the information input space 61 is judged (S151). If the operation is the movement operation, an instruction to move the display position of the information input space 61 on the common information display surface is notified to the own display processing unit 17 and transmitted to each personal information processing apparatus 2 (S152). When completion of the instructed process has been notified from each personal information processing apparatus 2 (S153), the process is completed. If the operation is not the movement operation in step S151, an operation corresponding to another instructed event is performed (S154). Then, the process is completed.

The personal information processing apparatus 2 of the attendant A initially judges whether or not the input instruction is an instruction to shift the display position of the information input space 61 (S161). If the instruction is the instruction to move the display position, whether or not the operation right has been acquired is judged (S162). If the operation right has been acquired, information of the position to which the display is moved is stored in the common information storage unit 26 and the display of the movement is retained (S163). When the information creation end key 54 is depressed, completion of the input is notified (S164), information about the position to which display is moved is read from the common information storage unit 26. Then, the contents of display on the information input space 61 are displayed at the position as the information object (S165). Then, the process is completed. If the operation right has not been acquired in step S162, the contents of the display on the information input space 61 are shifted to the instructed position so as to be displayed (S166). Then, the process is completed. If the instruction is not the instruction to shift the display position in step S161, an operation corresponding to another instructed event is performed (S167). Then, the process is completed.

As described above, the seventh embodiment has the structure such that information on the common information display surface is not always shared among the information processing apparatuses but it is sometimes changed. As a result, an attendant having the operation right is able to exclusively input information to the information input space. On the other hand, the other attendants are able to consider information, which is being created, while positioning it among existing information items.

EIGHTH EMBODIMENT

FIGS. 23A to 23F are schematic views, showing examples of the operations and display according to the eighth embodiment of the first aspect of the present invention. In the eighth embodiment, in a case where a certain attendant moves the pointer or adds drawing with a pen from the own personal information processing apparatus 2 or the common information processing apparatus 1, display on the display unit of the information processing apparatus which is operated by the relevant attendant and that on the display unit of the other information processing apparatuses are different from each other.

When an attendant A has moved, from the own personal information processing apparatus 2, the pointer with a pen to select and move information object on the common information display surface 24 (see FIG. 23A), the instruction of the movement made with the pointer is transmitted to the common information processing apparatus 1 and the other personal information processing apparatuses 2. On the common display unit 11 and the personal display units 21 of the information processing apparatuses 1 and 2, a pointer having a somewhat larger size and in a conspicuous color is displayed which is different from the pointer on the personal display unit 21 of the attendant A (see FIGS. 23B and 23C).

When the attendant A has added a drawing with the pen from the own personal information processing apparatus 2 (see FIG. 23D), an instruction to display the locus of the drawing is transmitted to the common information processing apparatus 1 and the other personal information processing apparatuses 2. On the common display unit 11 and the personal display units 21 of the information processing apparatuses 1 and 2, a pointer in the form of a pen is displayed as well as the locus of the drawing in a manner different from that on the personal display unit 21 of the attendant A (see FIGS. 23E and 23F).

Figure 24:
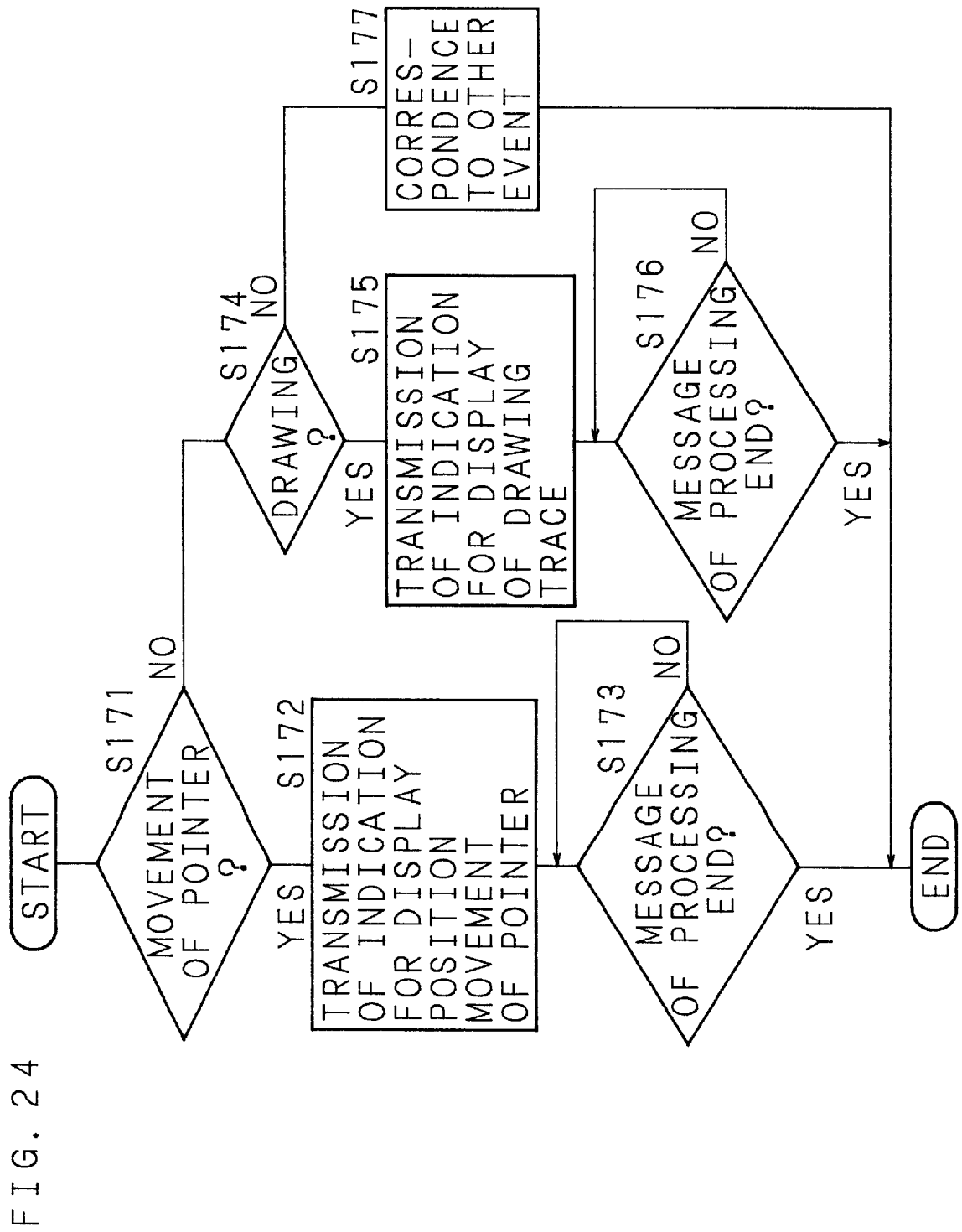
FIG. 24 is a flow chart showing the procedure of a process according to the eighth embodiment (the information control unit)

FIGS. 24 and 25 are flow charts showing the procedure of the process according to the eighth embodiment (shown in FIGS. 23A to 23F). FIG. 24 shows the procedure of a process to be performed by the information control unit 30 of the personal information processing apparatus 2 of the attendant A. FIG. 25 shows the procedure of a process to be performed by the display processing units 17 and 27 of the common information processing apparatus 1 and the personal information processing apparatuses 2 except that for the attendant A.

In a case where the relevant event is an operation event with respect to the common information display surface 24, whether or not it is movement of the pointer is judged (S171). If the event is movement of the pointer, an instruction to move the display position of the pointer on the common information display surface is notified to the own display processing unit 27 and transmitted to the common information processing apparatus 1 and the other personal information processing apparatuses 2 (S172). When completion of the instructed process has been notified from the information processing apparatuses 1 and 2 (S173), the process is completed. If the event is not the movement of the pointer, whether or not the event is a drawing operation is judged (S174). If the event is the drawing operation, an instruction to display the locus of the drawing on the common information display surface is notified to the own display processing unit 27 and transmitted to the common information processing apparatus 1 and the other personal information processing apparatuses 2 (S175). If completion of the instructed process is notified from the information processing apparatuses 1 and 2 (S176), the process is completed. If the event is not the drawing operation in step S174, an operation corresponding to another instructed event is performed (S177). Then, the process is completed.

In a case where an instruction to change the display position has been inputted, whether or not the instruction is an instruction to move the display position from another personal information processing apparatus 2 is judged (S181). If the input is an instruction to change the display position from another personal information processing apparatus 2, whether or not the instruction is an instruction to move the display position of the pointer is judged (S182). If the instruction is an instruction to move the pointer, a large pointer is displayed at the instructed position on each of the common information display surfaces 14 and 24 (S183). Then, the process is completed. If the instruction is not the instruction to move the pointer in step S182, whether or not the instruction is an instruction to display the locus of the drawing is judged (S184). If display of the locus of the drawing is instructed, the pen-type pointer and the locus of the drawing are displayed on each of the common information display surfaces 14 and 24 (S185). Then, the process is completed. If the display of the locus of the drawing is not instructed in step S184, an operation corresponding to another display instruction is performed (S186). Then, the process is completed. If the instruction is not an instruction of change from another personal information processing apparatus 2 in step S181, that is, the instruction is an instruction of change from the own common information processing apparatus 1 or the own personal information processing apparatus 2, an operation corresponding to the own display instruction is performed (S187). Thus, the process is completed.

As described above, in the eighth embodiment, when the attendant A performs an operation of information from the own personal display unit 21, the attendant B who is looking at the operation of information which is being performed by the attendant A through the common display unit 11 or the own personal display unit 21 is able to easily recognize that the attendant A is moving the pointer and performing drawing. Also in a case where the attendant A performs an operation from the common display unit 11 and the attendant B looks at the operation performed by the attendant A through the own personal display unit 21, a similar result can be obtained. As described above, information on the common information display surface is not always shared among the information processing apparatuses but it is sometimes made to be different from one another. Thus, an intention of the attendant A can easily be transmitted to the attendant B who looks at a display surface different from that for the attendant A having the operation right.

NINTH EMBODIMENT

FIGS. 26A to 26D are schematic views showing examples of the operations and display of the ninth embodiment of the first aspect of the present invention. In the ninth embodiment, when a certain attendant having the operation right has moved the caret on the common information display surface 24, the common information processing apparatus 1 and the other personal information processing apparatuses 2 do not display the caret but displays the pointer in place of the caret.

Figure 26A:
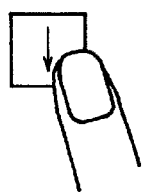
FIGS. 26A to 26D are schematic views showing examples of the operations and display according to the ninth embodiment.
Figure 26B:
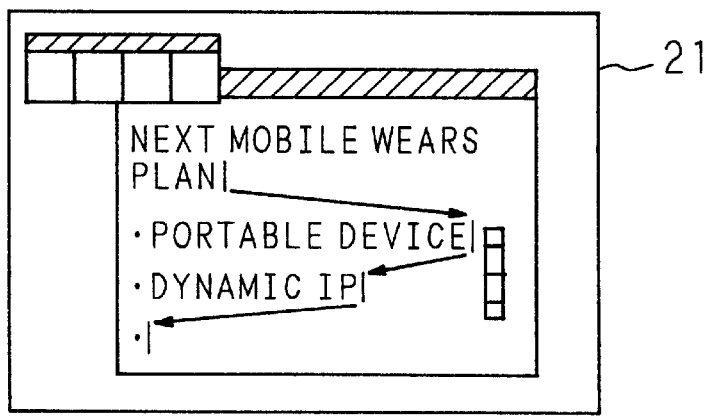
Figure 26C:
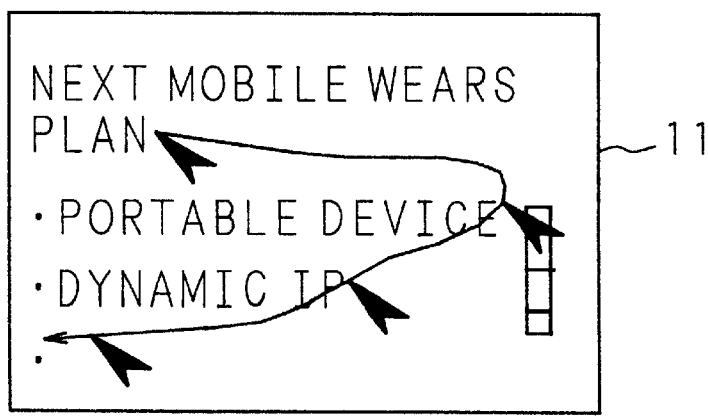
Figure 26D:
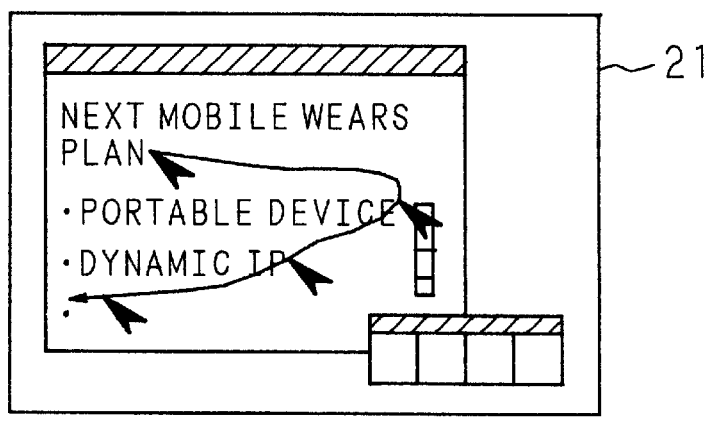

When an attendant A having the operation right has depressed several times the downward scroll key of the keyboard 52 to move the caret (see FIG. 26A), the caret is moved downwards (in a direction indicated by an arrow) by a length corresponding to the number of depression operations on the personal display unit 21 of the attendant A (see FIG. 26B). On the common display unit 11 and the personal display units 21 except that for the attendant A, the pointer is moved while smoothing the locus of the movement of the caret (as indicated by an arrow) (see FIGS. 26C and 26D). As described above, information of the movement of the caret is transmitted from the information control unit 30 of the attendant A to the common information processing apparatus 1 and the other personal information processing apparatuses 2. In this case, the caret is not displayed as instructed, but the display of the pointer is performed in place of the caret. Moreover, the pointer is not displayed at the position to which the caret is instructed to be moved. In order to smoothly change the display position, the movement coordinates are interpolated by using a group of information about instructed change positions for the caret obtained from a plurality of change operations.

Figure 27:
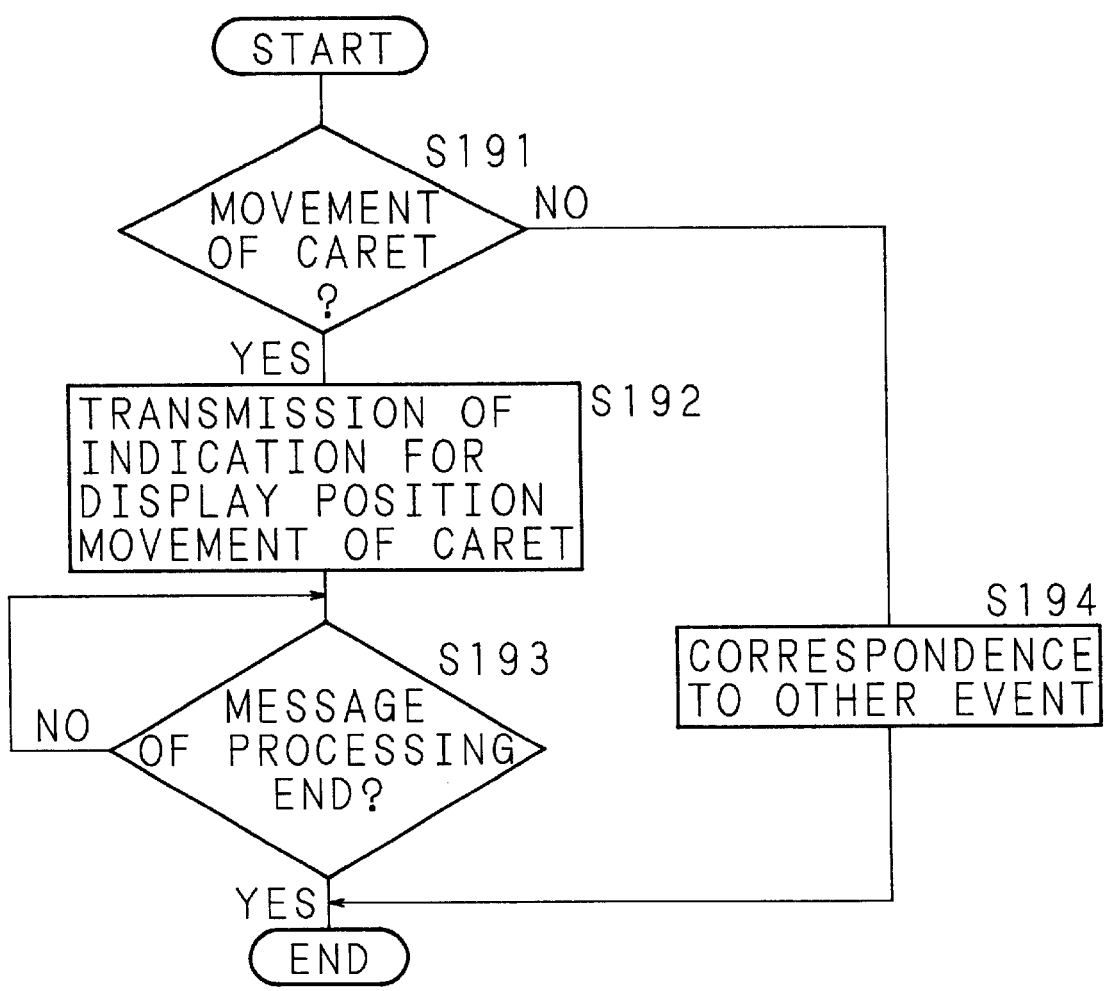
FIG. 27 is a flow chart showing the procedure of a process according to the ninth embodiment (the information control unit)
Figure 28:
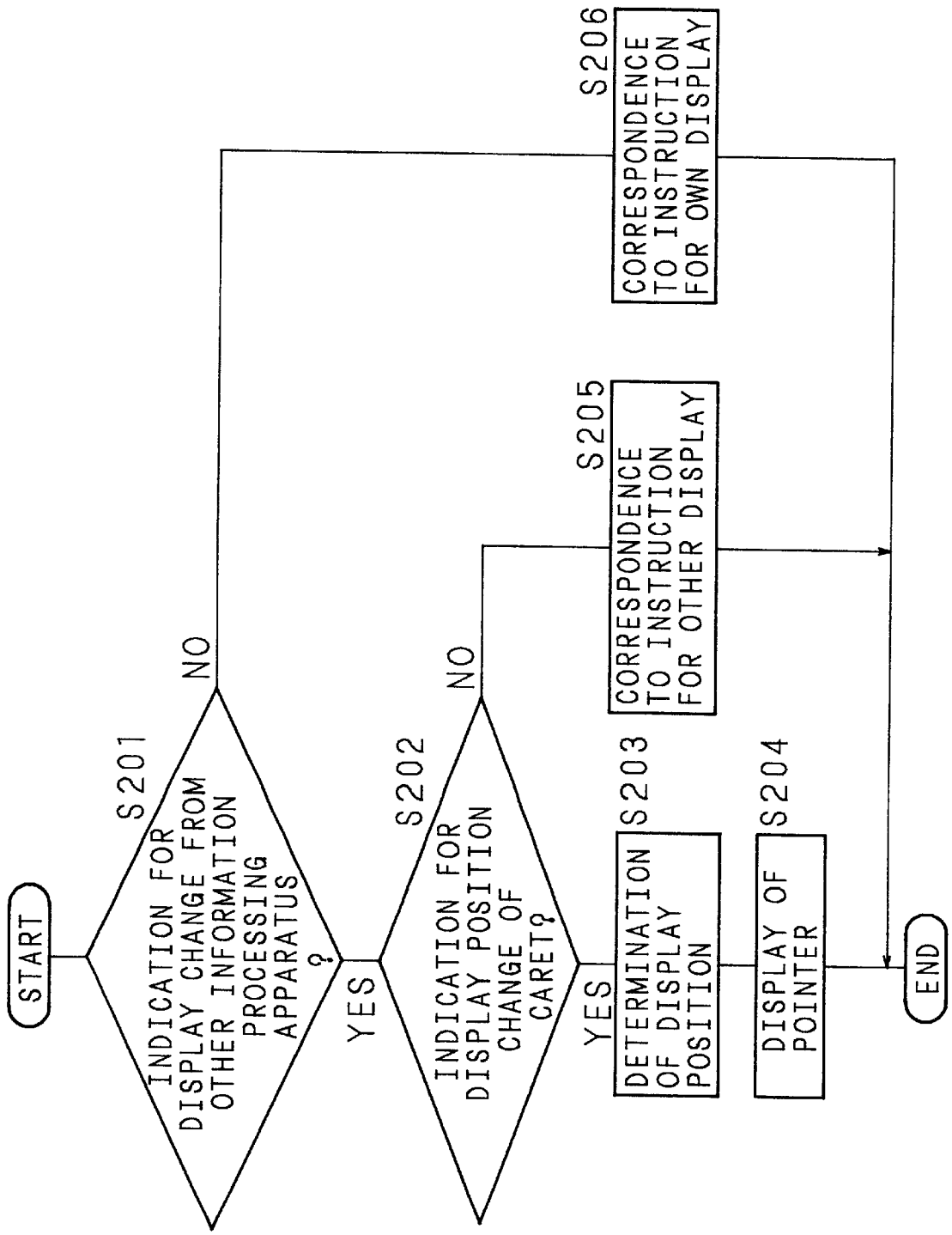
FIG. 28 is a flow chart showing the procedure of a process according to the ninth embodiment (the display processing unit)

FIGS. 27 and 28 are flow charts of the procedure of the process according to the ninth embodiment (see FIGS. 26A to 26D). FIG. 27 shows the procedure of a process to be performed by the information control unit 30 of the personal information processing apparatus 2 of the attendant A. FIG. 28 shows the procedure of a process to be performed by the display processing units 17 and 27 of the common information processing apparatus 1 and the personal information processing apparatuses 2 except that for the attendant A.

In a case where the relevant event is an operation event with respect to the common information display surface 24, whether or not it is movement of the caret is judged (S191). If the event is movement of the caret, an instruction to move the display position of the caret on the common information display surface is notified to the own display processing unit 27 and transmitted to the common information processing apparatus 1 and the other personal information processing apparatuses 2 (S192). When completion of the instructed process has been notified from the information processing apparatuses 1 and 2 (S193), the process is completed. If the event is not the movement of the caret is step S191, an operation corresponding to another instructed event is performed (S194). Then, the process is completed.

In a case where an instruction to change the display position has been inputted, whether or not the instruction is an instruction to change the display position from another personal information processing apparatus 2 is judged (S201). If the input is an instruction to change the display position from another personal information processing apparatus 2, whether or not the instruction is an instruction to move the display position of the caret is judged (S202). If the instruction is an instruction to move the caret, a smoothing calculation is performed by using information about same instructed positions for previous n times of instructions so that the display position is determined (S203). Then, the pointer is, in place of the caret, displayed at the determined display position on the common information display surfaces 14 and 24 (S204). Then, the process is completed. If the instruction is not the instruction to move the caret in step S202, an operation corresponding to another display instruction is performed (S205). Then, the process is completed. If the instruction is not an instruction of change from another personal information processing apparatus 2 in step S201, that is, the instruction is an instruction of change from the own common information processing apparatus 1 or the own personal information processing apparatus 2, an operation corresponding to the own display instruction is performed (S206). Thus, the process is completed.

As described above, in the ninth embodiment, information of the common information display surface is not always shared among the information processing apparatuses but it is sometimes made to be different. Thus, if a certain attendant has moved the caret to instruct the input position, the other attendants are able to be free from adverse stimulus caused from discontinuous display change of the caret.

TENTH EMBODIMENT

FIGS. 29A to 29L are schematic views showing examples of the operations and display of the tenth embodiment of the first aspect of the present invention. In a case where an attendant having the operation right performs a scrolling operation of the common information display surface 24, the contents of display are immediately changed on the display processing unit which is operated by the relevant attendant. However, initial and final changes are performed slowly on the other display processing units so that rapid change is moderated for the other attendants.

Figure 29A:
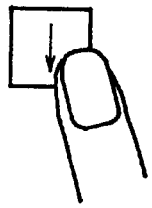
FIGS. 29A to 29L are schematic views showing examples of the operations and display according to the tenth embodiment.
Figure 29B:
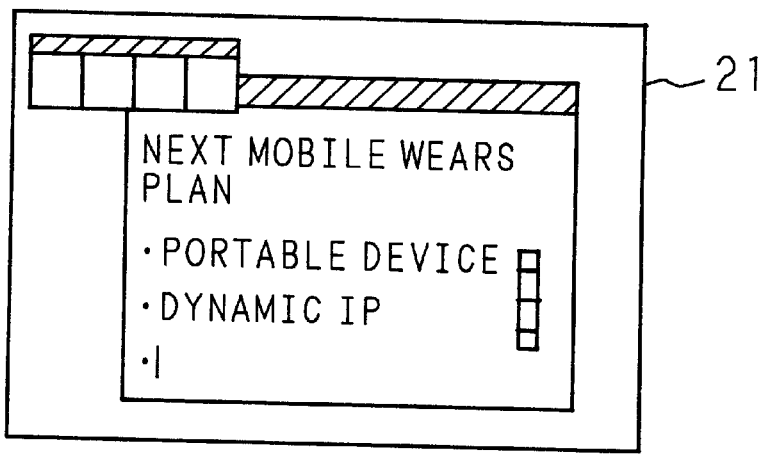
Figure 29C:
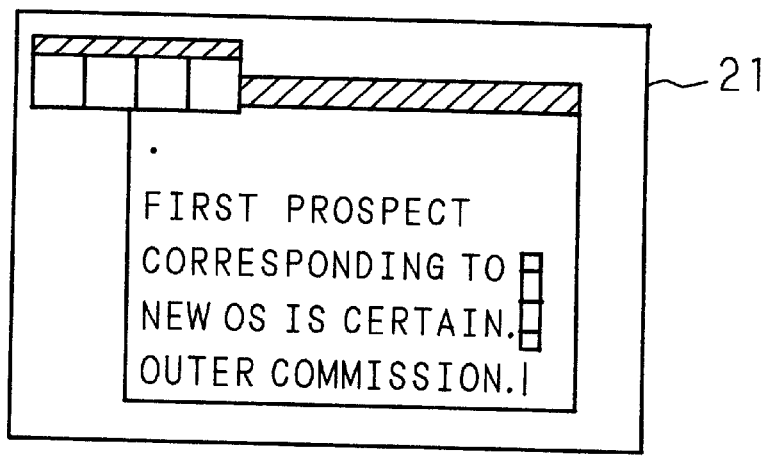
Figure 29D:
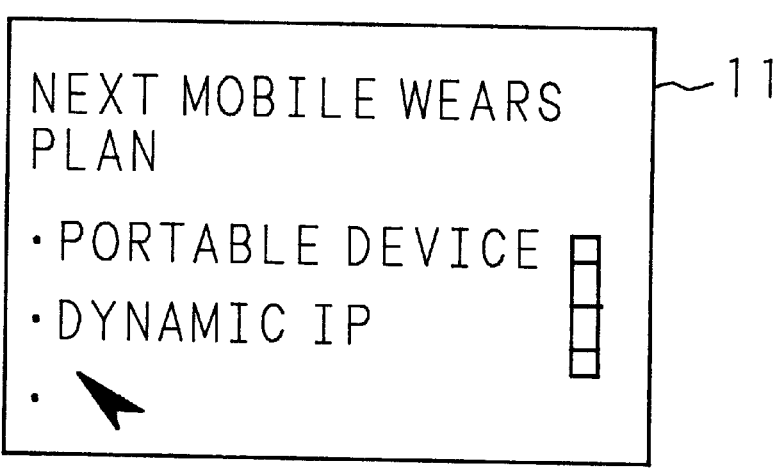
Figure 29E:
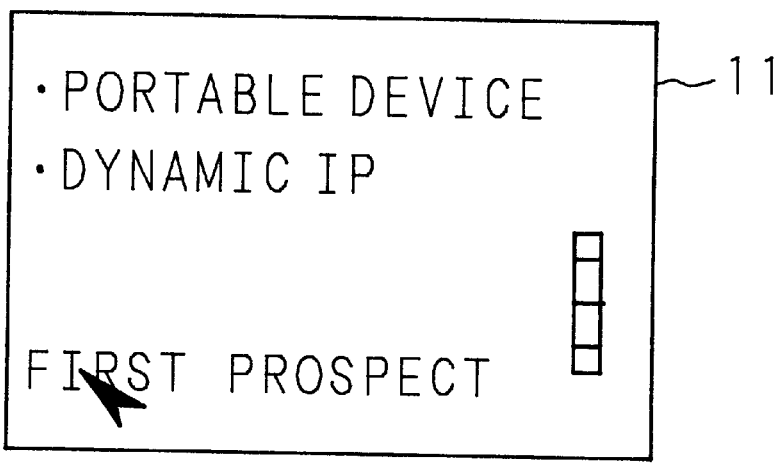
Figure 29F:
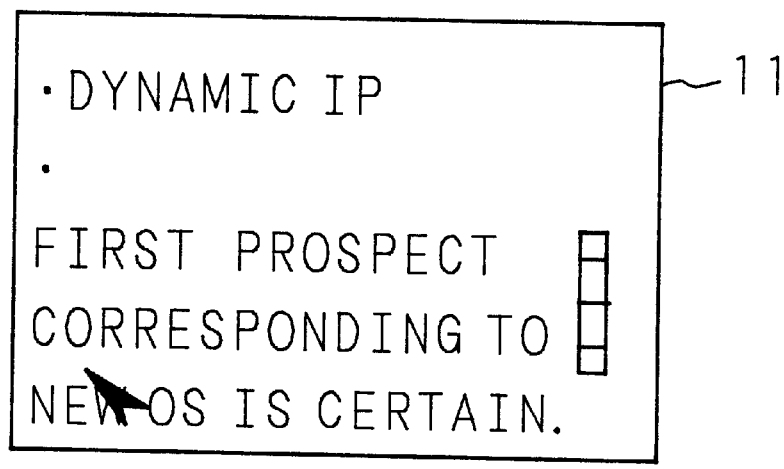

When an attendant who has acquired the operation right continuously depresses the downward cursor of the keyboard 52 to scroll the common information display surface 24 (see FIG. 29A), downward scrolling is quickly performed on the personal display unit 21 of the relevant attendant so that the displayed contents are changed (see FIGS. 29B and 29C). On the common display unit 11 and the other personal display units 21, displayed contents are initially changed slowly after scrolling has been started. Then, the scrolling speed is accelerated, and then the scrolling speed is decreased in the final portion (see FIGS. 29D, 29E and 29F). As described above, when the scrolling operation is performed, when a notification to fully change the display has been supplied from the information processing unit 23, the display is quickly and fully changed on the display processing unit 27. However, the display processing units 17 and 27 of the other information processing apparatuses 1 and 2 interpolate values between the present coordinates and the changed coordinates to change the display position so as to cause the display to be recognized to be continuously for the attendant. By finely performing the interpolation in the vicinity of the start and end of the scrolling operation, rapid change for a person who looks at the display can be moderated.

Figure 29G:
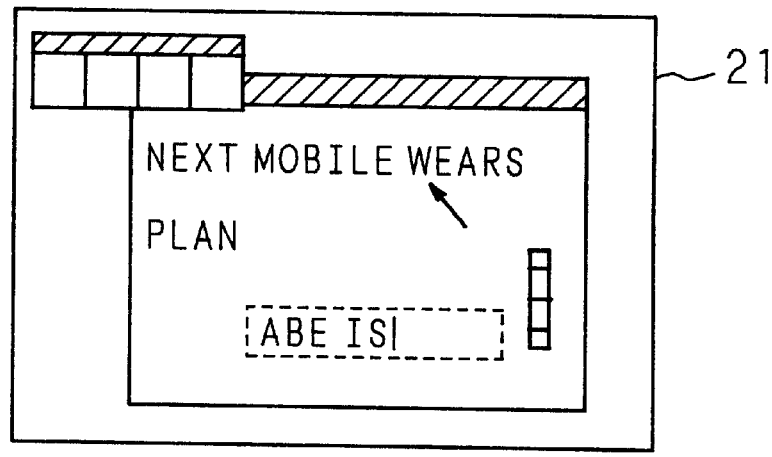
Figure 29H:
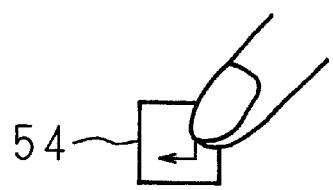
Figure 29I:
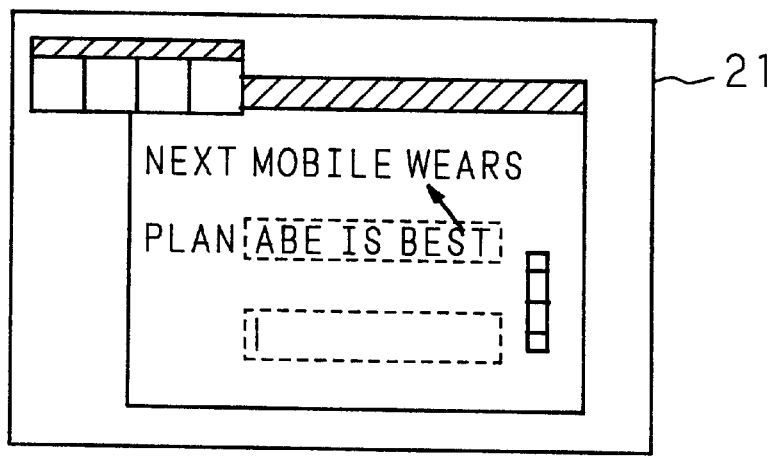
Figure 29J:
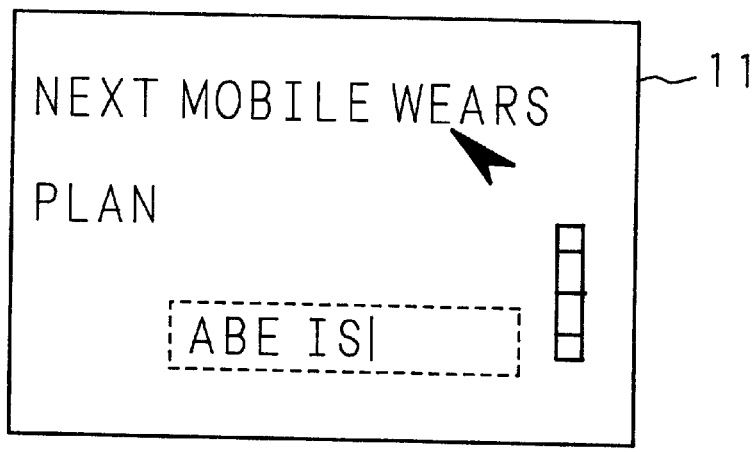
Figure 29K:
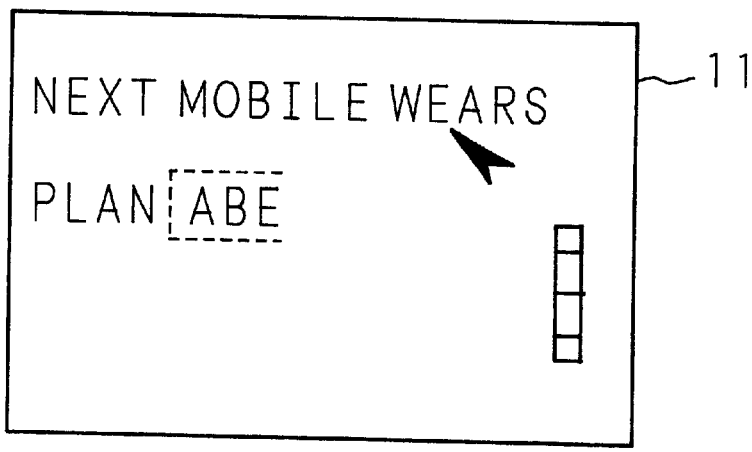
Figure 29L:
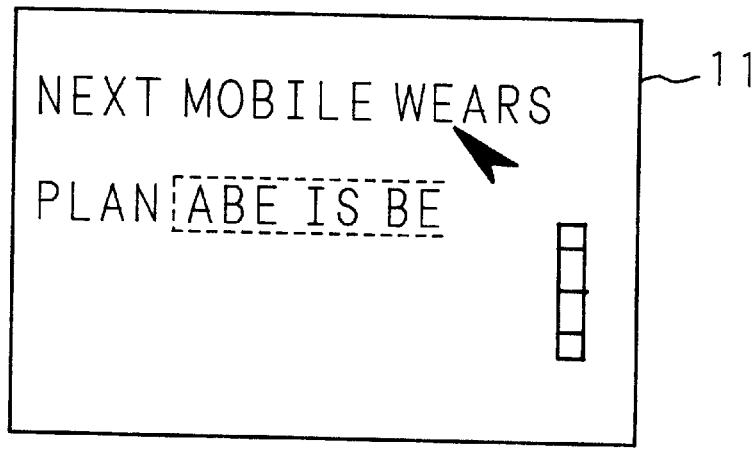

Information which is being inputted is displayed on the information input space 61 of the personal display unit 21 of the attendant who has acquired the operation right (see FIG. 29G). When input of information has been completed and the information creation end key 54 has been depressed (see FIG. 29H), a character object is independently and immediately moved upwards on the personal display unit 21 so that the character object is displayed as an information object (see FIG. 29I). On the common display unit 11 and the other personal display units 21, the independence and movement of the character object are performed while displaying intermediate states (see FIGS. 29J, 29K and 29L). In a case where a new information object is displayed, when a notification to fully change the display of the common information display surface is supplied from the information processing unit 23 which is operated by the attendant, the display processing unit 27 quickly and fully changes the display. On the other hand, the display processing units 17 and 27 of the other information processing apparatuses 1 and 2 acquire, as a bit map, information existing in the portion in which the display is performed. Information about the display and bit map information are not replaced at a stroke but display is performed in a stepped manner from the left to the right, that is, mixed display is performed so that rapid change for a person who looks at the display is moderated.

Figure 30A:
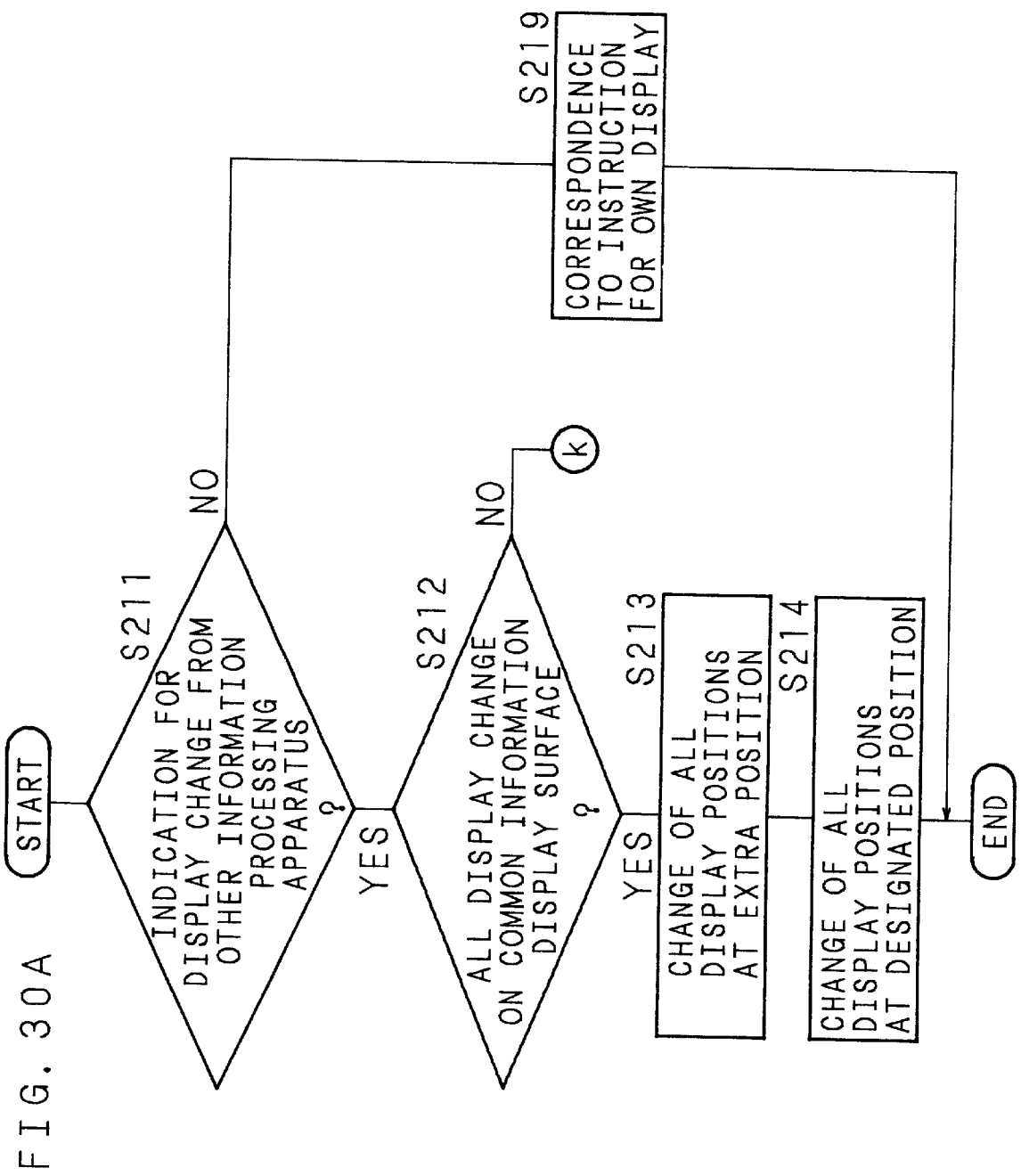
FIGS. 30A and 30B are flow charts showing the procedure of a process according to the tenth embodiment.
Figure 30B:
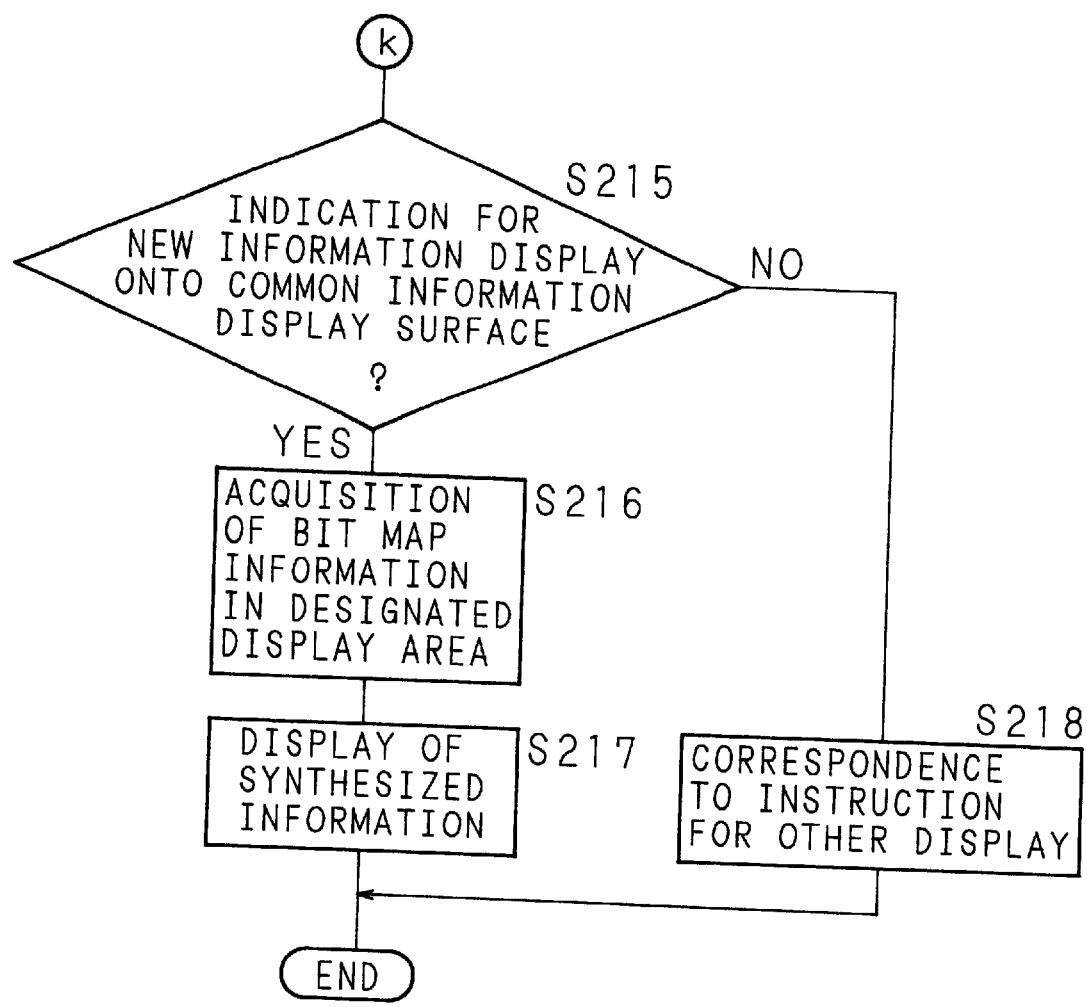

FIGS. 30A and 30B are flow charts showing the procedure of a process (the procedure of a process to be performed by the display processing units 17 and 27 of the common information processing apparatus 1 and the personal information processing apparatuses 2 of attendants except the attendant having the operation right) according to the tenth embodiment (see FIGS. 29A to 29L). In a case where an instruction to change the display position has been inputted, whether or not the instruction is a change instruction from another personal information processing apparatus 2 is judged (S211). If the instruction is a change instruction from another personal information processing apparatus 2, whether or not the change is full change of the display of the common information display surface is judged (S212). If the change is the full change of the display, a plurality of interpolating positions are set between the present display position and the instructed position and the full display position is changed at the set positions (S213). Then, the full display position is changed at the instructed positions (S214). Then, the process is completed. If the change is not the full display change of the common information display surface in step S212, whether or not the instruction is an instruction to display new information on the common information display surface is judged (S215). If display of new information is instructed, bit map information of the instructed display region of the new information item is acquired (S216). Information synthesized by the new information item and the bit map information item while raising the ratio of the new information item is displayed (S217). Then, the process is completed. If the display of new information is not instructed in step S215, an operation corresponding to another display instruction is performed (S218). Then, the process is completed. If the instruction is not supplied from another personal information processing apparatus 2 in step S211, that is, if the instruction of change is supplied from the common information processing apparatus 1 or the own personal information processing apparatus 2, an operation corresponding to the own instruction of display is performed (S219). Then, the process is completed.

As described above, the tenth embodiment has the structure such that information of the common information display surface is not always shared by the information processing apparatuses but it is sometimes changed. As a result, other attendants who are looking the display are enabled to be free from adverse stimulus when an attendant having the operation right performs information scrolling (full change of the display) or displays new information.

ELEVENTH EMBODIMENT

FIGS. 31A to 31D are schematic views showing examples of the operations and display of the eleventh embodiment of the first aspect of the present invention. In the eleventh embodiment, when a attendant having the operation right has depressed the cursor key, whether the cursor key is used to shift the caret or to perform scrolling is judged in accordance with the depression frequency of the cursor key.

Figure 31A:
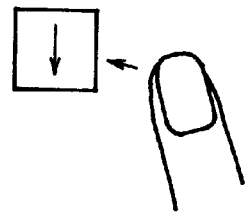
FIGS. 31A to 31D are schematic views showing examples of the operations and display according to the eleventh embodiment.
Figure 31B:
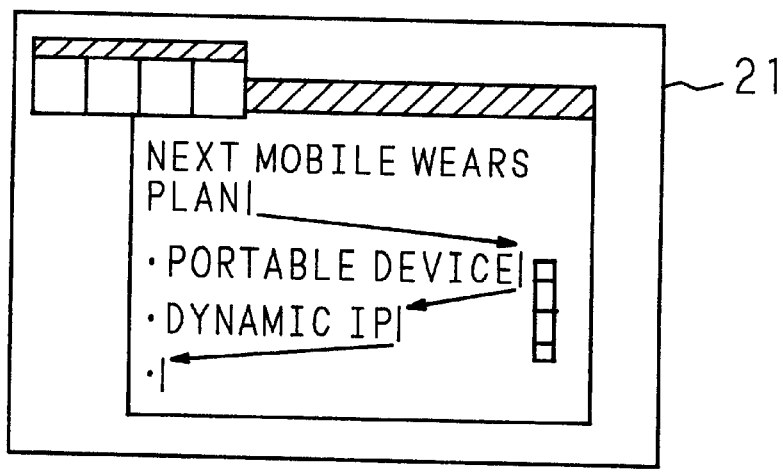
Figure 31C:
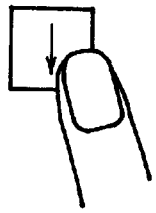

When an attendant having the operation right has slowly depressed a downward scroll key of the keyboard 52 several times to move the caret (see FIG. 31A), the caret is downwards moved by a degree corresponding to the number of the depression operations on the personal display unit 21 of the relevant attendant (see FIG. 31B). Also the foregoing movement is reflected on the common display unit 11 and the other personal display units 21. The foregoing operation is enabled by the operation of the information control unit 30 of the relevant attendant which is performed such that a fact that the operation is the movement of the caret is determined and notification of the movement of the caret is transmitted to the common information processing apparatus 1 and the other personal information processing apparatuses 2.

Figure 31D:
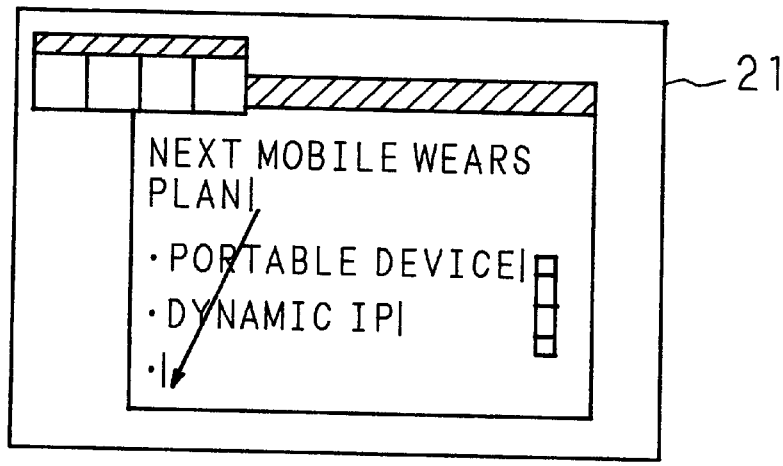

When the attendant having the operation right has successively depressed the downward scroll key of the keyboard 52 to perform scrolling (see FIG. 31C), the caret on the personal display unit 21 of the relevant attendant is, at a stroke, moved to the final line of the common information display surface 24 as indicated by an arrow (see FIG. 31D). Also the foregoing movement is reflected on the common display unit 11 and the other personal display units 21. The foregoing operation is enabled by the operation of the information control unit 30 of the relevant attendant which is performed such that a fact that the operation is the scrolling operation is determined and notification of the scroll movement is transmitted to the common information processing apparatus 1 and the other personal information processing apparatuses 2.

Figure 32:
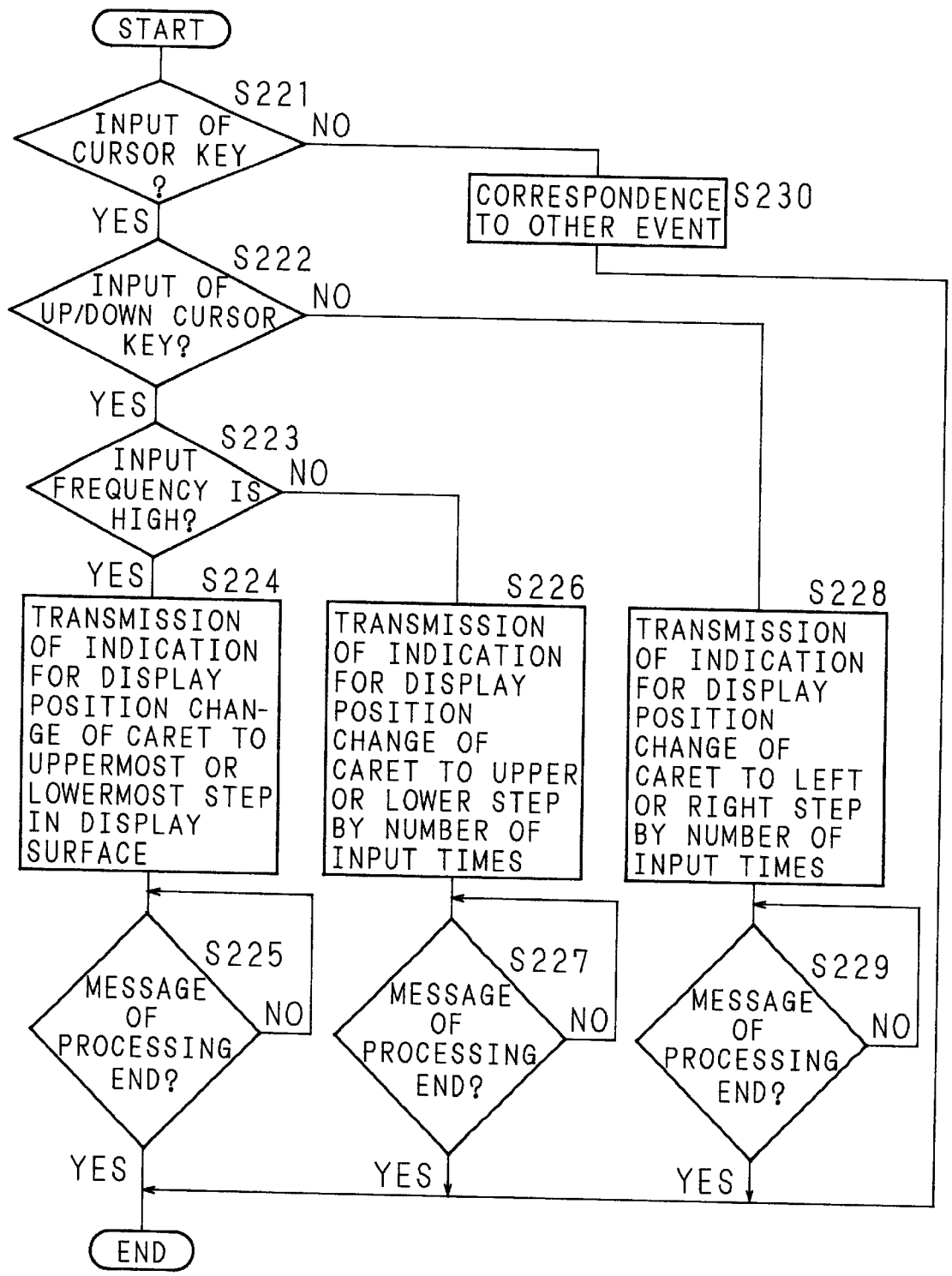
FIG. 32 is a flow chart showing the procedure of a process according to the eleventh embodiment.

FIG. 32 is a flow chart showing the procedure of a process (the procedure of a process which is performed by the information control unit 30 of the personal information processing apparatus 2 of the attendant having the operation right) according to the eleventh embodiment (see FIGS. 31A to 31D). In the case where the event is an operation event with respect to the common information display surface 24, whether or not the operation is an input of a cursor key is judged (S221). If the operation is an input of the cursor key, whether or not the input is the input of the up/down cursor key is judged (S222). If the input is the input of the up/down cursor key, whether or not the input frequency is higher than a predetermined frequency is judged (S223). If the frequency is higher than the predetermined value, a determination is performed that the foregoing input is a scrolling operation so that an instruction to change the display position of the caret on the common information display surface to the uppermost or lowermost portion is notified to the own display processing unit 27 and transmitted to the common information processing apparatus 1 and the other personal information processing apparatuses 2 (S224). When completion of the instructed process has been notified from the information processing apparatuses 1 and 2, the process is completed.

If the input frequency is lower than the predetermined frequency in step S223, a determination is performed that the input is movement of the caret and an instruction to change the display position of the caret on the common information display surface upwards or downwards by a degree corresponding to the number of input operations is notified to the own display processing unit 27 and transmitted to the common information processing apparatus 1 and the other personal information processing apparatuses 2 (S226). When completion of the instructed process has been notified from the information processing apparatuses 1 and 2 (S227), the process is completed. If the input is not the input of the up/down cursor key in step S222, an instruction to change the display position to the right-hand or left-hand character from the present display position of the caret on the common information display surface by a degree corresponding to the number of input operations is notified to the own display processing unit 27 and transmitted to the common information processing apparatus 1 and the other personal information processing apparatuses 2 (S228). When completion of the instructed process has been notified from the information processing apparatuses 1 and 2 (S229), the process is completed. If the input is not the input of the cursor key in step S221, an operation corresponding to another instructed event is performed (S230). Then, the process is completed.

As described above, even if two functions can be performed by a certain operation, the person who uses a function does not encounter a problem because the person recognizes the intention. The eleventh embodiment has the structure such that the function is identified corresponding to the state of the operation (in this case, the state is the frequency) so as to perform different processes in accordance with the operation in a case where an attendant who performs an operation and attendants who look at the result of the operation exist. Thus, attendants who look at the result can be free from adverse stimulus.

In the above-described first to seventh and tenth embodiments, the kind of information object is limited to a text. However, respective embodiments may have the structure such that the information input space is an input space for drawing, an attendant having acquired the operation right draws desired information with a pen on such the information input space and the drawn information becomes independent as a drawing object when completion of input has been notified.

Figure 33:
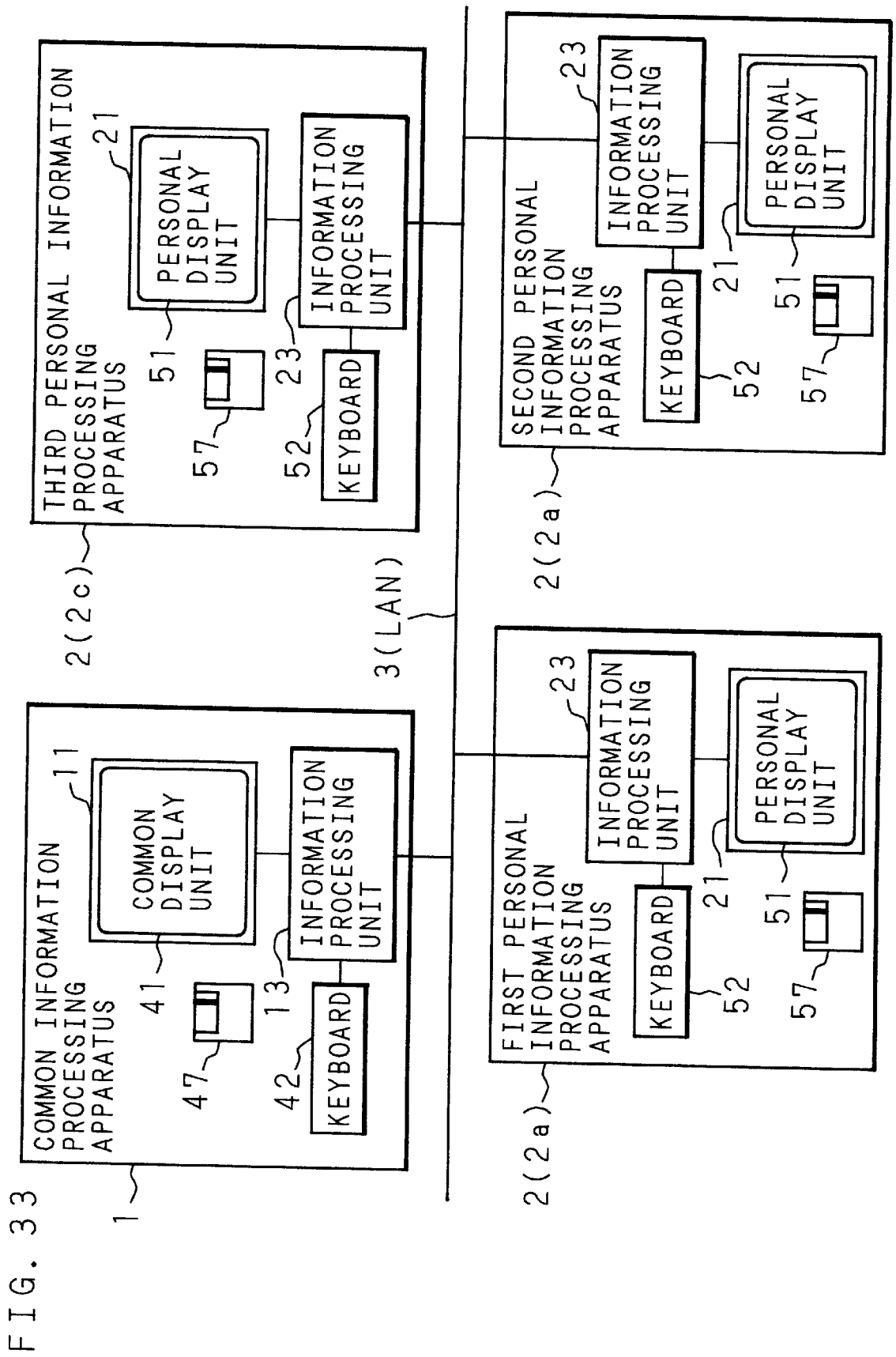
FIG. 33 is a schematic view showing an example of the basic structure of a conference support system (the second aspect)

Embodiments of the second aspect of the present invention will now be described. FIG. 33 is a schematic view showing an example of the basic structure of a conference support system according to the second aspect of the present invention. Referring to FIG. 33, reference numeral 1 represents a common information processing apparatus disposed at a position at which all of attendants are able to look, and 2 represents a personal information processing apparatus which is assigned to each of the attendants and disposed on a desk of each of them. The common information processing apparatus 1 and personal information processing apparatuses 2 are connected to one another through a LAN 3 which is a data communication passage so that mutual information communication is enabled. In this embodiment, three personal information processing apparatuses 2 (the first personal information processing apparatus 2a, the second personal information processing apparatus 2b and the third personal information processing apparatus 2c) are provided for the system.

Figure 4:
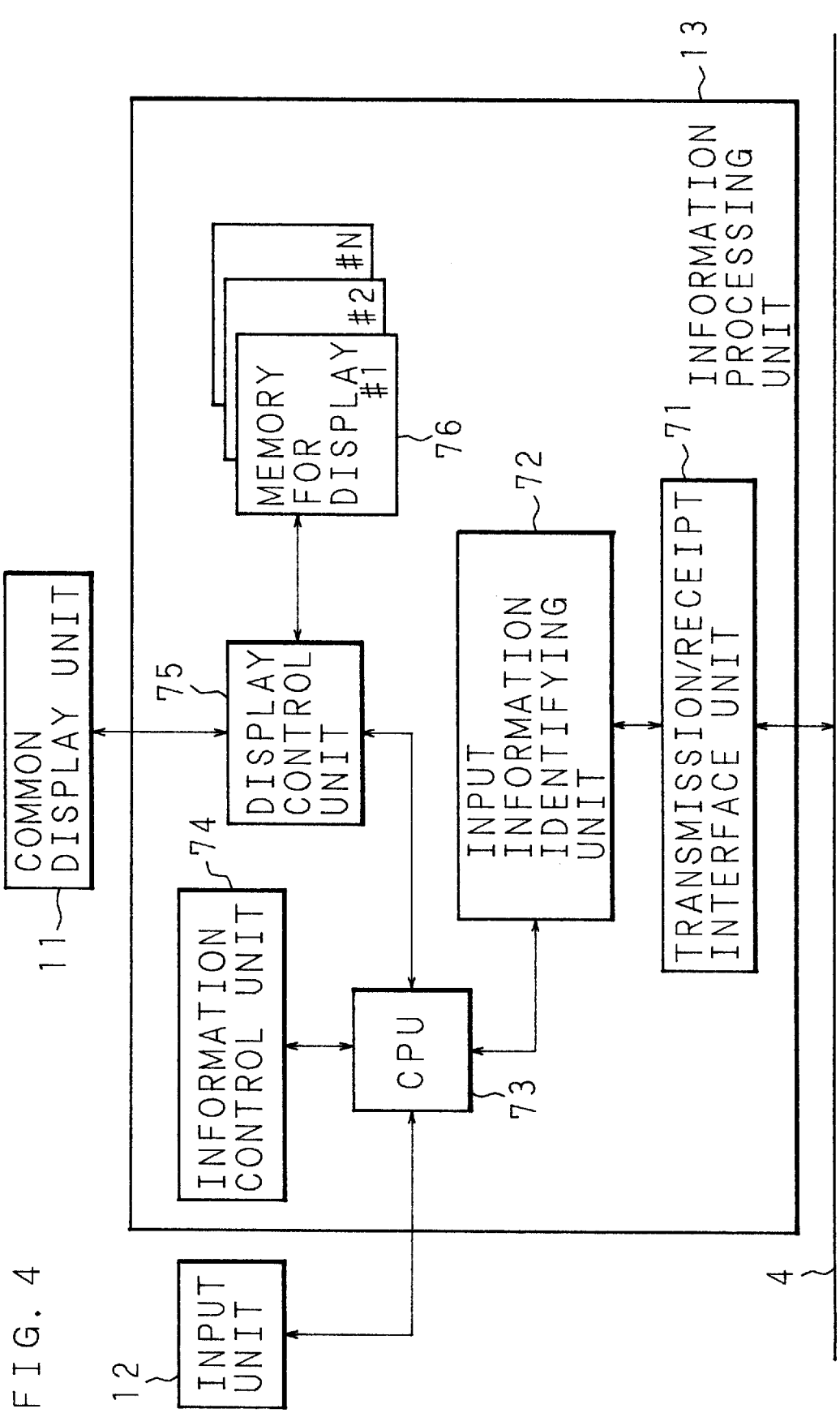
FIG. 4 is a schematic view showing the structure (the second aspect) of the information processing unit.

The common information processing apparatus 1 consists of a common display unit 11 having a projector of a size of 50 to 60 inches, an input unit 12 having a touch sensor 41 attached to the upper surface of the common display unit 11 and a keyboard 42 connected to the information processing unit 13, and an information processing unit 13 having a computer including hardware structured as shown in FIG. 4. Each personal information processing apparatus 2 consists of a personal display unit 21 having a liquid crystal tablet of a size about 10 inches, an input unit 22 having a touch sensor 51 attached to the upper surface of the personal display unit 21 and a keyboard 52 connected to the information processing unit 23 and an information processing unit 23 having a personal computer for controlling display of information, drawing, edition input. The information processing unit 13 having the computer and the information processing unit 23 having the personal computer uses programs for performing processes, to be described later, which are loaded from computer memory products 47 and 57 which are magnetic disks or the like having the programs recorded therein.

FIG. 34 shows an example of a control table registered in an information control unit 74 of the information processing unit 13. Attribute information for display is previously determined for each of the personal information processing apparatuses 2a, 2b and 2c. In this embodiment, attribute information includes, color of drawings, character font and thickness of line. Whether or not the attribute information to which the submission of the display is made may arbitrarily be selected by the common information processing apparatus 1.

Information for coloring including red, blue and green is previously determined with respect to the personal information processing apparatuses 2a, 2b and 2c. FIGS. 35A and 35B show an example of color distinction in the common display unit 11. A hand-written drawing supplied from the first personal information processing apparatus 2a is drawn in red as indicated by locus P shown in FIGS. 35A and 35B. On the other hand, a hand-written drawing supplied from the second personal information processing apparatus 2b is drawn in blue as indicated by locus Q shown in FIG. 35B. By making the difference of color among the attendants, the attendant who has inputted the information item can easily be recognized by all of the attendants.

Character font information includes San Serif, Mincho typeface and round character with respect to the personal information processing apparatuses 2a, 2b and 2c. FIGS. 36A and 36B show examples of distinction by means of the character font in the common display unit 11. Input by using the keyboard supplied from the first personal information processing apparatus 2a is displayed in the San Serif font shown in FIGS. 36A and 36B, while input from the second personal information processing apparatus 2b is displayed in the Mincho typeface shown in FIG. 36B. By changing the character font of character information from each attendant, the attendant who has inputted the information item can easily be recognized by all of the attendants.

Figure 38:
FIG. 38 is a diagram showing an example of display on the screen in which name of person who inputted information is added.

FIG. 37 shows another example of the control table registered in the information control unit 74. The control table shown in FIG. 37 includes user's names (names of attendants) X, Y and Z in addition to the three types of attribute information items shown in FIG. 34 for each of the personal information processing apparatuses 2a, 2b and 2c. In a case where the foregoing control table is provided, an example of display in which the distinction by means of the user name in the common display unit 11 as shown in FIG. 38 such that the user name is automatically added and displayed by the common information processing apparatus 1 with respect to the input from each of the personal information processing apparatuses 2a, 2b and 2c is an effective method.

Figure 39A:
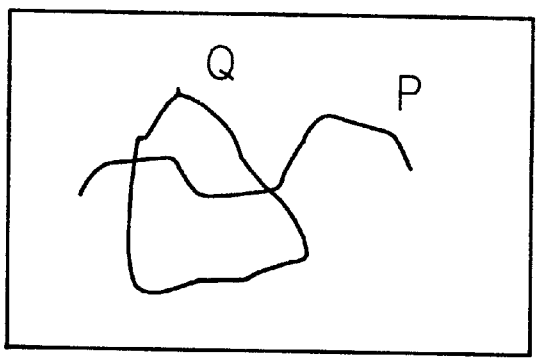
FIGS. 39A and 39B are diagrams showing examples of display when a movement process is performed.
Figure 39B:
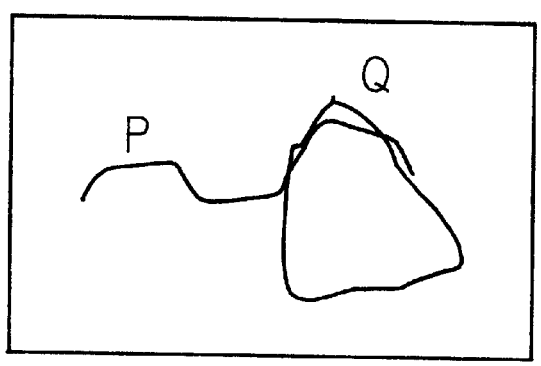

The, the editing process will now be described. An assumption is performed that hand-written drawings P and Q supplied from the first personal information processing apparatus 2a and the second personal information processing apparatus 2b are displayed while being superimposed as shown in FIG. 39A. When a user (an attendant) of the second personal information processing apparatus 2b indicates a region or an object to select the hand-written drawing Q which the user has inputted and performs an operation to move it to the right on the screen, the hand-written drawing P is not moved as shown in FIG. 39B. On the other hand, only the hand-written drawing Q is moved to the right so as to be displayed. Even if a user of a personal information processing apparatus 2 except the user of the second personal information processing apparatus 2b performs a similar operation, the hand-written drawing Q is not moved.

An assumption is performed that hand-written drawings P and Q supplied from the first and second personal information processing apparatuses 2a and 2b are displayed while being superimposed as shown in FIG. 40A. When a user (an attendant) of the second personal information processing apparatus 2b performs an operation such that the user selects the hand-written drawing Q which the user has inputted and then deletes the same, the hand-written drawing P is not deleted but only the hand-written drawing Q is deleted, as shown in FIG. 40B. Even if a user of a personal information processing apparatus 2 except the user of the second personal information processing apparatus 2b performs a similar operation, the hand-written drawing Q is not deleted.

As described above, the operation for editing information inputted by a certain attendant can be performed by only the relevant attendant. As a result, the information inputted by the certain attendant cannot be edited by the other attendants such that it is moved or deleted.

If information inputted by another person cannot be edited, inconvenience sometimes takes place. Accordingly, a special mode is provided to enable a super user to arbitrarily edit information inputted by another attendant.

Although the foregoing embodiment has the structure such that the display attribute, such as the coloring of the drawing and character font corresponds to the personal information processing apparatuses 2a, 2b and 2c, a structure may be employed in which one display attribute corresponds to some inputs from the personal information processing apparatuses 2a, 2b and 2c. In addition to the display in which the color of the drawing is variable with respect to each of the personal information processing apparatuses 2a, 2b and 2c, as shown in FIG. 34, another color, for example, display in black is additionally provided to enable all of the attendants to edit black drawing information.

Figure 41:
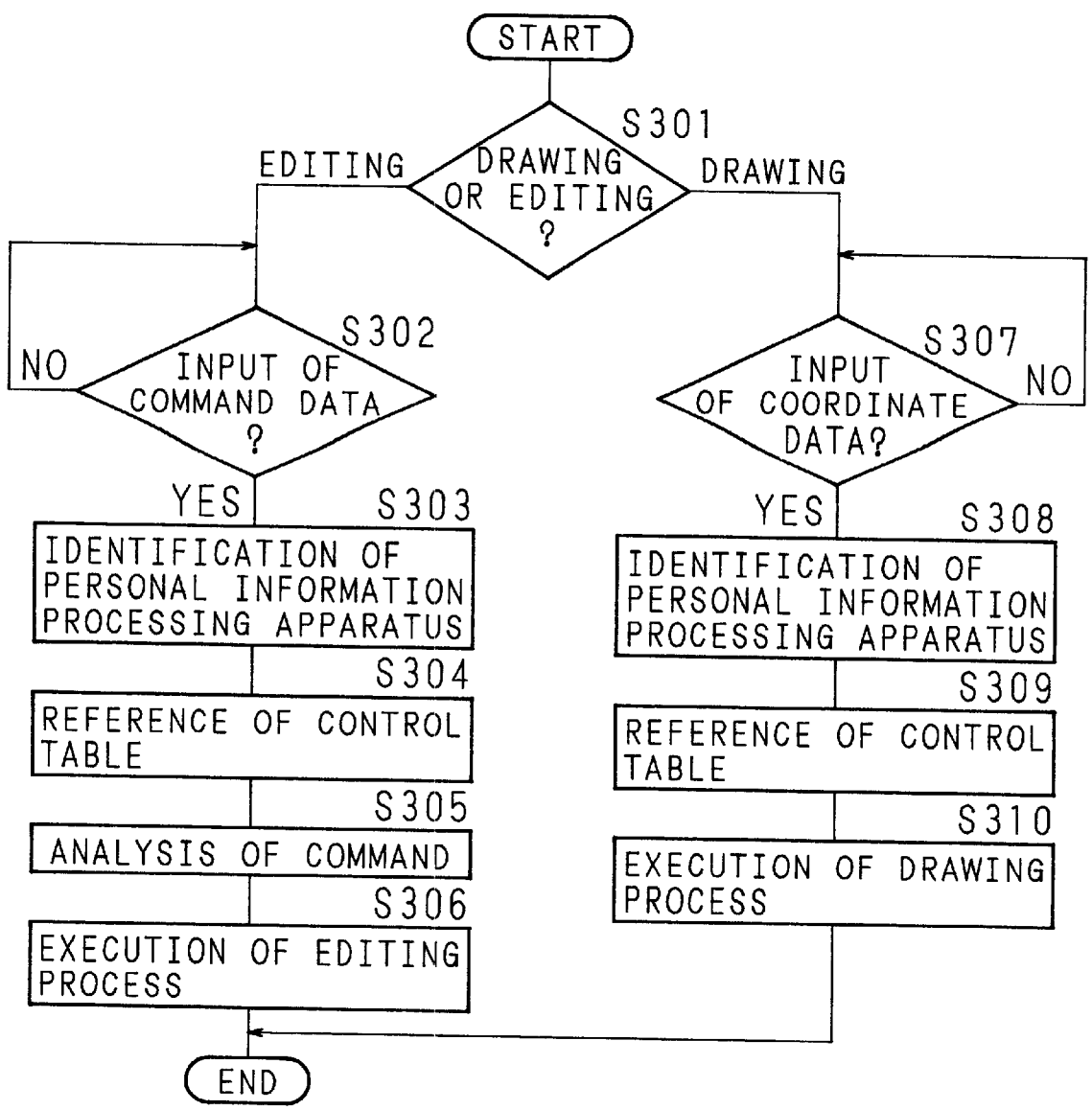
FIG. 41 is a flow chart showing the procedure of a process to be performed by the information processing unit according to the second aspect.

FIG. 41 is a flow chart showing the procedure of a process to be performed by the information processing unit 13 of the common information processing apparatus 1 according to the second aspect of the present invention. Initially, it is judged whether the instruction from the personal information processing apparatus 2 is an editing process or a drawing process (S301). If the process is an editing process, whether or not data input (command input indicating the type of the editing process) has been made is judged (S302). If data input has been made, the personal information processing apparatus 2 which has inputted the data item is identified by the input information identifying unit 72 (S303). Then, a reference to the control table in the information control unit 74 is made to obtain attribute information of the identified personal information processing apparatus 2 at the time of the display (S304). Then, the input command is analyzed to determine the type of editing process (S305). Then, the determined editing process is performed (S306), and then the process is completed.

If the process is a drawing process in step S301, whether or not data input (input of coordinate data indicating the position of the drawing) has been made is judged (S307). If data input has been made, the personal information processing apparatus 2 which has inputted the data item is identified by the input information identifying unit 72 (S308). Then, a reference to the control table in the information control unit 74 is made to obtain attribute information of the identified personal information processing apparatus 2 at the time of the display (S309). In accordance with the obtained attribute information, a drawing process is performed (S310). Then, the process is completed.

Since the second aspect of the present invention has the structure such that information inputted from attendants is controlled for each attendant in the common information processing apparatus 1, addition of a filtering function to the common information processing apparatus 1 enables only information inputted by one or some particular attendants to be displayed on the common display unit 11 and the personal display units 21.

Figure 42:
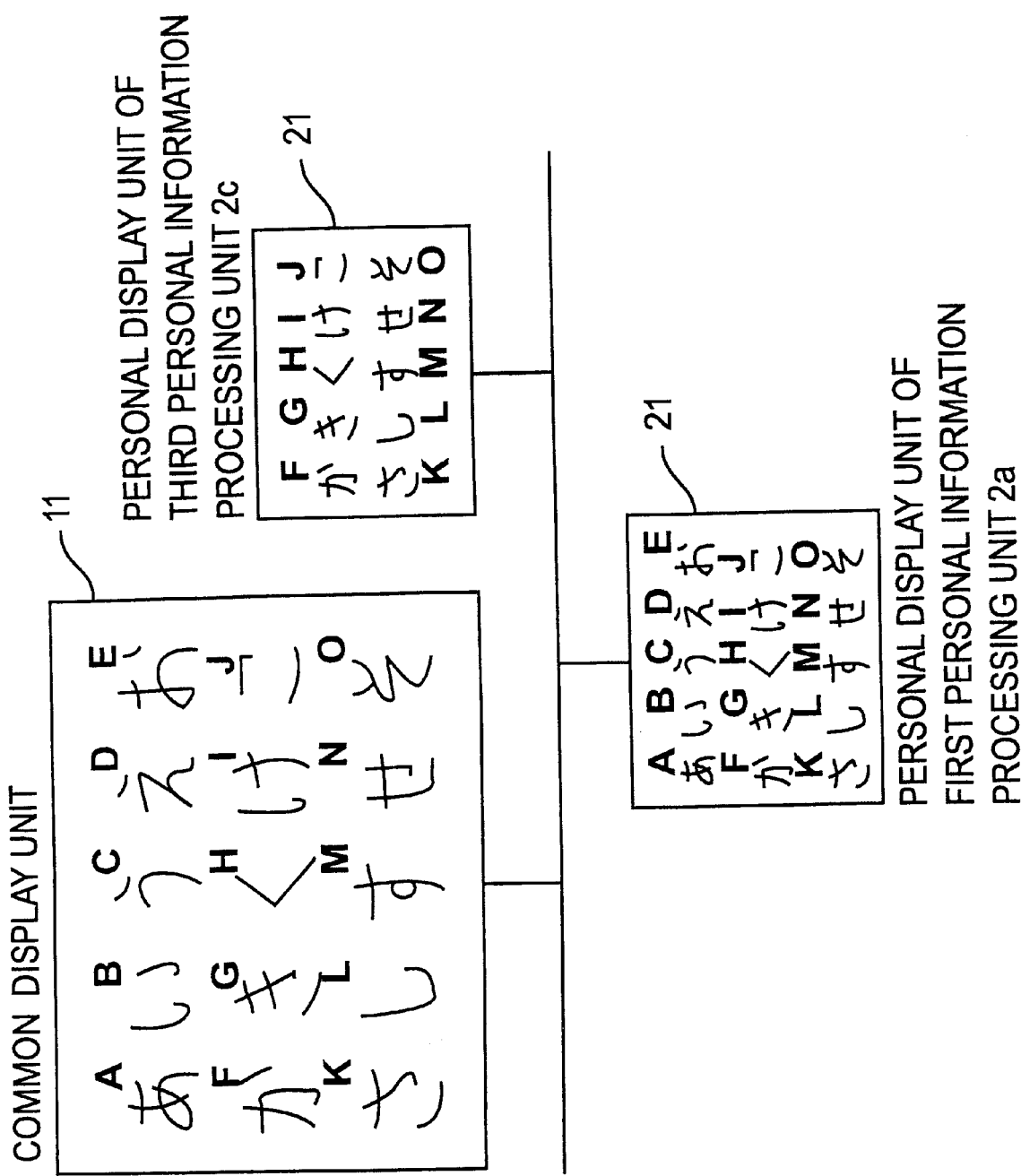
FIG. 42 is a diagram showing an example of display of a filtering process.

If an instruction of one or some particular personal information processing apparatuses 2 is performed from a certain personal information processing apparatus 2, only information inputted from the instructed personal information processing apparatus 2 is selected from all of the input information items to transmit the selected input information to the personal information processing apparatus 2 which has performed the instruction. Thus, the attendant of the personal information processing apparatus 2 which has performed the instruction is able to look information inputted by a required attendant. FIG. 42 is a schematic view showing an example of the display of the foregoing structure.

As shown in FIG. 42, information supplied from the first personal information processing apparatus 2a is displayed with a thick line, while information supplied from the second personal information processing apparatus 2b is displayed with a thin line. A requirement for transferring all of information items is transmitted from the first personal information processing apparatus 2a to the common information processing apparatus 1. Thus, all of information items on the common display unit 11 are also displayed on the personal display unit 21 of the first personal information processing apparatus 2a. On the other hand, the third personal information processing apparatus 2c transmits, to the common information processing apparatus 1, a requirement of transference of information while instructing only the first personal information processing apparatus 2a. In order to satisfy the requirement above, the common information processing apparatus 1 filters information and transfers only information inputted from the first personal information processing apparatus 2a to the third personal information processing apparatus 2c. On the personal display unit 21 of the third personal information processing apparatus 2c, only information (drawing information drawn with a thick line) inputted from the first personal information processing apparatus 2a is displayed.

Figure 43:
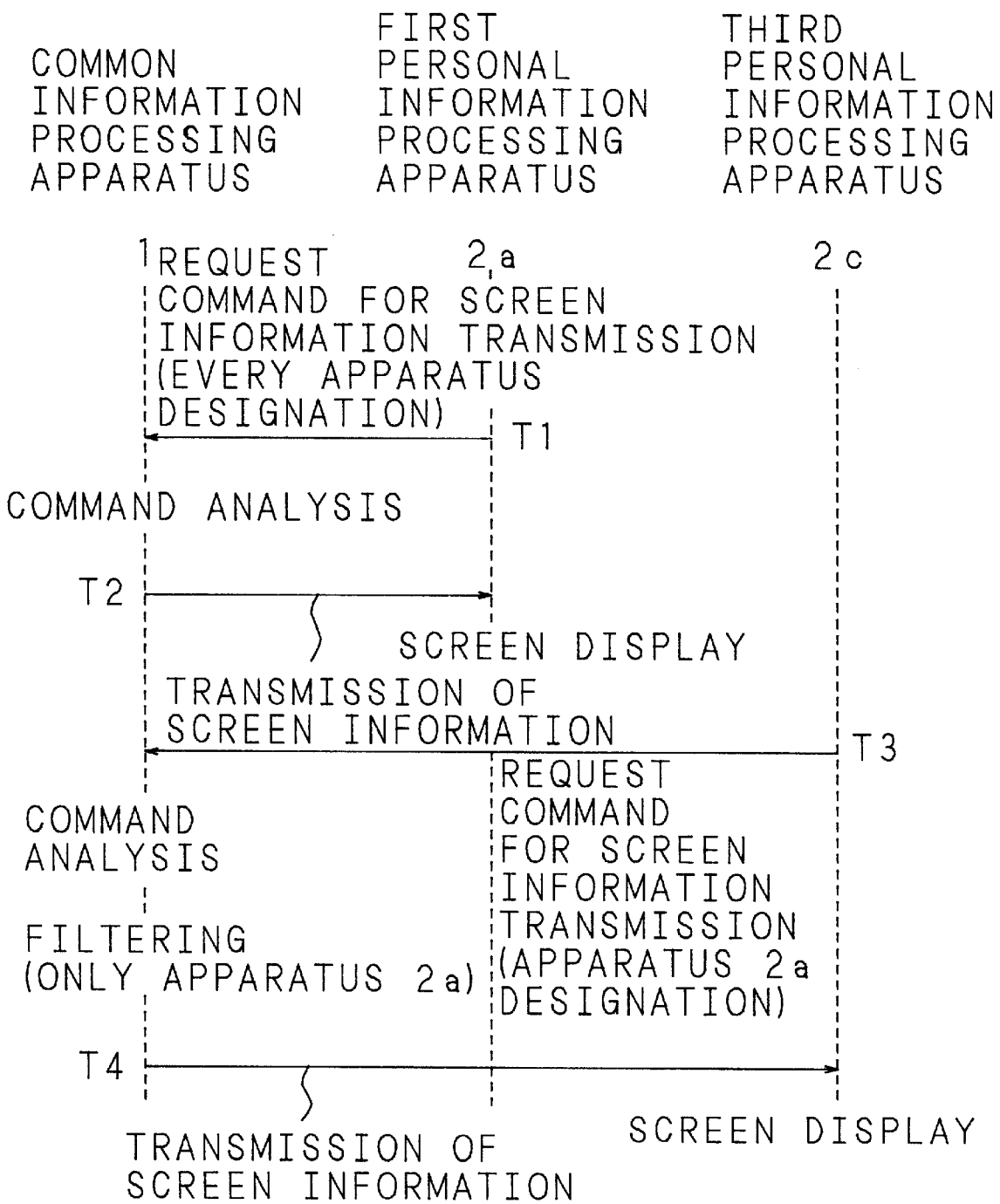
FIG. 43 is a diagram showing a state transition when the filtering display process is performed.

FIG. 43 is a diagram showing transition of the states. A command to transfer screen information of all of information items is transmitted from the first personal information processing apparatus 2a to the common information processing apparatus 1 (T1). The common information processing apparatus 1 analyzes the command and transfers all of screen information items to the first personal information processing apparatus 2a (T2). The first personal information processing apparatus 2a displays all of the screen information items on the personal display unit 21 thereof. The third personal information processing apparatus 2c transmits, to the common information processing apparatus 1, a command to transfer screen information while instructing only screen information of the first personal information processing apparatus 2a (T3). The common information processing apparatus 1 analyzes the command, filters only screen information of the first personal information processing apparatus 2a and transfers the screen information item to the third personal information processing apparatus 2c (T4). The third personal information processing apparatus 2c displays only the screen information of the first personal information processing apparatus 2a on the personal display unit 21 thereof.

As described above, according to the first aspect of the present invention, when an attendant of a conference has acquired the operation right, an information input space is immediately prepared. Whenever input has been completed, input information is displayed as an information object. Therefore, the attendant is able to devotedly perform information creating operation without a necessity of considering the relationship with existing information. When one input operation has been completed, the information input space is brought to a state for waiting for new input. Since the current information object is automatically disposed in an empty space among the displayed previous information objects, some information items can easily be successively inputted if the attendant once acquires the operation right. Since input information, which is being created, can be displayed on the common information display surface, incomplete information can easily be presented to other attendants.

In the first aspect, for an attendant who has acquired the operation right, the information input space is turned on at the timing of the acquisition of the operation right, and the display position of the information input space is not changed. However, for the other attendants, the information input space begins to appear when starting an information input, and the information input space can be moved even if the information item is being created. Therefore, requirements different between the attendant who performs the operation and the attendants who look at the display can be satisfied. Therefore, an information object can be created and presented on the common information display surface. Since the operation of the attendant having the operation right is displayed in a different manner on the display unit of the attendant who looks at the display, the attendant who looks at the display can be made free from adverse stimulus. Since the operation function which can be realized among some functions each of which is realized by one type of operation is changed, the attendant who looks at the display can be made free from adverse stimulus from the result of the operation of the attendant who performs the operation.

In the second aspect, in a conference in which some attendants create information, input information from each attendant is controlled in accordance with the attribute information. Therefore, the attendant who has inputted information, that is, the attribution can be recognized. Moreover, the attribution can be secured then information is edited. In addition, a particular attendant can be instructed and only information created by the instructed attendant can be displayed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims or equivalence of such metes and bounds thereof are therefore intended to be embraced by the claims.

What is claimed is:

1. A conference support system having a main information processing apparatus including a main display unit for displaying information, and a plurality of sub-information processing apparatuses, each having a sub-display unit for displaying information, the apparatuses being connected to one another through a communication passage to communicate information, said conference support system comprising:

means for displaying an information display surface on which independent information objects are created, displayed, edited and positioned in accordance with an operation of the main information processing apparatus and/or each of the sub-information processing apparatuses, on the main display unit and each sub-display unit;

means for determining an operation right for one of the plurality of sub-information processing apparatuses to operate the information display surface;

means for displaying an information input receiving surface receiving input information, on the sub-display unit of the sub-information processing apparatuses, upon acquiring the operation right, and for turning off the information input receiving surface when the operation right of the sub-information processing apparatus is relinquished; and means for displaying the input information as the independent information objects on the information display surfaces on the main display unit and the sub-display units.

2. The conference support system according to claim 1, further comprising:

means for displaying the information input receiving surface, which is waiting for new input, on the sub-display unit of the sub-information processing apparatus which has acquired the operation right, until completion of displaying of an independent information object as relinquishing the operation right of the sub-information processing apparatus or as long as the sub-information processing apparatus retains the operation right or after completion of input of one independent information object to the information input receiving surface.

3. The conference support system according to claim 1, further comprising:

means for calculating display positions of the independent information objects on the information display surface when the independent information objects are continuously created and displayed such that each independent information object may be moved arbitrarily with respect to each other on the information display surface.

4. The conference support system according to claim 1, further comprising:

means for displaying the information input receiving surface of the sub-information processing apparatus which has acquired the operation right and information to be inputted to said information input receiving surface on the main display unit and the sub-display unit of the other sub-information processing apparatuses which have not acquired the operation right, with the information input receiving surface on the sub-display unit of the other sub-information processing apparatuses not receiving input of information.

5. The conference support system according to claim 1, further comprising:

means for displaying a sub-information display surface on which information is created, displayed and edited in accordance with an operation of the sub-information processing apparatus, on the sub-display unit of the sub-information processing apparatus;

means for displaying the information input receiving surface for receiving input of information on the sub-display unit of the sub-information processing apparatus which has not acquired the operation right;

means for displaying information inputted to the information input receiving surface on the sub-information display surface; and means for displaying information inputted to the information input receiving surface as an information object on the information display surface on the main display unit when the operation right has been acquired during input of information to the information input receiving surface; and means for displaying information inputted to the information input receiving surface as an information object on the information display surface on the sub-display unit of the sub-information processing apparatus itself, when the operation right has not been acquired and input of information to the information input receiving surface has been completed.

6. The conference support system according to claim 1, further comprising:

means for performing control such that a display performed on the sub-display unit of a sub-information processing apparatus which has acquired the operation right, and of a display performed on the main display unit and other sub-display units of the sub-information processing apparatuses except said sub-information processing apparatuses having acquired the operation right, are made to be different from each other when information is created, displayed or edited on the information display surface in accordance with an operation of the sub-information processing apparatus which has acquired the operation right.

7. A conference support system having a structure in which a main information processing apparatus including a main display unit for displaying information, and a plurality of sub-information processing apparatuses, each having a sub-display unit for displaying information, are connected to one another through a communication passage so as to communicate information among the apparatuses, said conference support system comprising:

means for displaying an information display surface on which independent information objects are created, displayed and edited in accordance with an operation of the main information processing apparatus and/or each of the sub-information processing apparatuses, on the main display unit and each sub-display unit;

means for receiving a process of editing an independent information object displayed on the information display surface from one of the sub-information processing apparatuses;

determining means for determining whether the one sub-information processing apparatus which has requested the process of editing and the sub-information processing apparatus which has created the independent information object to perform the process of editing coincide with each other; and means for performing the process of editing when said determining means determines that the former and the latter sub-information processing apparatuses coincide with each other.

8. A conference support system having a structure in which a main information processing apparatus including a main display unit for displaying information, and a plurality of sub-information processing apparatuses, each having a sub-display unit for displaying information, are connected to one another through a communication passage so as to communicate information among the apparatuses, said conference support system comprising:

means for displaying an information display surface on which independent information objects are created, displayed and edited in accordance with an operation of the main information processing apparatus and/or each of the sub-information processing apparatuses, on the main display unit and each sub-display unit; and means for displaying, on the information display surface, the independent information objects from the sub-information processing apparatuses.

9. The conference support system according to claim 8, further comprising:

means for receiving an instruction input specifying sub-information processing apparatuses, from an optional sub-information processing apparatus; and means for displaying an information object input by the sub-information processing apparatuses specified with the instruction input, on the sub-display unit of the optional sub-information processing apparatus.

10. A computer memory product storing a computer program for performing a process in a conference support system having a structure in which a main information processing apparatus including a main display unit for displaying information, and a plurality of sub-information processing apparatuses, each having a sub-display unit for displaying information, are connected to one another through a communication passage so as to communicate information among the apparatuses, said computer program comprising:

displaying an information display surface on which independent information objects are created, displayed and edited in accordance with an operation of the main information processing apparatus and/or each of the sub-information processing apparatuses, on the main display unit and each sub-display unit;

determining an operation right for one of the plurality of sub-information processing apparatuses to operate the information display surface;

displaying an information input receiving surface receiving input information, on the sub-display unit of the sub-information processing apparatus, upon acquiring the operation right;

displaying, on the information display surface, the input information as the independent information objects; and turning off the information input receiving surface upon relinquishment of the operation right of the sub-information processing apparatus.

11. The computer memory product according to claim 10, said computer program further comprising:

performing control such that a display performed on the sub-display unit of the sub-information processing apparatus which has acquired the operation right, and a display performed on the main display unit and sub-display units of the sub-information processing apparatuses except said sub-information processing apparatus which has acquired the operation right, are made to be different from each other when the independent information objects are created, displayed or edited on the information display surface in accordance with an operation of the sub-information processing apparatus which has acquired the operation right.

12. A computer memory product having computer readable program code means for reading by a computer and for performing a process in a conference support system having a structure in which a main information processing apparatus, including a main display unit for displaying information, and a plurality of sub-information processing apparatuses, each having a sub-display unit for displaying information, are connected to one another through a communication passage so as to communicate information among the apparatuses, said computer readable program code means comprising:

program code means for causing the computer to display, on the main display unit and each sub-display unit, an information display surface on which independent information objects are created, displayed and edited in accordance with an operation of the main information processing apparatus and/or each of the sub-information processing apparatuses;

program code means for causing the computer to determine an operation right for one of the plurality of sub-information processing apparatuses to operate the information display surface;

program code means for causing the computer to display an information input receiving surface receiving input information, on the sub-display unit of the sub-information processing apparatus, upon acquiring the operation right and for turning off the information input receiving surface when the operation right of the sub-information processing apparatus is relinquished; and program code means for causing the computer to display the input information on the information display surface as the independent information objects.

13. The computer memory product according to claim 12, said computer readable program code means further comprising:

program code means for causing the computer to perform control such that a display performed on the sub-display unit of a sub-information processing apparatus which has acquired the operation right, and a display performed on the main display unit and sub-display units of the sub-information processing apparatuses except said sub-information processing apparatus which has acquired the operation right, are made to be different from each other when the independent information objects are created, displayed or edited on the information display surface in accordance with an operation of the sub-information processing apparatus which has acquired the operation right.

14. A conference support method for a main processing apparatus including a plurality of sub-information processing apparatuses, comprising:

displaying an information display surface on which independent information objects are created, displayed and edited in accordance with an operation of the main information processing apparatus and/or each of the sub-information processing apparatuses;

determining an operation right for the sub-information processing apparatus to operate an information display surface;

displaying an information input receiving surface receiving input information, on a sub-display unit of one of the sub-information processing apparatuses, upon acquiring the operation right and turning off the information input receiving surface when the operation right of the sub-information processing apparatus is relinquished; and displaying the input information on the information display surface as the independent information objects.

15. A conference support method for a main processing apparatus including a plurality of sub-information processing apparatuses, comprising the steps of:

displaying an information display surface on which independent information objects are created, displayed and edited in accordance with an operation of the main information processing apparatus and/or each of the sub-information processing apparatuses;

receiving a process of editing an independent information object displayed on the information display surface, from one of the sub-information processing apparatuses;

determining whether the one sub-information processing apparatus which has requested the process of editing and the sub-information processing apparatus which has created the independent information object coincide with each other; and performing the editing process when the two sub-information processing apparatuses coincide with each other.

16. A conference support system having a main information processing apparatus, having a main display unit, interconnected with a plurality of sub-information processing apparatuses, each having respective sub-display unit, said conference support system comprising:

- means for displaying a display surface on the main display unit and each sub-display unit for creation, display and editing of independent information objects;
- means for determining an operation right for one of the plurality of sub-information processing apparatuses to operate the information display surface;
- means for displaying an information input receiving surface receiving input information, on a sub-display unit of said one sub-information processing apparatus, and for not displaying the information input receiving surface on sub-information processing apparatuses which have not acquired the operation right; and
- means for displaying the input information as the independent information objects on the main display unit; and
- means for preventing overlap of the independent information objects on the information display surface.

17. A conference support system, comprising:

- a main information processing apparatus having a main display unit for displaying an information display surface, which determines whether to assign an operation right based upon a request;
- a plurality of sub-information processing apparatuses, each having a sub-display unit for displaying information, which are connected to each other and the main information processing apparatus through a communication passage to communicate information, and which displays the information display surface on which independent information objects are created, displayed and edited in accordance with an operation of the main information processing apparatus and/or each of the sub-information processing apparatuses; and
- a requesting sub-information processing apparatus of the plurality of sub-information processing apparatuses having a requesting sub-display unit, which makes the request for an operation right from the main information processing apparatus, and upon acquisition of the operation right, the requesting sub-display unit displays an operation input surface through which information is input,
- wherein the input information are displayed as the information objects on the information display surface and are selectively displayed on the other sub-display units of said plurality.

18. A conference support system having a main information processing apparatus and a plurality of sub-information processing apparatuses, the apparatuses being connected to one another through a communication passage to communicate information, said conference support system comprising:

- a main display connected to the main information processing apparatus and a plurality of sub-display units respectively connected to each of the plurality of sub-information processing apparatuses, said main display unit and said sub-display units displaying an information surface on which independent information objects are created, displayed and edited in accordance with an operation of the main information processing apparatus and/or each of the sub-information processing apparatuses; and
- a requesting sub-information processing apparatus of the plurality of sub-information processing apparatuses, which requests the main information processing unit to assign an operation right to operate the information display surface, the operation right being assigned to the requesting sub-information processing apparatus, which displays an information input receiving surface to receive input information from the requesting sub-information processing apparatus, and which is turned off when the operation right of the sub-information processing apparatus is relinquished,
- wherein the main display unit, and the sub-display units of the non-requesting sub-information processing apparatuses display the independent information objects, which display the input information.

19. A conference support system having a main information processing apparatus including a main display unit displaying information, and sub-information processing apparatuses, each having a sub-display unit displaying information, the apparatuses in communication with each other, the conference support system comprising:

- display units in the main information processing apparatus and the sub-information processing apparatuses and displaying on the main display unit and each sub-display unit an information display surface on which independent information objects are created, displayed and edited according to an operation of the main information processing apparatus and/or each of the sub-information processing apparatuses;
- a determining unit in communication with the main information processing apparatus and the sub-information processing apparatuses, the determining unit determining an operation right for one of the sub-information processing apparatuses to operate the information display surface;
- the main information processing apparatus and the sub-information processing units further including a display input unit in communication with the display units and upon acquiring the operation right displaying on the sub-display unit of the sub-information processing apparatuses an information input receiving surface receiving input information, and a display output unit in communication with the display units and displaying on the information display surface the input information as the independent information objects.

20. A conference support system having a main information processing apparatus including a main display unit for displaying information, and sub-information processing apparatuses, each having a sub-display unit for displaying information, the apparatuses in communication with each other, said conference support system comprising:

- means for displaying an information display surface on which independent information objects are created, displayed and edited in accordance with an operation of the main information processing apparatus and/or each of the sub-information processing apparatuses, on the main display unit and each sub-display unit;
- means for determining an operation right for one of the plurality of sub-information processing apparatuses to operate the information display surface;
- means for displaying an information input receiving surface receiving input information, on the sub-display unit of the sub-information processing apparatuses, upon acquiring the operation right; and
- means for displaying, on the information display surface, the input information as the independent information objects.

* * * * *